(12) United States Patent
Stein et al.

(10) Patent No.: US 11,816,991 B2
(45) Date of Patent: Nov. 14, 2023

(54) VEHICLE ENVIRONMENT MODELING WITH A CAMERA

(71) Applicant: Mobileye Vision Technologies Ltd., Jerusalem (IL)

(72) Inventors: Gideon Stein, Jerusalem (IL); Itay Blumenthal, Jerusalem (IL); Nadav Shaag, Jerusalem (IL); Jeffrey Moskowitz, Jerusalem (IL)

(73) Assignee: Mobileye Vision Technologies Ltd., Jerusalem (IL)

( * ) Notice: Subject to any disclaimer, the term of this patent is extended or adjusted under 35 U.S.C. 154(b) by 88 days.

(21) Appl. No.: 17/104,572

(22) Filed: Nov. 25, 2020

(65) Prior Publication Data

US 2021/0118161 A1 Apr. 22, 2021

Related U.S. Application Data

(63) Continuation of application No. 16/387,969, filed on Apr. 18, 2019, now Pat. No. 10,872,433.

(Continued)

(51) Int. Cl.
*G06K 9/00* (2022.01)
*G08G 1/16* (2006.01)
(Continued)

(52) U.S. Cl.
CPC ............. *G08G 1/166* (2013.01); *B60W 40/06* (2013.01); *G06T 7/248* (2017.01); *G06T 7/55* (2017.01);
(Continued)

(58) Field of Classification Search
CPC ....................................................... G06T 7/55
See application file for complete search history.

(56) References Cited

U.S. PATENT DOCUMENTS 10,872,433 B2   12/2020   Stein et al.
2009/0243889 A1  10/2009   Suhr et al.
(Continued)

FOREIGN PATENT DOCUMENTS

CN   102074043     5/2011
CN   102074043 B   5/2012
(Continued)

OTHER PUBLICATIONS

"Japanese Application Serial No. 2020-556952, Notification of Reasons for Refusal dated Sep. 21, 2021", w English Translation, 6 pgs.
(Continued)

*Primary Examiner* — Oneal R Mistry
(74) *Attorney, Agent, or Firm* — Schwegman Lundberg & Woessner, P.A.

(57) ABSTRACT

System and techniques for vehicle environment modeling with a camera are described herein. A time-ordered sequence of images representative of a road surface may be obtained. An image from this sequence is a current image. A data set may then be provided to an artificial neural network (ANN) to produce a three-dimensional structure of a scene. Here, the data set includes a portion of the sequence of images that includes the current image, motion of the sensor from which the images were obtained, and an epipole. The road surface is then modeled using the three-dimensional structure of the scene.

24 Claims, 30 Drawing Sheets

Related U.S. Application Data

(60) Provisional application No. 62/769,241, filed on Nov. 19, 2018, provisional application No. 62/769,236, filed on Nov. 19, 2018, provisional application No. 62/663,529, filed on Apr. 27, 2018, provisional application No. 62/662,965, filed on Apr. 26, 2018, provisional application No. 62/659,470, filed on Apr. 18, 2018.

(51) Int. Cl.
  *G06T 7/55* (2017.01)
  *B60W 40/06* (2012.01)
  *G06T 7/246* (2017.01)
  *G06V 10/764* (2022.01)
  *G06V 10/82* (2022.01)
  *G06V 20/56* (2022.01)
  *G06V 20/58* (2022.01)

(52) U.S. Cl.
  CPC ............ *G06V 10/764* (2022.01); *G06V 10/82* (2022.01); *G06V 20/56* (2022.01); *G06V 20/58* (2022.01); *G08G 1/165* (2013.01); *B60W 2420/42* (2013.01); *G06T 2207/10016* (2013.01); *G06T 2207/10028* (2013.01); *G06T 2207/20084* (2013.01); *G06T 2207/30252* (2013.01)

(56) References Cited

U.S. PATENT DOCUMENTS

| | | |
|---|---|---|
| 2010/0098295 A1 | 4/2010 | Zhang et al. |
| 2010/0305857 A1 | 12/2010 | Byrne et al. |
| 2014/0225990 A1* | 8/2014 | Einecke ............ G06T 7/593 382/104 |
| 2016/0148063 A1 | 5/2016 | Hong et al. |
| 2016/0253566 A1 | 9/2016 | Stein et al. |
| 2016/0325753 A1 | 11/2016 | Stein et al. |
| 2017/0010618 A1* | 1/2017 | Shashua ............ G05D 1/0088 |
| 2017/0371340 A1 | 12/2017 | Cohen et al. |
| 2019/0026958 A1* | 1/2019 | Gausebeck ............ H04N 13/10 |
| 2019/0080467 A1* | 3/2019 | Hirzer ............ G06T 7/11 |
| 2019/0156485 A1 | 5/2019 | Pfeiffer |
| 2019/0295282 A1* | 9/2019 | Smolyanskiy ......... G06F 18/22 |
| 2019/0325595 A1 | 10/2019 | Stein et al. |

FOREIGN PATENT DOCUMENTS

| | | |
|---|---|---|
| CN | 103988226 | 8/2014 |
| CN | 107430188 | 12/2017 |
| CN | 111566441 A | 8/2020 |
| CN | 111566441 | 8/2022 |
| EP | 2757524 | 7/2014 |
| JP | H0933216 A | 2/1997 |
| JP | 2013079937 | 5/2013 |
| JP | 2013239143 A | 11/2013 |
| JP | 2014138420 A | 7/2014 |
| JP | 2018026143 | 2/2018 |
| JP | 7039727 B2 | 3/2022 |
| KR | 20040044621 | 5/2004 |
| KR | 20160088909 | 7/2016 |
| KR | 20170103763 | 9/2017 |
| KR | 20170132860 | 12/2017 |
| KR | 20180037241 | 4/2018 |
| KR | 102265703 | 6/2021 |
| WO | WO-2010129907 A2 | 11/2010 |
| WO | WO-2013029675 A1 | 3/2013 |
| WO | 2016183074 | 11/2016 |
| WO | 2017118907 | 7/2017 |
| WO | WO-2019202397 A2 | 10/2019 |
| WO | WO-2019202397 A3 | 11/2019 |
| WO | WO-2019202397 A8 | 7/2020 |

OTHER PUBLICATIONS

"Korean Application Serial No. 10-2021-7017826, Response filed Oct. 22, 2021 to Notice of Preliminary Rejection dated Aug. 24, 2021", w English claims, 31 pgs.

"Chinese Application Serial No. 201980004560.5, Response filed Nov. 3, 2021 to Office Action dated Jun. 23, 2021", w English claims, 177 pgs.

"U.S. Appl. No. 16/387,969, Final Office Action dated Jun. 8, 2020", 18 pgs.

"U.S. Appl. No. 16/387,969, Non Final Office Action dated Feb. 20, 2020", 13 pgs.

"U.S. Appl. No. 16/387,969, Notice of Allowance dated Aug. 19, 2020", 8 pgs.

"U.S. Appl. No. 16/387,969, Preliminary Amendment filed Jan. 8, 2020", 6 pgs.

"U.S. Appl. No. 16/387,969, Response filed May 20, 2020 to Non Final Office Action dated Feb. 20, 2020", 13 pgs.

"U.S. Appl. No. 16/387,969, Response filed Aug. 10, 2020 to Final Office Action dated Jun. 8, 2020", 8 pgs.

"International Application Serial No. PCT/IB2019/000506, International Preliminary Report on Patentability dated Oct. 29, 2020", 5 pgs.

"International Application Serial No. PCT/IB2019/000506, International Search Report dated Oct. 4, 2019", 2 pgs.

"International Application Serial No. PCT/IB2019/000506, Written Opinion dated Oct. 4, 2019", 3 pgs.

"Korean Application Serial No. 10-2020-7006196, Notice of Preliminary Rejection dated May 28, 2020", w/ English translation, 8 pgs.

"Korean Application Serial No. 10-2020-7006196, Response filed Jul. 28, 2020 to Notice of Preliminary Rejection dated May 28, 2020", w/ English claims, 22 pgs.

"Korean Application Serial No. 10-2021-7017826, Notice of Preliminary Rejection dated Aug. 18, 2022", w English Translation, 11 pgs.

"Korean Application Serial No. 10-2021-7017826, Response filed Jul. 19, 2022 to Final Office Action dated Apr. 18, 2022", w English claims, 9 pgs.

"Japanese Application Serial No. 2020-556952, Response filed Dec. 20, 2021 to Notification of Reasons for Refusal dated Sep. 21, 2021", w English claims, 9 pgs.

"Chinese Application Serial No. 201980004560.5, Office Action dated Jan. 7, 2022", w English Translation, 7 pgs.

"European Application Serial No. 19787733.5, Response filed Nov. 15, 2021 to Extended European Search Report dated Apr. 15, 2021", 26 pgs.

"Korean Application Serial No. 10-2020-7034100, Notice of Preliminary Rejection dated Dec. 7, 2020", W English Translation, 8 pgs.

"Korean Application Serial No. 10-2020-7034100, Response filed Feb. 5, 2021 to Notice of Preliminary Rejection dated Dec. 7, 2020", w English claims, 14 pgs.

"Chinese Application Serial No. 201980004560.5, Response Filed Mar. 21, 2022 to Office Action dated Jan. 7, 2022", W English Claims, 10 pgs.

"Korean Application Serial No. 10-2021-7017826, Final Office Action dated Apr. 18, 2022", w English translation, 6 pgs.

"European Application Serial No. 19787733.5, Extended European Search Report dated Apr. 15, 2021", 7 pgs.

"Japanese Application Serial No. 2020-556952, Notification of Reasons for Refusal dated Apr. 27, 2021", w English translation, 7 pgs.

Vijayanarasimhan, Sudheendra, "SfM-Net: Learning of Structure and Motion from Video", arxiv.org, Cornell University Library, 201 Olin Library Cornell University Ithaca, NY 14853, (Apr. 25, 2017), 9 pgs.

"Chinese Application Serial No. 201980004560.5, Office Action dated Jun. 23, 2021", w English Translation, 6 pgs.

"Korean Application Serial No. 10-2021-7017826, Notice of Preliminary Rejection dated Aug. 24, 2021", w English Translation, 12 pgs.

(56) References Cited

OTHER PUBLICATIONS

"Japanese Application Serial No. 2020-556952, Response filed Jul. 14, 2021 to Notification of Reasons for Refusal dated Apr. 27, 2021", w English claims, 9 pgs.

"Japanese Application Serial No. 2022-035929, Response filed May 10, 2023 to Notification of Reasons for Refusal dated Feb. 14, 2023", w English claims, 10 pgs.

"European Application Serial No. 19787733.5, Communication Pursuant to Article 94(3) EPC dated Feb. 21, 2023", 6 pgs.

"Japanese Application Serial No. 2022-035929, Notification of Reasons for Refusal dated Feb. 14, 2023", w/ English Translation, 8 pgs.

"Korean Application Serial No. 10-2021-7017826, Response filed Jan. 17, 2023 to Notice of Preliminary Rejection dated Aug. 18, 2022", w/ English claims, 20 pgs.

Patra, Suvam, et al., "A Joint 3D-2D Based Method for Free Space Detection on Roads", 2018 IEEE Winter Conference on Applications of Computer Vision (WACV), [Online]. Retrieved from the Internet: <URL: https://ieeexplore.ieee.org/document/8354180>, (Mar. 12, 2018), 11 pgs.

"Korean Application No. 10-2021-7017826, Notice of Preliminary Rejection dated Jul. 28, 2023", w Machine English Translation, 14 pgs.

\* cited by examiner

| Layer | Name | Type | Input/0 | Output/0 | Output Channels | Kernel Width | Kernel Step | Activation | Normalization | Input/1 | Scale |
|---|---|---|---|---|---|---|---|---|---|---|---|
| 1 | conv1 | Conv | images | conv1 | 8 | 3 | 1 | relu | batchNorm | | |
| 2 | conv2 | Conv | conv1 | conv2 | 8 | 3 | 2 | relu | batchNorm | | |
| 3 | conv3 | Conv | relu2 | conv3 | 16 | 3 | 2 | relu | batchNorm | | |
| 4 | conv4_red | Conv | conv3 | conv4_red | 8 | 1 | 1 | | | | |
| 5 | conv4 | Conv | conv4_red | conv4 | 72 | 3 | 2 | relu | batchNorm | | |
| 6 | conv5_red | Conv | conv4 | conv5_red | 32 | 1 | 1 | relu | batchNorm | | |
| 7 | conv5 | Conv | conv5_red | conv5 | 192 | 3 | 2 | relu | | | |
| 8 | conv6_concat | Concat | conv5 | conv6_concat | | | | | | epipole/motion | |
| 9 | conv6_red | Conv | conv6_concat | conv6_red | 64 | 1 | 1 | relu | batchNorm | | |
| 10 | conv6 | Conv | conv6_red | conv6 | 192 | 3 | 1 | relu | | | |
| 11 | conv7_red | Conv | conv6 | conv7_red | 64 | 1 | 1 | relu | batchNorm | | |
| 12 | conv7 | Conv | conv7_red | conv7 | 192 | 3 | 1 | relu | | | |
| 13 | conv8_red | Conv | conv7 | conv8_red | 64 | 1 | 1 | relu | batchNorm | | |
| 14 | conv8 | Conv | conv8_red | conv8 | 192 | 3 | 1 | relu | | | |
| 15 | deconv7_red | Conv | conv8 | deconv7_red | 64 | 1 | 1 | relu | batchNorm | | |
| 16 | deconv7 | DeConv | deconv7_red | deconv7 | 192 | 5 | 1 | relu | batchNorm | | 2 |
| 17 | deconv4_red1 | Conv | deconv7 | deconv4_red1 | 16 | 1 | 1 | relu | | | |
| 18 | deconv4_red2 | Conv | conv4 | deconv4_red2 | 16 | 1 | 1 | relu | | | |
| 19 | deconv4_concat | Concat | deconv4_red1 | deconv4_concat | | | | | | deconv4_red2 | |
| 20 | deconv4 | DeConv | deconv4_concat | deconv4 | 72 | 5 | 1 | relu | batchNorm | | 2 |
| 21 | deconv3_concat | Concat | deconv4 | deconv3_concat | | | | | | conv3 | |
| 22 | deconv3 | DeConv | deconv3_concat | deconv3 | 16 | 5 | 1 | relu | batchNorm | | 2 |
| 23 | deconv2_concat | Concat | deconv3 | deconv2_concat | | | | | | conv2 | |
| 24 | deconv2 | DeConv | deconv2_concat | deconv2 | 16 | 5 | 1 | relu | batchNorm | | 2 |
| 25 | predict_concat | Concat | deconv2 | predict_concat | | | | | | conv1 | |
| 26 | predict | Conv | predict_concat | predict | 1 | 3 | 1 | | | | |

FIG. 6

| Layer | Name | Type | Input/0 | Output/0 | Output Channels | Kernel Width | Kernel Step | Activation | Normalization | Input/1 | Scale | Like Size | Input/2 |
|---|---|---|---|---|---|---|---|---|---|---|---|---|---|
| 1 | conv1 | Conv | images | conv1 | 8 | 7 | 2 | relu | batchNorm | | | | |
| 2 | conv1b | Conv | conv1 | conv1b | 8 | 7 | 1 | relu | batchNorm | | | | |
| 3 | conv2 | Conv | conv1b | conv2 | 16 | 5 | 2 | relu | batchNorm | | | | |
| 4 | conv2b | Conv | conv2 | conv2b | 16 | 5 | 1 | relu | batchNorm | | | | |
| 5 | conv3 | Conv | conv2b | conv3 | 32 | 3 | 2 | relu | batchNorm | | | | |
| 6 | conv3b | Conv | conv3 | conv3b | 32 | 3 | 1 | relu | batchNorm | | | | |
| 7 | conv4_red | Conv | conv3b | conv4_red | 16 | 1 | 1 | | | | | | |
| 8 | conv4 | Conv | conv4_red | conv4 | 64 | 3 | 2 | relu | batchNorm | | | | |
| 9 | conv4b_concat | Concat | conv4 | conv4b_concat | | | | | | epipole/motion | | | |
| 10 | conv4b | Conv | conv4b_concat | conv4b | 64 | 3 | 1 | relu | batchNorm | | | | |
| 11 | conv5_red | Conv | conv4b | conv5_red | 32 | 1 | 1 | | | | | | |
| 12 | conv5 | Conv | conv5_red | conv5 | 128 | 3 | 2 | relu | batchNorm | | | | |
| 13 | conv5b | Conv | conv5 | conv5b | 128 | 3 | 1 | relu | batchNorm | | | | |
| 14 | conv6_red | Conv | conv5b | conv6_red | 32 | 1 | 1 | | | | | | |
| 15 | conv6 | Conv | conv6_red | conv6 | 128 | 3 | 2 | relu | batchNorm | | | | |
| 16 | conv6b | Conv | conv6 | conv6b | 128 | 3 | 1 | relu | batchNorm | | | | |
| 17 | conv7_red | Conv | conv6b | conv7_red | 32 | 1 | 1 | | | | | | |
| 18 | conv7 | Conv | conv7_red | conv7 | 128 | 3 | 2 | relu | batchNorm | | | | |
| 19 | conv7b | Conv | conv7 | conv7b | 128 | 3 | 1 | relu | batchNorm | | | | |
| 20 | deconv7_red | Conv | conv7b | deconv7_red | 32 | 1 | 1 | relu | batchNorm | | | | |
| 21 | deconv7 | DeConv | deconv7_red | deconv7 | 128 | 5 | 1 | | | | 2 | | |
| 22 | deconv7_resize | Resize | deconv7 | deconv7_resize | | | | | | | | conv6b | |
| 23 | icnv7_concat | Concat | deconv7_resize | icnv7_concat | | | | | | conv6b | | | |
| 24 | icnv7_red | Conv | icnv7_concat | icnv7_red | 32 | 3 | 1 | | | | | | |
| 25 | icnv7 | Conv | icnv7_red | icnv7 | 128 | 3 | 1 | relu | batchNorm | | | | |
| 26 | deconv6_red | Conv | icnv7 | deconv6_red | 32 | 1 | 1 | | | | | | |
| 27 | deconv6 | DeConv | deconv6_red | deconv6 | 128 | 5 | 1 | relu | batchNorm | | 2 | | |
| 28 | deconv6_resize | Resize | deconv6 | deconv6_resize | | | | | | | | conv5b | |

FIG. 7

| Layer | Name | Type | Input/0 | Output/0 | Output Channels | Kernel Width | Kernel Step | Activation | Normalization | Input/1 | Scale | Like Size | Input/2 |
|---|---|---|---|---|---|---|---|---|---|---|---|---|---|
| 29 | icnv6 concat | Concat | deconv6 resize | icnv6 concat | | | | | | conv5b | | | |
| 30 | icnv6 red | Conv | icnv6 concat | icnv6 red | 32 | 3 | 1 | relu | batchNorm | | | | |
| 31 | icnv6 | Conv | icnv6 red | icnv6 | 128 | 3 | 1 | relu | | | | | |
| 32 | deconv5 red | Conv | icnv6 | deconv5 red | 16 | 1 | 1 | relu | batchNorm | | | | |
| 33 | deconv5 | DeConv | deconv5 red | deconv5 | 64 | 5 | 1 | | | | 2 | | |
| 34 | deconv5 resize | Resize | deconv5 | deconv5 resize | | | | | | | | conv4b | |
| 35 | icnv5 concat | Concat | deconv5 resize | icnv5 concat | | | | | | conv4b | | | |
| 36 | icnv5 red | Conv | icnv5 concat | icnv5 red | 16 | 3 | 1 | relu | batchNorm | | | | |
| 37 | icnv5 | Conv | icnv5 red | icnv5 | 64 | 3 | 1 | relu | batchNorm | | | | |
| 38 | deconv4 | DeConv | icnv5 | deconv4 | 32 | 5 | 1 | | | | 2 | | |
| 39 | icnv4 concat | Concat | deconv4 | icnv4 concat | | | | | | conv3b | | | |
| 40 | icnv4 | Conv | icnv4 concat | icnv4 | 32 | 3 | 1 | relu | batchNorm | | | | |
| 41 | predict 3 | Conv | icnv4 | predict 3 | 1 | 3 | 1 | | | | | | |
| 42 | predict 3 resize | Resize | predict 3 | predict 3 resize | | | | | | | 2 | | |
| 43 | deconv3 | DeConv | icnv4 | deconv3 | 16 | 5 | 1 | relu | batchNorm | | | | |
| 44 | icnv3 concat | Concat | deconv3 | icnv3 concat | | | | | | conv2b | | | predict 3 resize |
| 45 | icnv3 | Conv | icnv3 concat | icnv3 | 16 | 3 | 1 | relu | batchNorm | | | | |
| 46 | predict 2 | Conv | icnv3 | predict 2 | 1 | 3 | 1 | | | | | | |
| 47 | predict 2 resize | Resize | predict 2 | predict 2 resize | | | | | | | 2 | | |
| 48 | deconv2 | DeConv | icnv3 | deconv2 | 8 | 5 | 1 | relu | batchNorm | | | | |
| 49 | icnv2 concat | Concat | deconv2 | icnv2 concat | | | | | | conv1b | | | predict 2 resize |
| 50 | icnv2 | Conv | icnv2 concat | icnv2 | 8 | 3 | 1 | relu | batchNorm | | | | |
| 51 | predict 1 | Conv | icnv2 | predict 1 | 1 | 3 | 1 | | | | | | |
| 52 | predict 1 resize | Resize | predict 1 | predict 1 resize | | | | | | | 2 | images | |
| 53 | deconv1 | DeConv | icnv2 | deconv1 | 8 | 5 | 1 | relu | batchNorm | | | | |
| 54 | icnv1 concat | Concat | deconv1 | icnv1 concat | | | | | | predict 1 resize | | | |
| 55 | icnv1 | Conv | icnv1 concat | icnv1 | 8 | 3 | 1 | relu | batchNorm | | | | |
| 56 | predict | Conv | icnv1 | predict | 1 | 3 | 1 | | | | | | |

VEHICLE ENVIRONMENT MODELING WITH A CAMERA

CLAIM OF PRIORITY

This patent application is a continuation of U.S. patent application Ser. No. 16/387,969, title 'VEHICLE ENVIRONMENT MODELING WITH A CAMERA' and filed Apr. 18, 2019, which claims the benefit of priority, under 35 U.S.C. § 119, to: U.S. Provisional Application Ser. No. 62/659,470, titled "PARALLAXNET-LEARNING OF GEOMETRY FROM MONOCULAR VIDEO" and filed on Apr. 18, 2018; U.S. Provisional Application Ser. No. 62/662,965, titled "MOVING/NOT MOVING DNN" and filed on Apr. 26, 2018; U.S. Provisional Application Ser. No. 62/663,529, titled "ROAD PLANE WITH DNN" and filed on Apr. 27, 2018; U.S. Provisional Application Ser. No. 62/769,236, titled "PUDDLE DETECTION FOR AUTONOMOUS VEHICLE CONTROL" and filed on Nov. 19, 2018; and U.S. Provisional Application Ser. No. 62/769,241, titled "ROAD CONTOUR MEASUREMENT FOR AUTONOMOUS VEHICLES" and filed on Nov. 19, 2018; and, the entirety of all are hereby incorporated by reference herein.

TECHNICAL FIELD

Embodiments described herein generally relate to computer vision techniques and more specifically to vehicle environment modeling with a camera.

BACKGROUND

Autonomous or semi-autonomous automotive technologies, often referred to as "self-driving" or "assisted-driving" operation in automobiles, are undergoing rapid development and deployment in commercial- and consumer-grade vehicles. These systems use an array of sensors to continuously observe the vehicle's motion and surroundings. A variety of sensor technologies may be used to observe the vehicle's surroundings, such as the road surface and boundaries, other vehicles, pedestrians, objects and hazards, signage and road markings, and other relevant items.

Image-capture sensors that are implemented with one or more cameras are particularly useful for object detection and recognition, and reading signs and road markings. Camera-based systems have been applied for measuring three-dimensional structures, such as the vertical contour of the road, lane markers, and curbs, and in detecting objects or hazards. Practical sensor systems are expected to operate reliably in varying weather and road conditions. These expectations tend to introduce myriad challenges in processing the inputs. Input noise from shadows or lights at night may interfere with road surface detection. Wet roads, or other reflective surfaces, often introduce apparent motion that is contrary to road surface models. Further, the need for fast (e.g. real-time) detection of hazards while modeling road surfaces to enable autonomous or assisted driving imposes a burden on hardware given these road surface detection difficulties.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 6 is a table detailing an example architecture of a DNN, according to an embodiment.

FIGS. 7-8 are tables detailing a more complex example architecture of a DNN, according an embodiment.

DETAILED DESCRIPTION

Figure 1:
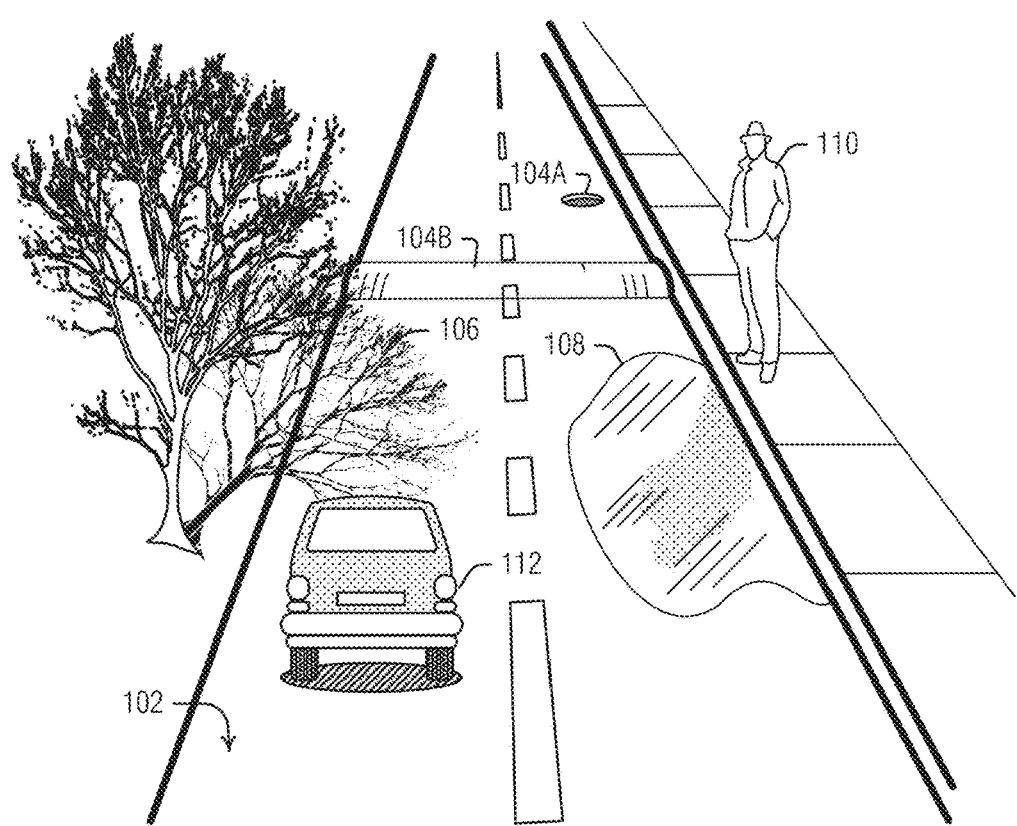
FIG. 1 is a block diagram of an example of a vehicle environment.

A variety of vehicle environment modeling techniques may be used with a variety of sensor configurations. When using a camera (e.g., visual light spectrum, infrared (IR), etc.), the sensors produce an image composed of pixels. Various aspects of the pixels may be used in modeling, such as color or luminance. Generally, to model a dynamic environment, a sequence of images is used. This type of modeling tracks the movement of pixels between sequential images to infer aspects of the environment, such as how the vehicle is moving, how other vehicles are moving, how objects (e.g., people, animals, balls, etc.) are moving, obstacles in the road, etc.

An iterative process of transforming images to a normalized state (e.g., to correct for camera lens distortion), aligning pixels between images in sequence (e.g., warping an earlier image to largely match a later image via a homography), and measuring remaining pixel motion (e.g., residual motion) may be used to model the environment. Residual motion $\vec{\mu}$ may calculated as follows:

$$\vec{\mu} = \frac{H}{Z} \frac{T_Z}{d'_\pi} (\vec{e} - \vec{p_w}),$$

where $$\frac{H}{Z}$$

the term is gamma—a ratio of height H of a pixel above a plane (e.g., the road surface) and distance Z of a pixel to the sensor, $T_Z$ represents translation of a sensor in the forward direction (e.g., how far did the vehicle move between images), $d'_\pi$ represents the height of the sensor from the plane, $\vec{e}$ represents the epipole information (e.g., to where is the vehicle traveling), and $\vec{p_w}$ represents the corresponding image coordinate of a pixel after application of homography-based warping.

Some additional details of computing the residual motion are described below. There are some difficulties, however, with using direct pixel matching. For example, many things that may project onto a road surface do not represent a road surface, such as shadows or reflective patches (e.g., puddles). Although filtering techniques may be used to reduce this noise, a better solution involves an artificial intelligence (e.g., machine learning system, artificial neural network (ANN), deep ANN (DNN), convolutional ANN (CNN), etc.) trained to compute gamma directly from a sequence of images. This entails a robust solution to common noise problems in road surface imaging. Further, such system may also accept the sensor motion or the epipole information to further enhance its gamma results. From gamma, a height of a pixel above the road plane and a distance to that pixel may be determined. Such road surface modeling may be useful to, for example, avoid potholes or adjust suspension for speed bumps. Determining gamma directly from sensor data (e.g., by an ANN) may be superior to other techniques—such as using two-dimensional (2D) optical flow to ascertain residual flow, or an ANN to determine height above plane and distance to the sensor of a pixel techniques—because it enforces the epipolar constraints. Further, one gamma may be used to align (e.g., warp) all the images of that point. Although the ANN may be trained to directly determine the depth or the height of the point, gamma provides a few benefits. For example, gamma computation is more stable than depth because significant changes in height from the plane may result in small relative changes in depth from the camera. Also, given H and the reference plane, it is possible to compute depth Z and then the residual flow, but this adds complexity because the ANN processes more data for the same result. This is also a reason to pre-warp images with a plane model and provide ego-motion (EM) (e.g., motion of the sensor or vehicle such as the epipole $\vec{e}$ and $$\frac{T_Z}{d'_\pi})$$

as input.

In an example, the network may be trained, using similar techniques, to compute Z or H instead of Gamma. In this example, homography plane input parameters may be provided to the ANN. For example, the plane may be defined as a horizon line (e.g., the vanishing line of the plane) and a distance to the plane. The line may be provided as a pair of distance images, and the distance to the plane provided as a constant image. This is similar to the way epipole and $T_Z$ are provided as input above. In an example, the input images are aligned to account only for rotation (e.g., using a homography using a plane at infinity) and compute Z.

In an example, instead of computing gamma for the whole image and then using only the gamma along a particular path (e.g., for suspension control), the ANN may be trained to produce gamma only along a specified path. This may be more computationally efficient, for example if the output is only used for something applicable to vehicle tires, such as suspension control because the deconvolutional operations may be computationally expensive. Path discrimination (e.g., producing gamma only for the path) may be implemented in a number of ways. For example, the path may be given as input at the inference stage of the ANN, the ANN being trained to only output values along the path. In an example, the full ANN may be trained to produce gamma as described above. During inference, when the path is given, a determination is made as to which (de)convolutions are required in the expansion stage for the path and applying only those. For example, to determine gamma values for a complete row of output, convolutions along a whole row are needed. However, for only a segment of the output row, the deconvolutions need only be performed in a certain range corresponding to the segment.

Additionally, a similar structured ANN, trained differently, may also classify objects as moving or not moving. The moving/not-moving classification may be used, for example, to improve a host vehicle's ability to better choose accident avoidance actions. Again, the input images are used directly to identify residual motion in features and determine the result. Additional details and examples are described below.

FIG. 1 is a diagram illustrating an example field of view 100 of a vehicle-mounted camera in which various objects are present. As depicted, field of view 100 includes road surface 102, which may have one or more surface features 104, such as depressions 104A (e.g., potholes, grates, depressions, etc.) or protrusions 104B (e.g., speed bumps, curbs, debris, etc.). Field of view 100 may also include a shadow 106, a reflective surface 108 (e.g., a puddle, ice, etc.), a pedestrian 110, or another vehicle 112. Modeling the surface features 104 may enable the vehicle to avoid them, alert a driver, or adjust itself to better handle them (e.g., adjust vehicle suspension to traverse the pothole 104A). Understanding and modeling the moving, or potentially moving, pedestrian 110 or vehicle 112 may similarly enable vehicle control changes or driver alerts to avoid hitting them, or even avoid or lessen undesirable interactions with them— e.g., splashing the pedestrian 110 by driving through the puddle 108—such as by slowing down, or adjusting the driving path, stopping, etc.).

These elements of road modeling may all present some challenges that are addressed by the devices and techniques described herein. For example, the shadow 106 is noise for road surface point tracking. Reflections from the puddle not only obscure the underlying road surface to impair point tracking, but actually exhibits pixel motion between images that is often contrary to pixel motion elsewhere.

Figure 2:
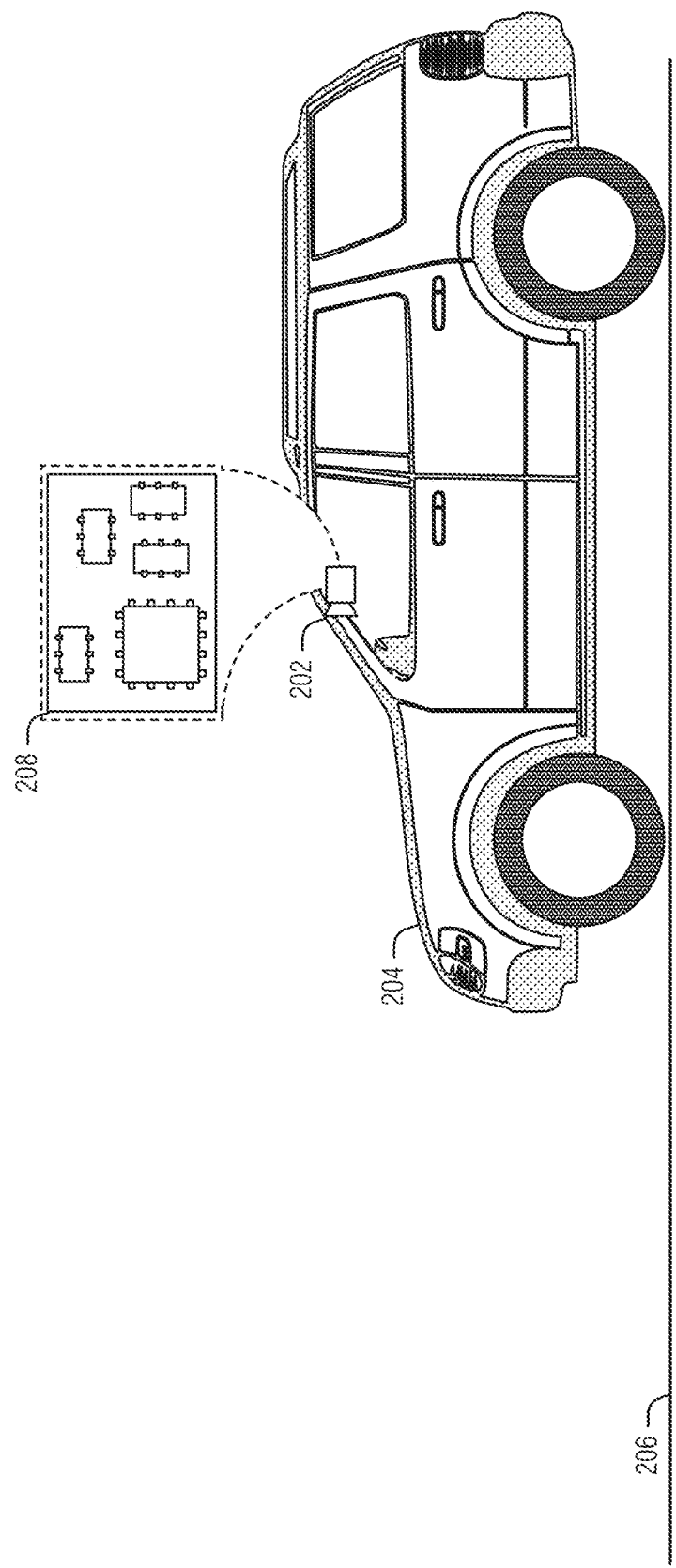
FIG. 2 is a block diagram of an example of a system for vehicle environment modeling with a camera, according to an embodiment.

FIG. 2 is a block diagram of an example of a system 208 for vehicle environment modeling with a camera 202, according to an embodiment. The system 208 is affixed to the vehicle 204. In an example, the system 208 is integrated into the camera 202, or other sensor. In an example, the system 208 is separate from the camera 202, or other sensor (e.g., part of an infotainment system of the vehicle 204). Here, the camera is shown by way of example as a forward looking camera mounted on the windshield. However, the techniques described herein apply equally to rear or side facing cameras mounted inside or outside of the vehicle. One such example is a camera mounted externally on the corner of the roof with a field of view that is forward and a bit to the side.

The system 208 includes processing circuitry to perform vehicle environment modeling via images obtained from the camera 202. The vehicle environment modeling may include modeling the road surface 206, obstacles, obstructions, and moving bodies (e.g., other vehicles, pedestrians, animals, etc.). These models may be used by the system 208 directly, or via another management system, to adjust operating parameters of the vehicle 204. To perform the modeling, the system 208 is arranged to obtain a time-ordered sequence of images representative of the road surface 206. One of the sequence of images is a current image (e.g., the last image taken by the camera 202).

The system 208 is arranged to provide a data set to an artificial neural network (ANN) to produce a gamma image. Here, pixels of the gamma image are gamma values for points. As noted elsewhere, the gamma value is a ratio of a height of a point above a plane by a distance from a sensor capturing the current image. Also, here, the plane represents the road surface 206.

Although "gamma image" is used below, other data formats may be used to represent gamma in a scene. Thus, the gamma may not be in a raster format, but may be in any form (e.g., a gamma map of values to points) that enables the gamma value to be correlated to a surface via the sensor data. Collectively, these various data structures may be referred to as a gamma model.

In an example, the data set includes a portion of the sequence of images. Here, the portion of the sequence of images includes the current image. The data set also includes motion of the sensor 202 (e.g., sensor movement information) and an epipole (e.g., epipole information). In an example, the portion of the sequence of images includes images immediately preceding the current image. In an example, the portion of the sequence of images is three images in total. In an example, the sequence may include any n number of images, where n is an integer greater than one (i.e., $\{n \in \Pi | n > 1\}$). In an example, images in a sequence may be consecutively captured images. In an example, some frames from an original sequence of frames may be omitted in the process of generating the sequence of images that is used in the data set.

In an example, the epipole is provided as a gradient image with the same dimensionality (albeit at a possibly greater or lesser resolution) as the current image. Here, values of pixels in the gradient image represent a distance from the epipole of pixels in the current image. In an example, the gradient image represents only horizontal (e.g., x-axis) distances from the epipole and a second gradient image is provided to the ANN to represent vertical (e.g., y-axis) distances from the epipole.

In an example, the motion of the sensor 206 is provided as a constant value image with a same dimensionality (albeit at a possibly greater or lesser resolution) as the current image. In an example, the constant value is a ratio of forward motion of the sensor 206 (e.g., z-axis) by a height of the sensor 202 from the plane 206.

In an example, the ANN is a convolutional neural network (CNN). In an example, the motion of the sensor 206 and the epipole are provided to the CNN at a bottleneck layer (e.g., see the discussion below with respect to FIG. 5).

In an example, the ANN is trained with an unsupervised training technique in which error is determined by measuring a difference between a model of a future image and the actual future image. Here, the model of the future image is produced via a gamma warping of an image previous to the future image. Thus, in this example, the inferred gamma value is used to predict what the future image will look like. When compared to the future image, deviations from the model are used to correct the ANN.

In an example, the ANN is trained with an unsupervised training technique in which error is determined by measure a difference between predicted gamma for a location and sensor 202 movement at the location. Thus, gamma is predicted and the ego-motion of the sensor 202 or vehicle 204 is used to determine whether the gamma inference was correct (or how wrong the inference was). In this example, if the ANN predicts a dip in the road surface 206, and no such dip is later detected by the vehicle, then the training corrects the inference that predicted the dip. In an example, the sensor movement may include one of more of pitch, yaw, roll, or translation perpendicular to the plane.

In an example, the ANN is trained with an unsupervised training technique in which error is determined by a difference in gamma of overlapping segments between two images at two different times, wherein the inference is performed on the first image, and wherein the overlapping segment is closer to the sensor 202 in the second image. Thus, in training, an image with a view of the surface 206 that is later traversed by the vehicle 204 is the previous image. The gamma value of the overlapping segment is inferred by the ANN, and checked by computing the gamma value of the same segment in the future image. When the sensor 202 is closer to a feature (e.g., the overlapping segment in the future), then the system's estimate of the gamma is probably better, and may be used in the loss function to train the ANN. Thus, the gamma map inferred from a current triple of images is compared to the gamma map inferred from a future triple of images warped towards the current gamma map. The comparison value between the two gamma maps, such as the difference or the distance to the closest surface point, is used as part of the loss when training the ANN.

The system 208 is arranged to model the road surface 206 using the gamma image. In an example, modeling the road surface includes computing a vertical deviation from the plane of a road surface feature. In an example, modeling the road surface includes computing residual motion of features in the sequence of images. Here, the residual motion of a feature is a product of the gamma value, the motion of the sensor 206, and the epipole.

In an example, modeling the road surface includes warping a previous image to the current image using the gamma value. The gamma-based warping is particularly accurate because the gamma enables a feature to be matched between images based on its distance from the sensor 202 and its height above the road surface 206 rather than trying to match sometimes ephemeral or complex color variations of pixels of those features in the images.

In an example, modeling the road surface includes identifying a reflective area from the gamma warped image. Here, the accuracy of the gamma warp enables the identification of reflective areas, such as puddles, because the reflections produce visual information that operates differently than other objects in the images. For example, while the top of a pole may appear to move more quickly towards the sensor 202 as the vehicle approaches than the bottom of the pole, many reflections of the pole will appear to do the opposite. Thus, the trained ANN will match the pixels with the non-reflective movement and ignore reflective areas because the pixel motion therein doesn't fit the motion of other pixels. This behavior results in a flat gamma across the reflective surface. Contiguous areas of flat gamma in the gamma warped image may be identified as reflective areas.

In an example, modeling the road surface includes identifying a reflective area by a contiguous region of residual motion following the warping using the gamma value. After using the gamma warp, the remaining residual motion will be confined to such areas exhibiting this unique behavior. In an example, such areas of residual motion may also be used to determine movement, such as by another vehicle, pedestrian, moving debris, etc.

In an example, an additional ANN can be trained using a photogrammetric constraint in its loss function versus the primarily geometric constraint used in the loss function of the first ANN when training. As noted above, the first ANN will generally ignore the motion in reflective surfaces after training with the primarily geometric constraint. However, the additional ANN will not as the photogrammetric constraint will adjust the additional ANN during training to attempt to account for the motion in reflective surfaces. Thus, in an example, comparing the gamma produced from the first ANN and the second ANN can reveal reflective surfaces where the two gamma maps produced disagree (e.g., beyond a threshold).

In an example, the system 208 is further arranged to invoke a second ANN on the residual motion of features to determine whether the features represent an object moving or not moving within an environment of the road surface 206. In an example, the second ANN is provided the current image, at least one previous image, and a target identifier. The target identifier may be provided by another system, such as a vehicle identification system. In an example, the target identifier is one or more images in which pixels of the image indicate a distance from a center of a target, similar to the gradient images described above for the epipole information. In an example, the target identifier includes a size of a target. In an example, the size of the target is a constant value image (e.g., similar to the sensor motion information image above). In an example, the target identifier is a mask of pixels that correspond to a target. An example of such a second ANN is described below with respect to FIGS. 11 and 12.

Figure 3:
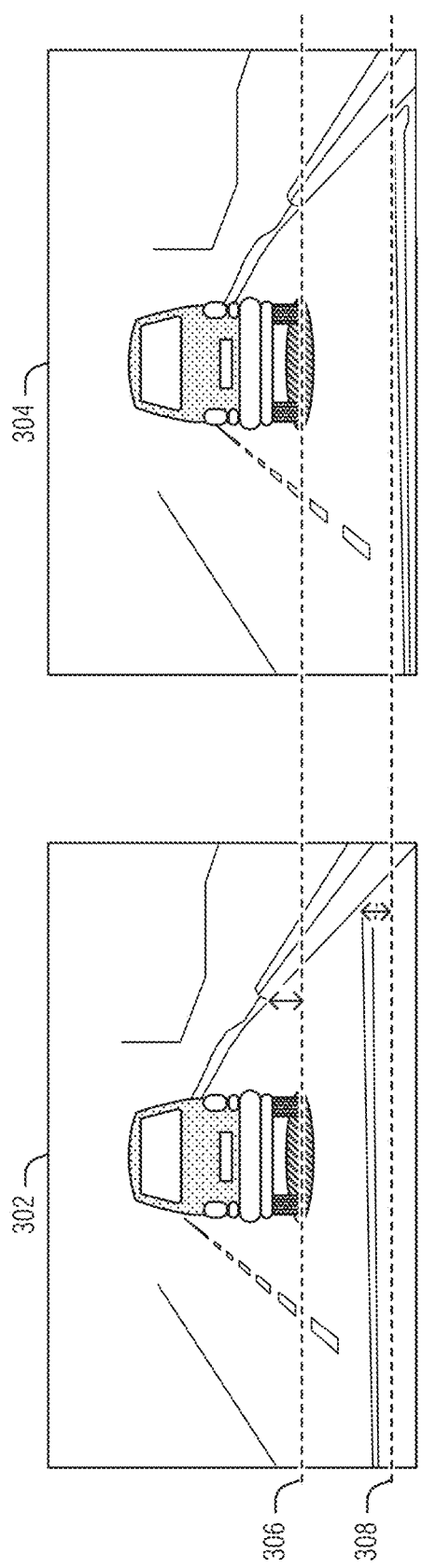
FIG. 3 illustrates a current image and a previous image, according to an embodiment.

FIG. 3 illustrates a current image 304 and a previous image 302, according to an embodiment. The two lines 306 and 308 are placed at the bottom of the tires and at the top of the speed bump in the current image 304. Note how the line 306 aligns with the tires in the previous image 302. The double-ended arrow from the line indicates the line's movement with respect to the stationary end of a curb. Similarly, the line 308 shows that the top of the speed-bump has moved between the previous image 302 and the current image 304. When image 302 is warped to image 304, the stationary features of the images will match but the bottom of the vehicle will move.

Figure 4:
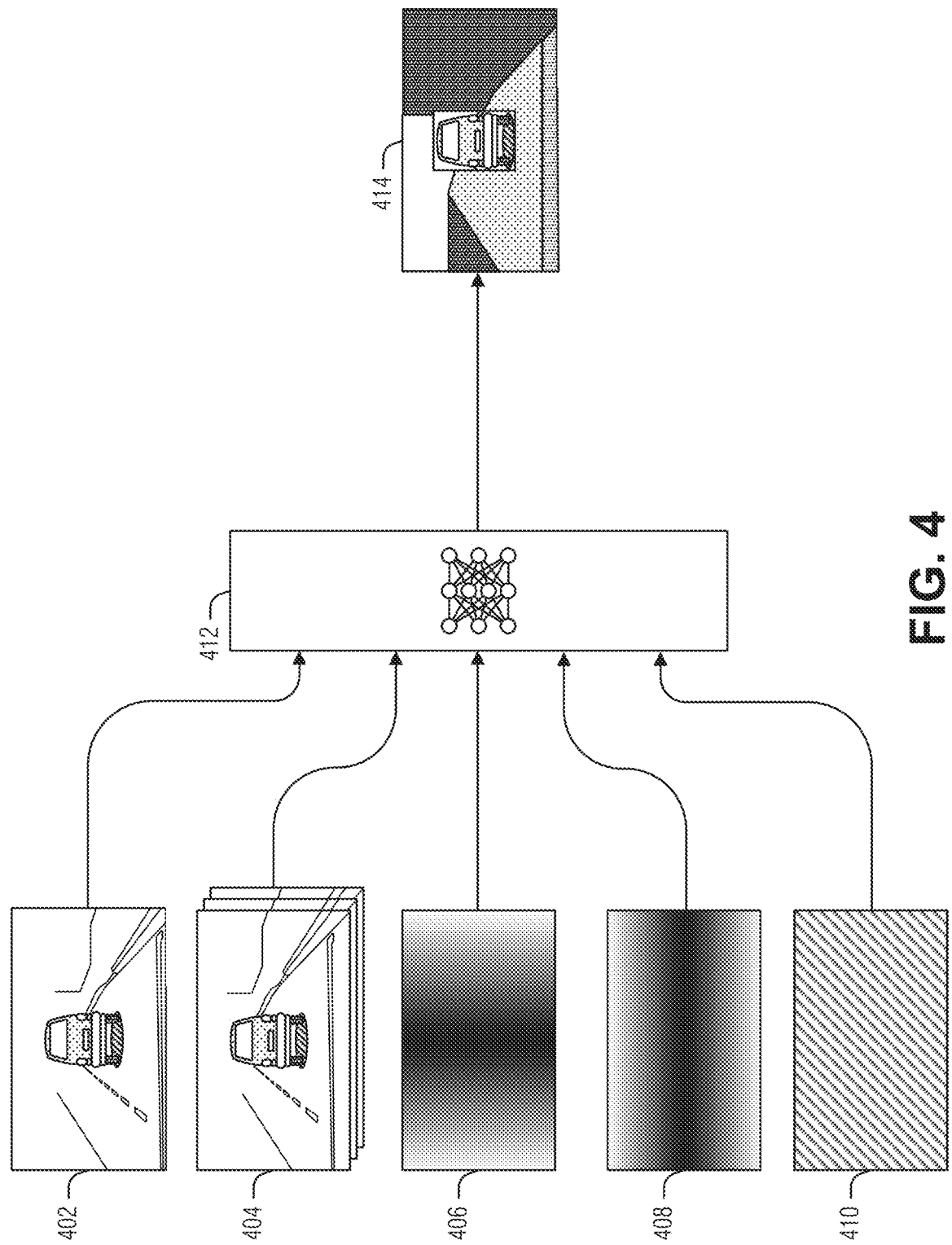
FIG. 4 illustrates an example of a neural network to produce a gamma model of a road surface, according to an embodiment.

FIG. 4 illustrates an example of a neural network 412 to produce a gamma model 414 of a road surface, according to an embodiment. FIGS. 5-10 illustrate some additional details and examples of neural networks like 412. However, as an overview, the residual motion for each pixel is composed of three parts: gamma, sensor (e.g., vehicle) motion, and epipole information, as follows:

$$\vec{\mu} = \frac{H}{Z}\frac{T_Z}{d'_\pi}(\vec{e} - \vec{p}_w)$$

Epipole information depends on the image coordinate after the homography $\vec{p}_w$ and the epipole $\vec{e}$. This may be calculated for each pixel given the ego-motion (EM) of the sensor. Sensor movement information depends on the forward motion $T_Z$ and the sensor height from the plane $d'_\pi$. This is fixed for the whole image.

Gamma describes the structure of a scene at each pixel via the height $H$ of a point above the plane and a distance $Z$ to the point from the sensor. Thus, given the sensor movement information and the epipole information, the neural network 412 determines the gamma model 414, and the residual motion for each point may be calculated to enable one image to be warped to another.

Given an accurate gamma model 414, image warping is very accurate, often behaving as if the images were of a static scene, because of the distance and height of each pixel. Classic techniques first computed the residual flow and then the gamma was computed by removing the epipole information and the sensor movement information. From gamma the height and the distance of a point were computed along one or more tracks (e.g., tire paths). As noted above, however, the varying degree of noise in road surface images caused direct residual motion detection to sometimes be problematic.

Training the neural network 412 to calculate gamma directly from the images provides a robust counter to the noise found in the images. Thus, given a current image 402, one or more previous images 404 warped using a homography and the ego-motion 410 and epipole (e.g., plane) parameters (images 406 and 408) as input, the neural network produces an image of gamma values 414 as output. As illustrated, the lighter the shading in the gamma model 414, the lower the gamma value. Also, the vehicle is omitted from the loss calculation to train the neural network 412. This is done to prevent the motion of the vehicle from effecting nearby gamma values during training, however, the vehicle will generally not be masked during inference. In a example, the vehicle, or other moving objects, are not masked from the neural network 412 loss function during training.

As illustrated, the epipole information and the sensor movement information are provided as images (e.g., a raster of values). The sensor movement information image 410 is a constant valued image (e.g., every pixel has the same value). The epipole information represented by two images respectively having pixels values of a distance to the epipole in horizontal (e.g., x) 406 and vertical (e.g., y) 408 directions. Providing the epipole information as gradient images, rather than two values, is helpful when using a convolutional neural network (CNN). In a CNN, the same filter bank is run over the whole image 402, and each image region must be told where it is in relation to the epipole. By using the gradient images 406 and 406, the filter has the epipole information for each convolution.

Figure 5:
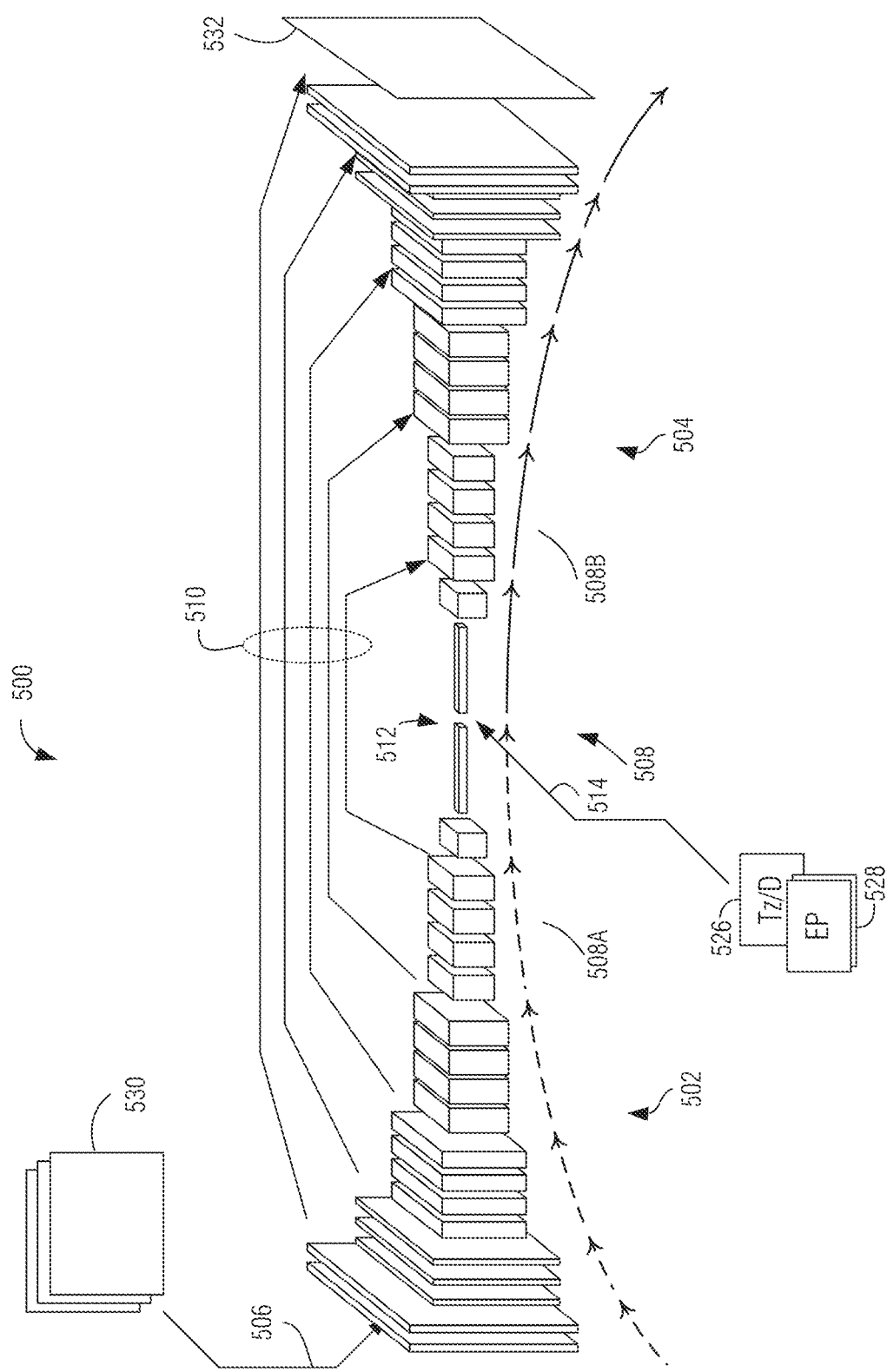
FIG. 5 illustrates an example deep neural network (DNN) of a machine-learning (ML)-based vertical contour engine, according to an embodiment.

FIG. 5 is a diagram illustrating an example DNN 500 of ML-based contour engine. In an example. As depicted, DNN 500 includes convolutional network portion 502 having various operational layers, which may include convolution, activation, normalization, and pooling layers. Other operational layers may be additionally included, such as inner product layers. In an example, the DNN 500 additionally includes deconvolution portion 504, including deconvolution (e.g., transposed convolutional), activation, normalization, and un-pooling layers.

In an example, the set of preprocessed images 530 are provided as input 506 to convolutional network portion 502. Each layer produces a feature map, which is in turn passed to the subsequent layer for further processing along forward propagation path 508. As depicted, the operations of convolutional network portion 502 operate to progressively reduce resolution of the feature maps, while increasing the number of channels (dimensionality) of the feature maps along convolutional forward propagation path 508A. The operations of deconvolutional network portion 504 operate to progressively increase resolution of the feature maps, while decreasing their dimensionality along deconvolutional forward propagation path 508B.

In an example, in addition to forward propagation path 508, one or more bypass paths 510 may be provided to facilitate the passing of feature maps from a prior layer to a latter layer while skipping over one or more intermediary layers situated between those prior and latter layers. As an example, bypass paths 510 may pass feature maps between a layer of convolutional network portion 502, and a similarly-dimensioned layer of deconvolutional network portion 504.

A "bottleneck" network portion 512 is situated between convolutional network portion 502 and deconvolutional network portion 504. In an example, bottleneck network portion 512 has one or more layers with relatively lower resolution and higher dimensionality compared to other layers. In an example, bottleneck portion 512 includes inputs 514 that are configured to accept image-formatted motion indicia 526 and image-formatted epipole location data 528.

In an example, the DNN 500 is trained to produce road structure 532 as a pixel-wise mapping of gamma values corresponding to the current (most recent) image of preprocessed images 530. Road structure 532 as the output of DNN 500 may be at the same, or a different, resolution as preprocessed images 530. For instance, the resolution of road structure 532 may be scaled by a factor or 0.25, 0.5, 1, 1.5, 2, or other scaling factor, which may be an integer or non-integer value.

In another an example, road structure 532 may correspond to a portion of the current image of preprocessed images 530. For instance, road structure 532 may correspond to a cropped image of field of view 100 (FIG. 1) that omits some portions thereof that do not represent the road surface.

Notably, gamma values in the pixels of road structure 532 are dimensionless values. In an example, DNN 500 produces as its output a mapping of other dimensionless values such as $$\frac{Z}{\delta Z}$$

for points above the horizon. When the value of gamma is known, distance Z and height of the road surface H may be recovered using the relationship $$Z = \frac{camH}{\gamma - N'\left(\frac{x}{f}, \frac{y}{f}, 1\right)},$$

where N' is N transposed, (x,y) are the image coordinates, and f is focal length.

Figure 9:
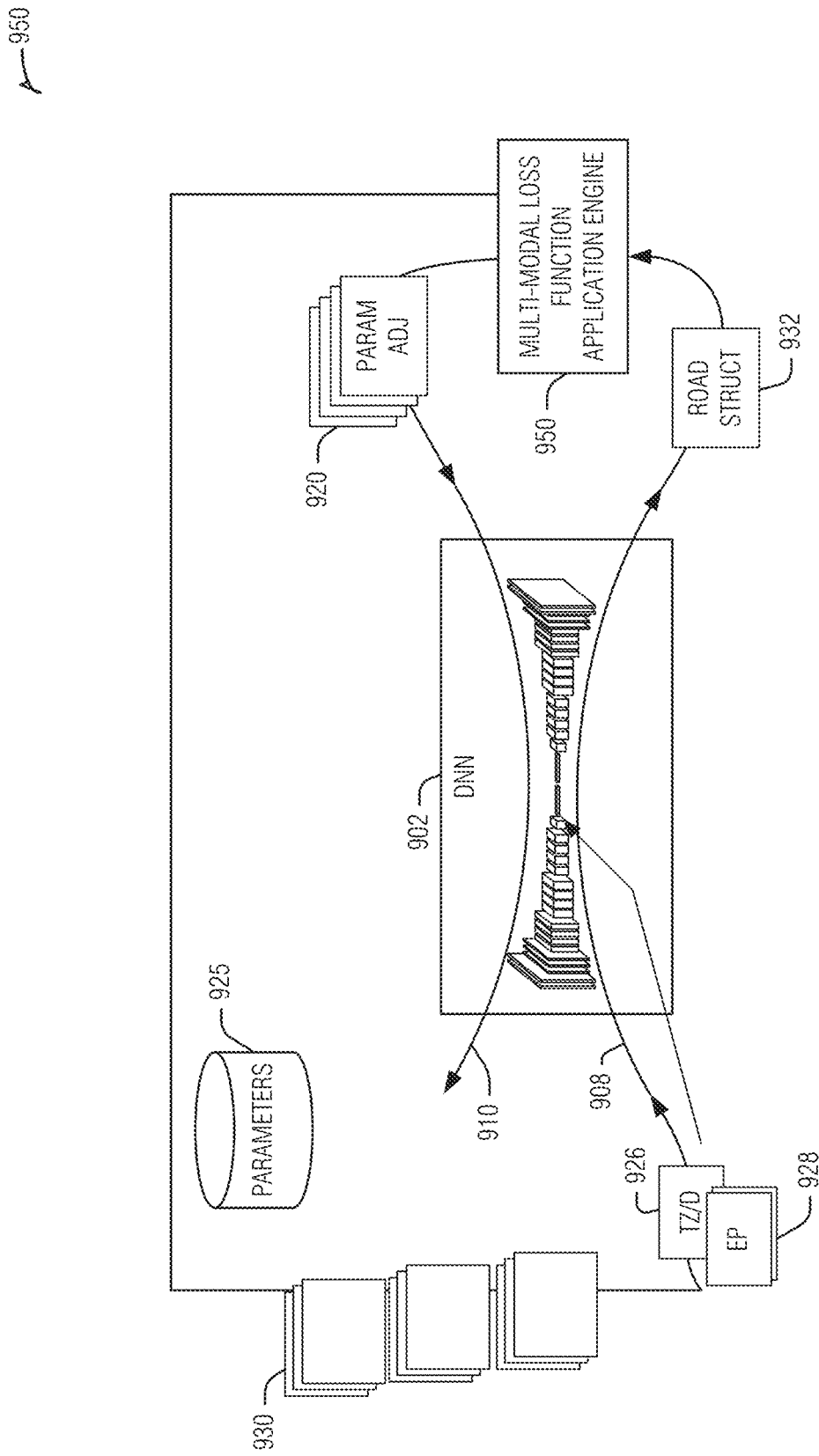
FIG. 9 illustrates an example of a DNN training system, according to an embodiment.

DNN training engine 550 is configured to train DNN 500 to produce an accurate determination of road structure 532 based on a set of training data. FIG. 9 is a diagram illustrating DNN training system 550 in greater detail. As depicted, DNN training system 550 includes DNN 902 having the same or similar architecture as DNN 500, and multi-modal loss function application engine 950.

FIG. 6 is a table detailing an example architecture of a DNN, according to an embodiment. As shown, each layer is described in terms of its operation type, connections (indicated as Input0, Input1, and Output0), number of output channels, and convolution/deconvolution architecture (including kernel width and step), as well as activation function and normalization type. Notably, layers having a second input indicated in the Input/1 column, and the identified second input source, have bypass connections.

The input to layer 1 the DNN of FIG. 6 includes a set of preprocessed images, indicated as "images" in the Input/0 column. Image-formatted epipole indicia, and image-formatted motion indicia are input to layer 8, as indicated by "epipole/motion" in the Input/1 column.

FIGS. 7-8 are tables detailing a more complex example architecture of a DNN, according an embodiment. Images are input to the DNN at layer 1 as indicated by "images" in the Input/1 column. Image-formatted epipole indicia, and image-formatted motion indicia are input to layer 9, as indicated by "epipole/motion" in the Input/1 column. Some layers (layers 44 and 49) have a third input for bypass connections, represented with the Input/2 column. In addition, certain layers of the example DNN of FIGS. 7-8 perform resizing operations, such as layers 22, 28, 34, 42, 47, and 52. Notably, layer 52 resizes the feature maps to the same size as the preprocessed images 330.

FIG. 9 illustrates an example of a DNN training system, according to an embodiment. Here, a multi-modal loss function application engine 950 is configured to supply training data 930 as input to DNN 902. Training data 830 may include various sequences of image frames captured by one or more vehicle-mounted cameras. The image frames may include video footage captured on various roads, in various geographic locales, under various lighting and weather conditions, for example.

Training data 930 may be accompanied by image-formatted motion indicia 926 and image-formatted epipole indicia 928 corresponding to respective portions of training data 930. Image-formatted motion indicia 926 and image-formatted epipole indicia 928 may be fed to an input layer that differs from the input layer for the image frames of training data 930 to match the structural and operational arrangement of the DNN 902. The inputs are advanced through DNN 902 along forward propagation path 908 to produce road structure 932 as the output of the DNN 902.

The DNN 902 may be initially configured with randomized values of computational parameters (e.g., weights, biases, etc.). The training process works to adjust the values of the computational parameters to optimize the output of the DNN 902, the road structure 932. The multi-modal loss function application engine 950 is configured to perform the parameter optimization. In an example, multiple different loss functions are used to determine accuracy of the output of the DNN 902. Multi-modal loss function application engine 950 produces computational parameter adjustments 920 for the various layers of DNN 902, which are instituted using back propagation along backwards propagation path 910.

In an example, computational parameter adjustments 920 for the various layers of the DNN 902 are collected and stored in computational-parameter data structure 925, which defines the training result of the DNN 902. In an example, the computational-parameter data structure 925 is passed (e.g., as part of the output of DNN training system) to a vertical contour detection engine, where it is stored as a computational parameter to configure a ML-based contour engine. In an example, inference engine training runs both on the current triplet and the future triplet to produce output_curr and output_future, respectively. The geometric loss may be combined with other losses from the output_curr, and propagated back to adjust the weights of the network and also the losses from output_future without the geometric loss are propagated to adjust the weights. In an example, the geometric losses of output_future may be ignored, with only the output_curr used for training.

Figure 10:
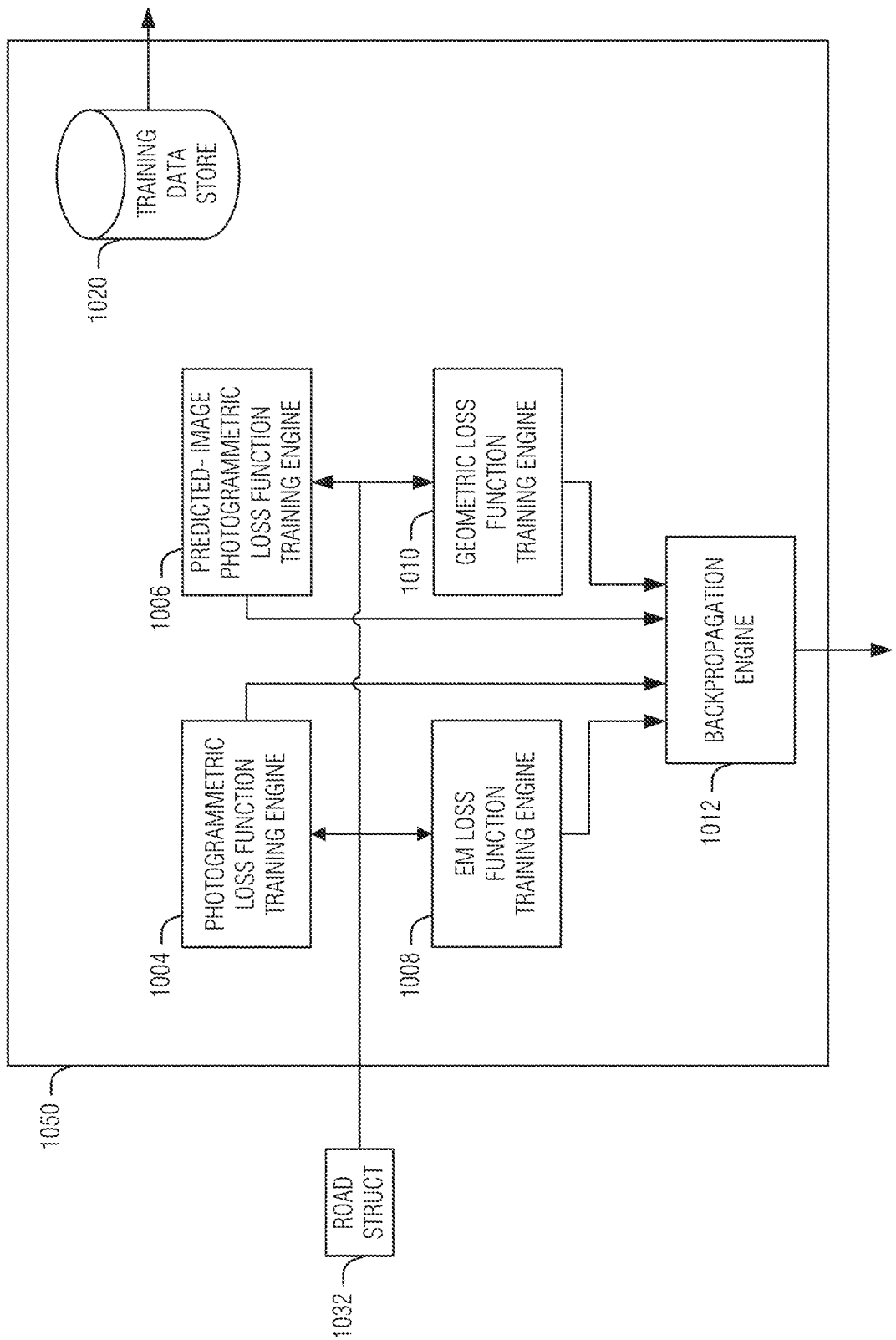
FIG. 10 illustrates an example of a multi-modal loss function application engine, according to an embodiment.

FIG. 10 illustrates an example of a multi-modal loss function application engine 1050, according to an embodiment. In the example depicted, the multi-modal loss function application engine 1050 includes four distinct loss function training engines: a photogrammetric loss function training engine 1004, a predicted-image photogrammetric loss function training engine 1006, an EM loss function training engine 1008, and a geometric loss function training engine 1010. In addition, the multi-modal loss function application engine 1050 includes a backpropagation engine 1012, and a training data store 1020. The loss function training engines 1004-1010 are configured to a compare a road structure 1032 against corresponding reference criteria, which are used in place of traditional "ground truth" values, to ascertain the error, or loss, in the accuracy of the road structure 1032.

In an example, actual ground-truth data (as in a traditional supervised machine-learning system) is not used. Instead, the images of training data are processed, along with additional available data such as ego-motion corresponding to the images, camera height, epipole, etc., to produce the reference criteria for evaluation of the loss functions. In a sense, because the reference criteria are based on the training data, this may be considered to be a type of unsupervised learning.

In an example, ground-truth data is available for the training data. As an example, ground-truth data may be provided by an additional measurement modality, such as three-dimensional imaging or scanning measurements (e.g., stereoscopic imaging, LiDAR scan, etc.). Accordingly, one or more loss functions may be based on the actual ground truth to provide a type of supervised learning.

The loss function training engines 1004-1010 may each contribute a component of an overall loss function used to train the DNN. The backpropagation engine 1012 may be configured to compute partial derivatives of the overall loss function with respect to variable computational parameters (e.g., weights, biases) to determine a direction of adjustment for each respective operational parameter using a gradient-descent technique. The backpropagation engine 1012 may apply the updated computational parameter values at each successive layer along the backward propagation path. The training data store 1020 may contain the training data, the image-formatted motion indicia, and the image-formatted epipole indicia to be applied to the appropriate input layer(s) of the DNN. In an example, the loss function is defined in terms of Tensor Flow primitive functions including complex combinations of such primitives. Once the loss is defined in this way, Tensor Flow may be used to compute the partial derivatives.

The photogrammetric loss function training engine 1004 is configured to generate reference criteria based on the set of image frames from the training data that were provided to the DNN in a forward propagation path. In an example, where a trio of images (current, previous, and previous-previous) is used as the input to the DNN, the gamma map produced as the road structure 1032 is used to warp the previous, and the previous-previous, images to the current image. Each warped image is corrected to compensate for the residual flow, and is compared against the actual current image.

The residual-flow compensation may be determined according to $$\mu = \frac{-\gamma * \frac{T_Z}{camH}}{1 - \gamma * \frac{T_Z}{camH}} * (\vec{p} - \vec{e})$$

where μ represents the residual flow, γ (gamma) is the road structure, the term $$\frac{T_Z}{camH}$$

represents the forward-direction ego-motion divided by the camera height, and the term $(\vec{p}-\vec{e})$ describes the plane of the road surface.

The image comparison may be computed using a suitable technique, such as normalized cross-correlation, summed absolute differences (SAD), binary descriptors distance, or the like, which may be applied to a patch of the image surrounding each pixel, according to:

$$compareImages\left(I_{curr}, I_w\left\{\mu_{\vec{e}, \frac{T_Z}{camH}}(\gamma), I_{baseline}\right\}\right)$$

where $I_{curr}$ is the un-warped current image, $I_w$ is the gamma-warped and residual flow-compensated previous (or previous-previous) image, and $I_{baseline}$ is the previous (or prev-prev) image before warping. In an example, object detection (e.g., vehicle detection, bicycle/pedestrian detection) is used to mask moving objects from the loss function to reduce detected motion between the compared images. The image comparison may include gray-level comparison between images.

In an example, the photogrammetric loss function training engine 1004 applies variable weighting to portions of the image comparison that correspond to road, and non-road features. Accordingly, the degree of differences between compared images found in non-road portions may be discounted.

The predicted-image photogrammetric loss function training engine 1006 is configured to perform a similar image warping, compensation, and comparison technique as the photogrammetric loss function training engine 1004, except that, in addition to using images that the DNN used to produce the road structure 1032, one or more "future" or "past" image(s) are included in the image-comparison processing. "Future" images are images that were captured later than the current set of images that are being used to train the DNN, and "past" images are those which were captured earlier. Accordingly, for future images, the loss function component provided by the predicted-image photogrammetric loss function training engine 1006 uses training data that is not available at run-time. Notably, the computed inference produces a gamma that works on images that the inference does not see as input.

The EM loss function training engine 1008 is configured to produce a loss function component based on comparing the road structure 1032 against "future" ego-motion representing the passage of the vehicle over the portion of the road corresponding to the road structure 1032. As an example, ego-motion indicative of a bump or hole in the road, in the absence of any indication in road structure 832 of any bump or hole, is a loss. In an example, upward or downward curvature may be used. In an example, EM may be extended over 20 m (e.g., up to 50 m). This may assist the DNN to properly model the long-distance shape of the surface from road structures even when parts of the road are too far away to calculate residual flow. Similarly, an absence of any ego-motion corresponding to a bump or hole, while the road structure 1032 predicts a bump or hole at that location (particularly, in the path of the vehicle's wheels), constitutes loss.

In an example, a low-pass filter or a damped-spring model with a 0.5 Hz frequency is applied to the road structure 1032 to model the damping effect of the vehicle's suspension as the vehicle passes over topography of the road. In another an example, where the suspension state of the vehicle is available, suspension information is considered together with the ego-motion to more accurately measure the vertical motion of the vehicle's wheel.

The geometric loss function training engine 1010 is configured to produce a loss function component using one or more sets of "future" training data including "future" image frames and corresponding "future" ego-motion. The "future" image frames represent captured images at a defined distance or time step ahead of (at a greater distance from, or captured later than) the current image frames used as input. For example, the "future" image frames and ego-motion may correspond to the next subsequent trio of captured images of training data. In another example, the "future" image frames and ego-motion correspond to 5 meters, 20 meters, or some other defined distance from the vehicle's position.

The reference criteria are based on a "future" road structure (e.g., gamma map), which is computed using the DNN. The geometric loss function training engine 1010 uses the "future" ego-motion to warp the "future" road structure to the current road structure 832, or to warp the current road structure 1032 to the "future" road structure using the "future" ego-motion.

In an example, the "future" road structure is warped to the current road structure 1032, and a first comparison is made therebetween, and the current road structure 1032 is warped to the "future" road structure, and a second comparison is made therebetween. The results of the first and the second comparisons may be combined (e.g., averaged) to produce an aggregated comparison, which is then used to determine the loss function for the geometric loss function training engine 1010.

Figure 22:
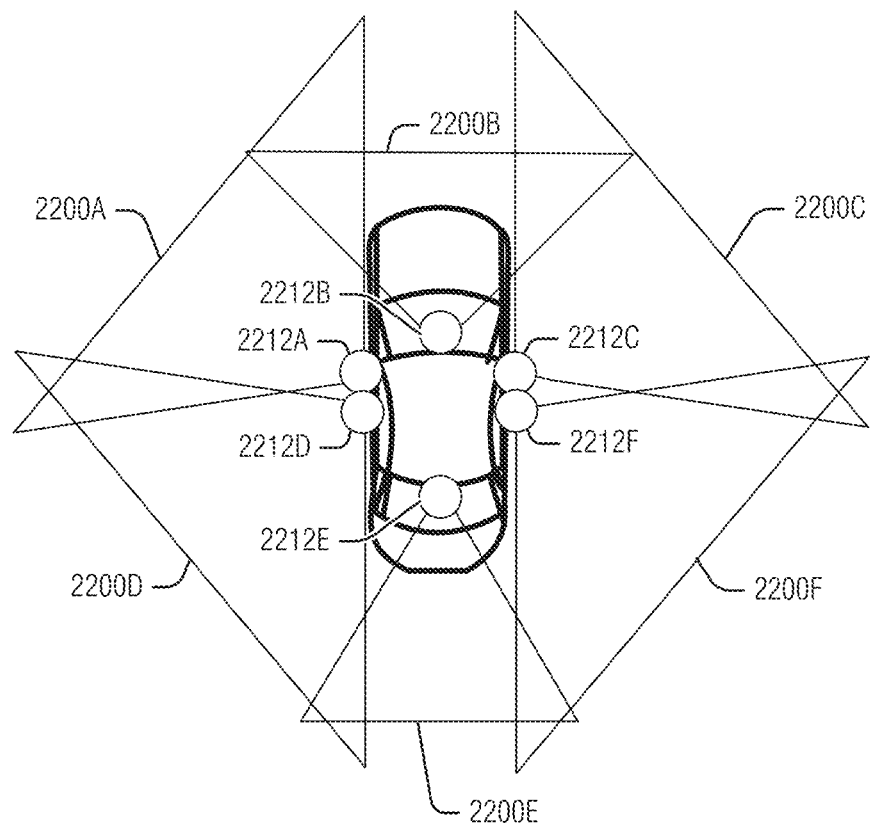
FIG. 22 illustrates a multiple-camera array on a vehicle, according to an embodiment.

In an example, where multiple cameras and overlapping fields of view are used, the related images from multiple views may be used to achieve geometric loss function training. For example, the "future" left and center images (at time t3) may be processed with a requirement that the gamma-warped images from time t3 are similar photometrically to center image at time t2. A future two pairs of images may be used to set the condition that the gamma inferred from those images is similar, after correcting for camera motion, to the gamma derived using images from times t1 and t2. In an example, a center main camera may be used together with one or more cameras mounted on the left or right corners of the vehicle roof which look forward and to the side. These side cameras may have a field-of-view wider than 90 degrees. The right camera field-of-view may significantly overlap the right field-of-view of the main camera and may have a field-of-view that extends backwards. The left camera may have a field-of-view that significantly overlaps the left field-of-view of the main camera and may have a field-of-view that extends backwards. This arrangement of cameras is shown in FIG. 22, where camera 2212B is the main camera, and cameras 2212A and 2212C are respectively the left and right side cameras. In an example, images from the corner cameras may be used in the training stage to compute the loss function without being used in the inference stage.

The loss function components contributed by two or more of the loss function training engines 1004-1010 are combined by the backpropagation engine 1012 into an aggregated multi-modal loss function that is used to train the DNN, for example, using a gradient descent technique to generate computational parameter adjustments.

Figure 11:
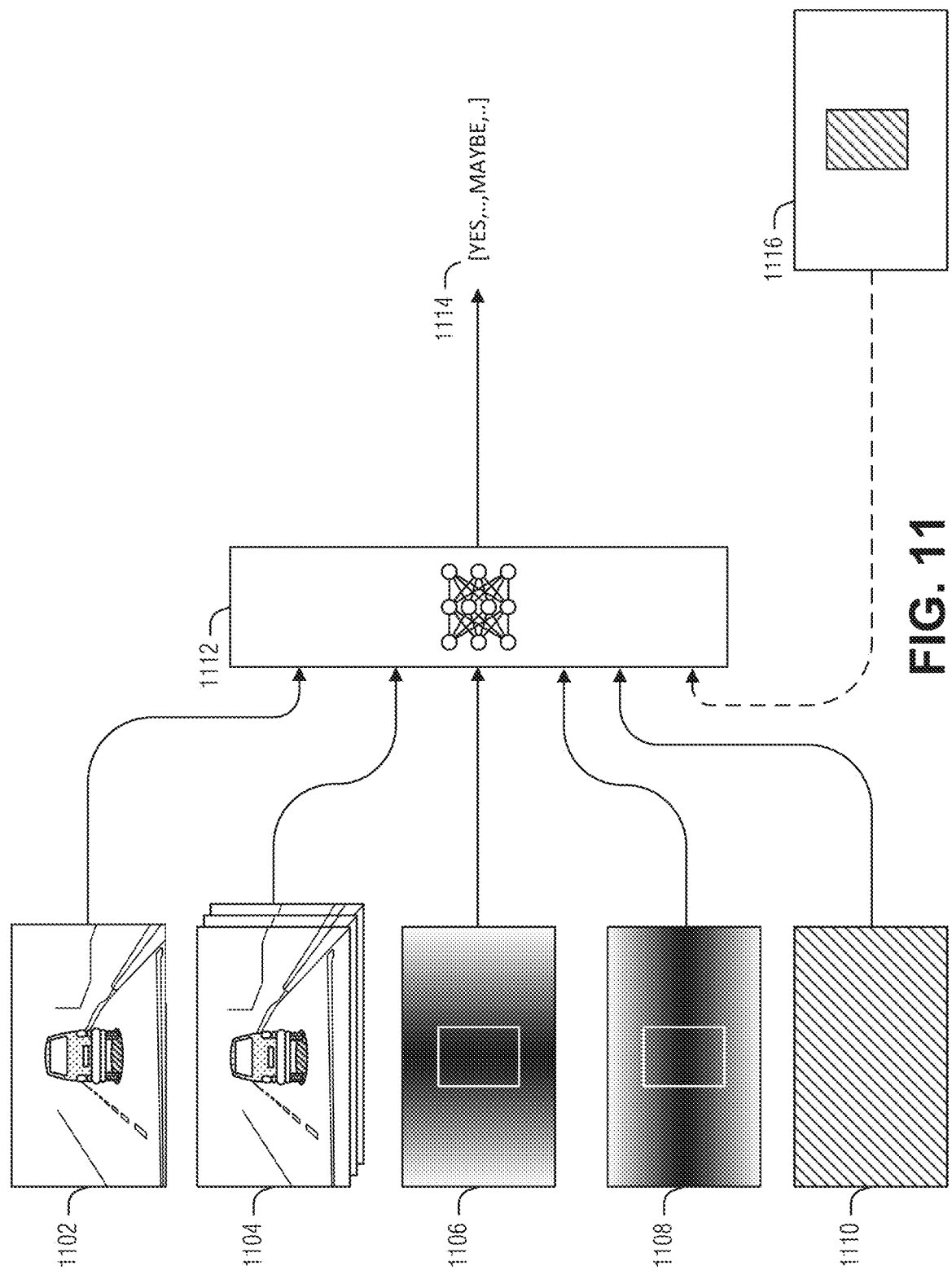
FIG. 11 illustrates an example of a neural network to produce a decision as to whether an object is moving, according to an embodiment.

FIG. 11 illustrates an example of a neural network 1112 (e.g., DNN) to produce a decision as to whether an object is moving, according to an embodiment. The neural network 1112 operates similarly to the neural networks described above, such as neural network 412. Input to the neural network 1112 includes a current image 1102, one or more previous images 1104, target location, and target size. Although the example illustrated in FIG. 11 uses a neural network 1112 to determine whether a target is moving, in an example, the moving target may be determined using the gamma aligning using the gamma from the network 412 described above and measuring residual motion with a heuristic technique. For example, if residual motion is detected at the base of a target of a known type such as a vehicle or wheels of a vehicle, then it may be concluded that the vehicle is moving As illustrated, the target location and size are inputted as images. Target location includes two gradient images in which pixel values represent a distance from the center of the target. Here, a horizontal gradient image 1106 (e.g., position x or $P_x$) and a vertical gradient image 1108 (e.g., position y or $P_y$) make up the target location input to the neural network 1112. These images include an outline of the target to illustrate the gradient's relationship to the target. The target size is represented here as an image in which all of the pixels have the same value (e.g., a constant value image) representative of the target's size. In an example, a mask 1116 (e.g., template) may be used to identify the target. In an example, the mask replaces one or more of the gradient images 1106 and 1108, or the size image 1110. Using a mask may reduce the amount of image data processed by the neural network 1112 in the case of a single target, for example. With multiple targets, the mask may cause the same portions of the input images to be processed multiple times, however, this may be mitigated if, for example, the mask is used later in the convolutional inference chain.

Output 1114 of the neural network 1112 is a category label of whether a target is moving, not moving, or "maybe" moving that represents an inability to determine whether an object is moving with a confidence threshold, for example. In an example, the category label is a real number valued score where a large value (e.g., above a first threshold) indicates moving, a low value (e.g., below a second threshold) indicates not moving, and in between the first and second threshold means maybe moving. The output 1114 may be single valued for one target inferences, or a vector (as illustrated) for multiple targets.

To handle multiple targets at once a vector of outputs may be generated. For example, eight outputs for up to eight cars in the image 1102 will cover most scenes. In an example, each vehicle is masked 1116 using a different label such as numbers from one to eight. Output 1114 at position i (e.g., $v_i$) will then correspond to the area masked by label i. If k<8 vehicles are detected, then the labels 1 to K are used, and vector values K+1 to * are ignored in training and inference stages. In an example, the output 1114 is singular, the neural network 1112 operating independently (e.g., serially) upon each target via the binary mask.

In an example, the input images 1102 and 1104 are aligned. In an example, the alignment is based on a homography. In an example, the alignment is based on a road surface alignment (e.g., gamma alignment). Image alignment simplifies the neural network 1112 training or inferencing by stabilizing points on the road surface, such as the contact point of wheels and the road of stationary vehicles. Thus, the neural network 1112 need only identify residual motion of a target to determine that it is moving.

Figure 12:
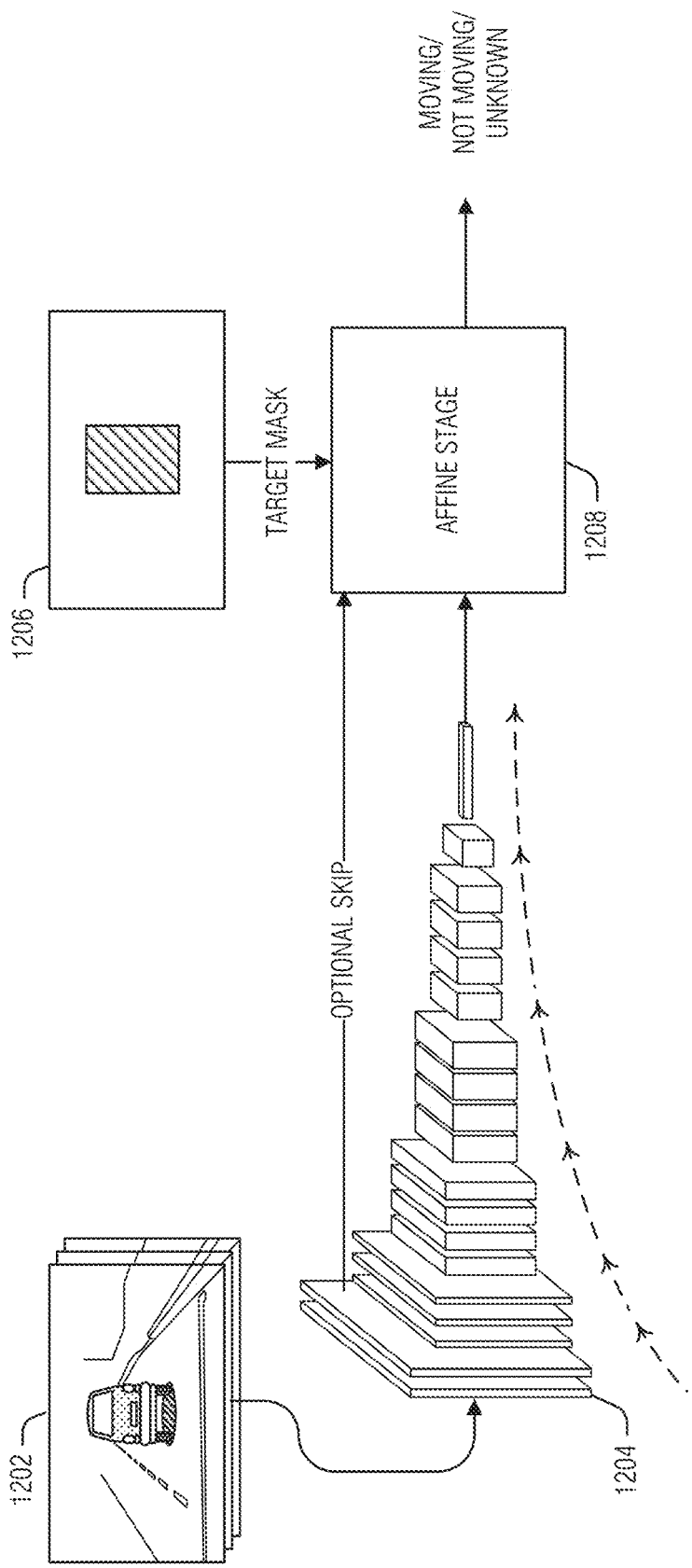
FIG. 12 illustrates an example of a convolutional neural network to produce a decision as to whether an object is moving, according to an embodiment.

FIG. 12 illustrates an example of a convolutional neural network 1204 to produce a decision as to whether an object is moving, according to an embodiment. Here, three or more input images 1202 may be used instead of two to provide more accurate results. Although many effective neural network structures may be used, illustrated here are convolutional stages 1204 followed by an affine stage 1205 that gathers information from the whole image 1202 into a single value (e.g., moving/not moving/unknown).

In an example, the convolution stages 1204 receive the images 1202 as three channels. The convolutional stages 1204 then reduce resolution of the images 1202 but increase the number of channels, which creates complex features. In an example, the target location may be introduced as a fourth channel in the first layer. In an example, the target location may be introduced later, such as in the bottleneck, or narrow part of the convolutional stages 1204—where there are many channels of small resolution—or at the affine stage 1208. There may be an advantage in introducing the target mask 1206 in a later stage for multiple targets. For example, the first part of the computation, up to the introduction of the target (e.g., mask 1206) may be performed once and the results used for all targets.

In an example, it is useful to have the original images 1202 as input to the affine stage 1208. This may be accomplished via a "skip" path. Although optional, this structure may improve performance classification performance.

Figure 13:
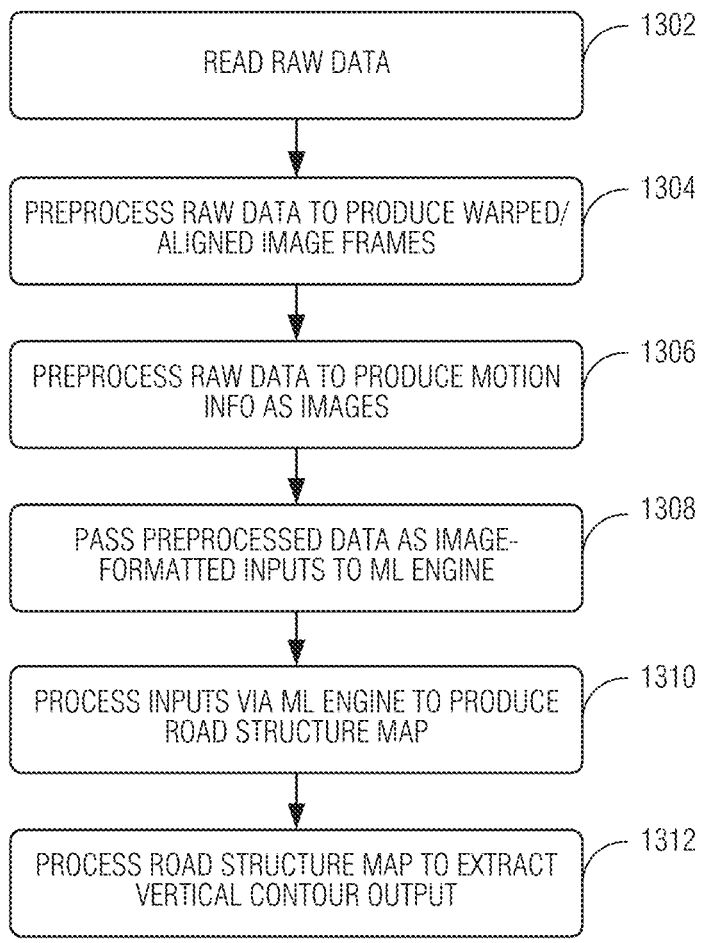
FIG. 13 is a flow diagram illustrating an example of a method for operating a vertical contour detection engine, according to an embodiment.

FIG. 13 is a flow diagram illustrating an example of a method 1300 for operating a vertical contour detection engine, according to an embodiment. The operations of the method 1300 are performed by computational hardware such as that described above or below (e.g., processing circuitry).

At operation 1002, raw data, including a sequence of two or more image frames, ground plane, and ego-motion data, as well as camera height information, is obtained (e.g., read or received). The image frames may include a current (e.g., most recently captured) image, and one or more previously-captured images. At operation 1004, the raw data is processed to determine a homography among the sequence of image frames with respect to the road plane. Some of the image frames may then be warped to align the road plane with another image frame of the sequence. The warping may be based on measured ego-motion and properties of the ground plane according to an example. The ego-motion may be measured motion, or it may be computationally determined from contents of the image frames. The warped image frames may include the current image frame, and one or more prior image frames warped to correspond to the current image frame. In another example, the current image frame, and one or more other frames, are warped to correspond to a non-warped earlier image frame.

In an example, the images are corrected for lens distortion, such as radial lens distortion, prior to being used by the DNN. This correction avoids training the DNN on a particular lens. Also, notably, focal length is not a component of the equation for gamma, allowing train on images from multiple different camera types.

At operation 1006, additional raw data is processed, including ego-motion data, ground plane data, and camera height data, to produce motion information (e.g., epipole), formatted as one or more images.

At operation 1010, the DNN is used to produce an inference. The DNN may perform convolution, non-linear activation, and pooling operations. In an example, de-convolution and un-pooling operations are performed. At various layers, trained computational parameters, such as weights or biases, are applied by operation of the DNN according to the pre-established training of the DNN. Operation of the DNN in inference mode produces a road structure map such as a gamma map as described above. Using such as DNN is capable of producing topography measurements that are accurate to within one centimeter (1 cm), or even half of a millimeter (0.5 mm) out to ten meters (10 m) from the vehicle while traveling up to fifty kilometers per hour (50 km/h or about 31 miles per hour).

At operation 1012, road contour information is extracted from the road structure map. Additional information may also be extracted from the road structure map, such as residual flow information, which may be further processed for related applications.

The road contour information may be passed to an autonomous or semi-autonomous vehicle control system that automatically adjusts some aspect of vehicle operation. For instance, a suspension control system may dynamically adjust the vehicle's suspension based on vertical contour data representing the vehicle's anticipated driving path. The suspension adjustment may involve dynamically varying stiffness of the suspension, or varying the height of individual wheels to conform to the vertical contour of the road.

In an example, the road contour information may be passed to a driving policy system. The driving policy system may use an environmental model to determine future navigational actions. The driving policy system may use the road contour information to select or determine navigational actions. An example of a driving policy system is RSS, which is described, for example, in International Application Publication No. WO2018/001684, which is hereby incorporated into the present application in its entirety.

Figure 14:
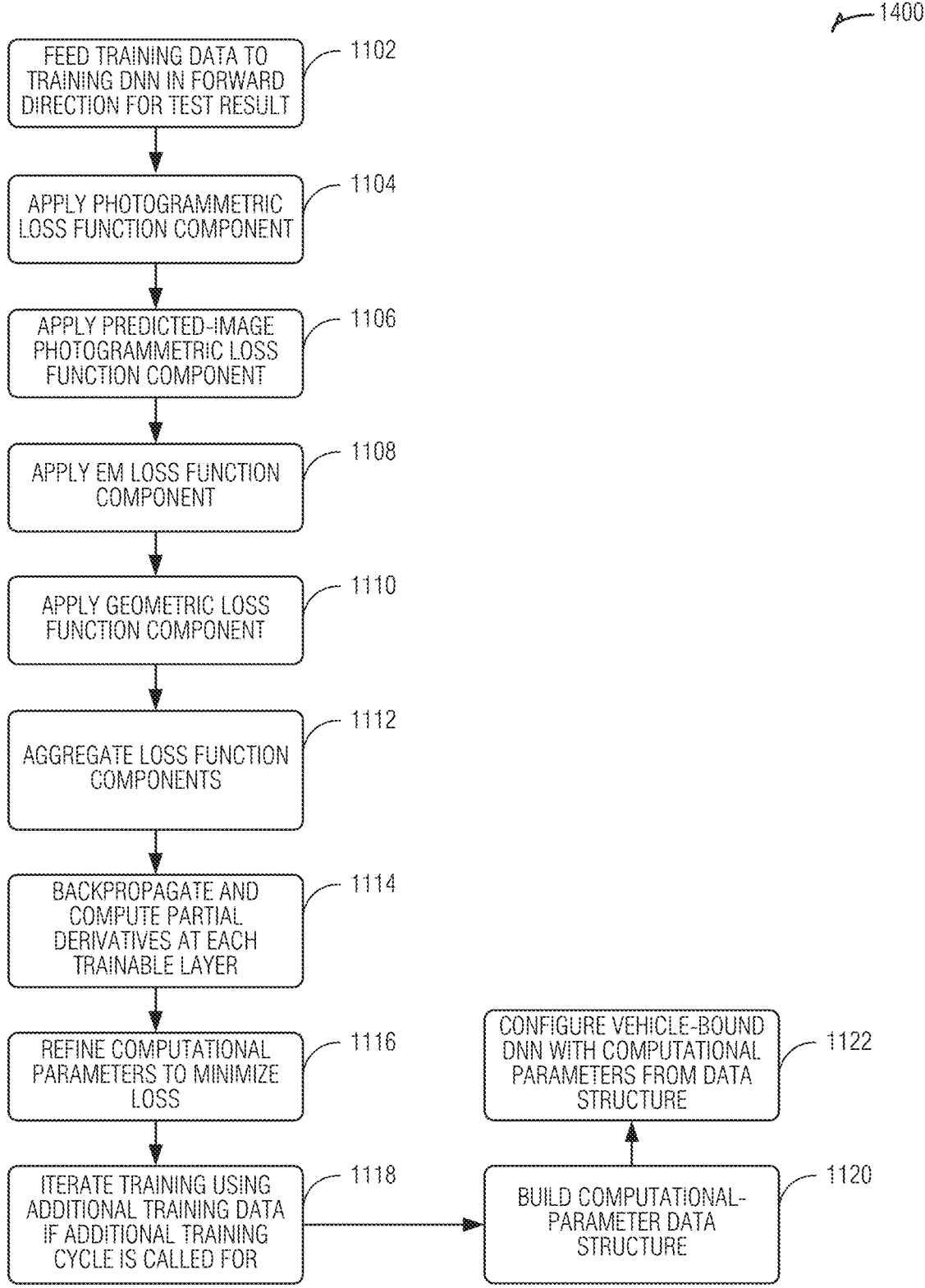
FIG. 14 is a flow diagram illustrating an example of a method for configuring a DNN for use in a ML-based contour engine, according to an embodiment.

FIG. 14 is a flow diagram illustrating an example of a method 1400 for configuring a DNN for use in a ML-based contour engine, according to an embodiment. The operations of the method 1400 are performed by computational hardware such as that described above or below (e.g., processing circuitry).

At operation 1402, training data is fed to a training DNN. The training data is forward propagated while the training DNN operates in its inference mode, to produce a test result as its output. The test result is compared against a loss function that has multiple components. At operation 1404, a photogrammetric loss function component is applied. The photogrammetric loss function component uses the test result to warp one or more of the previous images of the training data to the current image of the training data, and produces a loss based on a difference between the current and previous images. A normalized cross correlation function may be used on a patch surrounding each pixel to ascertain differences between the compared image frames.

At operation 1406, a predicted-image photogrammetric loss function component is applied. The predicted-image photogrammetric loss function component applies a similar technique as in operation 1404, except that additional training data (e.g., other than the training data used to generate the test result) is compared to the current and previous images following test-result-based image warping of images to facilitate the comparison. Any differences resulting from the comparison are addressed as an additional loss component.

Optionally, in operations 1404 and 1406, road features and non-road features may be given different weights for purposes of the comparisons and loss computations, with road features being weighed more heavily. In addition, known objects that move, such as vehicles and pedestrians, may be masked to reduce the detection of residual flow between the compared images.

At operation 1408, an EM loss function component is applied. The EM loss function component uses EM data corresponding to the vehicle's passing over the training data images that were processed to generate the test result, and compares the EM data against expected motion of the vehicle based on the test result to provide a loss component.

At operation 1410, a geometric loss component is applied. The geometric loss component uses a portion of the training data that was not used to generate the test result. Particularly, "future" images are processed by the training DNN to produce a "future" test result, as discussed above. The "future" test result is warped based on "future" EM to align with the test result or—alternatively or additionally—the test result is warped based on the "future" EM to align with the "future" test result, and a comparison is computed between the "future" and current road structure test results to provide an additional loss component.

At operation 1412, the loss function components are aggregated into a multi-modal loss function for gradient-descent computation. In an example, any two or more of the loss function components may be utilized. For instance, any of the loss function component combinations may be aggregated, as shown in the following table:

| Photogrammetric Loss | Predicted-Image Photogrammetric Loss | EM Loss | Geometric Loss |
|---|---|---|---|
| X | X | | |
| X | | X | |
| X | | | X |
| X | X | X | |
| X | X | | X |
| X | | X | X |
| X | X | X | X |
| | X | X | |
| | X | | X |
| | X | X | X |
| | | X | X |

At operation 1414, the aggregated loss function is back-propagated through the training DNN, with partial derivatives computed for the computational parameters at each trainable layer of the DNN. At operation 1416, the computational parameters for each trainable layer are adjusted based on the computed gradients of the loss function to minimize the loss. At operation 1418, the training process may be repeated using additional training data to further optimize the parameter values. Training iteration criteria may be applied (e.g., based on parameter convergence) following each backpropagation iteration to determine if an additional training cycle is called for.

At operation 1420, a computational-parameter data structure is built to contain the optimized computational parameter values for each layer of the DNN. The data structure may take any suitable form, such as a table, a linked list, a tree, a tagged format (e.g., extensible markup language) file, etc. At operation 1422, the computational-parameter data structure is used to configure a vehicle-bound DNN.

Figure 15:
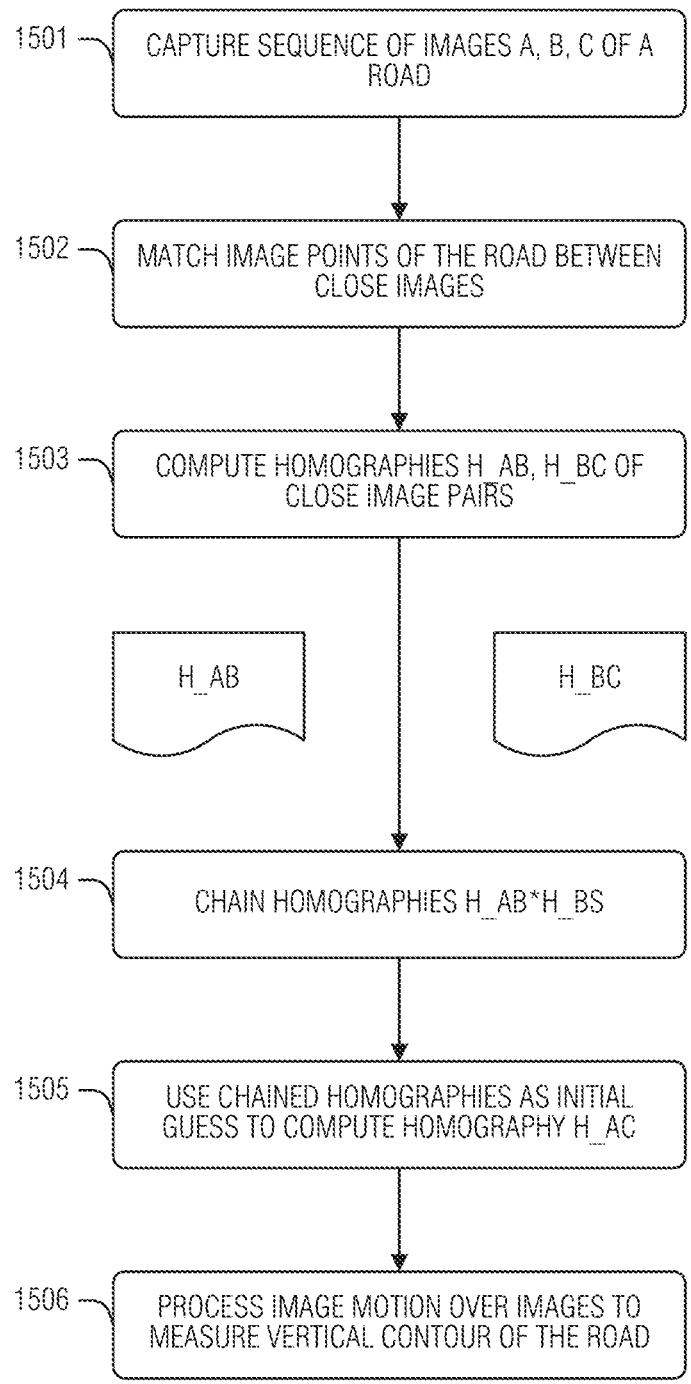
FIG. 15 is a flow diagram illustrating an example of a method for real-time measurement of vertical contour of a road while an autonomous vehicle is moving along the road, according to an embodiment.

FIG. 15 is a flow diagram illustrating an example of a method 1500 for real-time measurement of vertical contour of a road while an autonomous vehicle is moving along the road, according to an embodiment. The operations of the method 1500 are performed by computational hardware, such as that described above or below (e.g., processing circuitry).

At operation 1501, a sequence of image frames (e.g., a first image frame A, a second image frame B, and a third image frame C) of the same portion of a road in field of view of a camera are captured. Image points of the road in first image frame A are matched at operation 1502 to corresponding image points of the road in the second image frame B. Likewise, image points of the road in the second image frame B are matched at operation 1502 to corresponding image points of the road in the third image frame C.

Homographies of close image pairs are computed at operation 1503. At operation 1503, a first homography $H_{AB}$—which transforms the first image frame A to the second image frame B—is computed. The first homography $H_{AB}$ may be computed from matching image points of the road in the first image frame A and the corresponding set of image points of the road in the second image B. A second homography, $H_{BC}$—which transforms the second image frame B of the road to the third image frame C—may also be computed from matching image points of the road in the second image frame B and corresponding image points of the road in the third image frame C.

Figure 16:
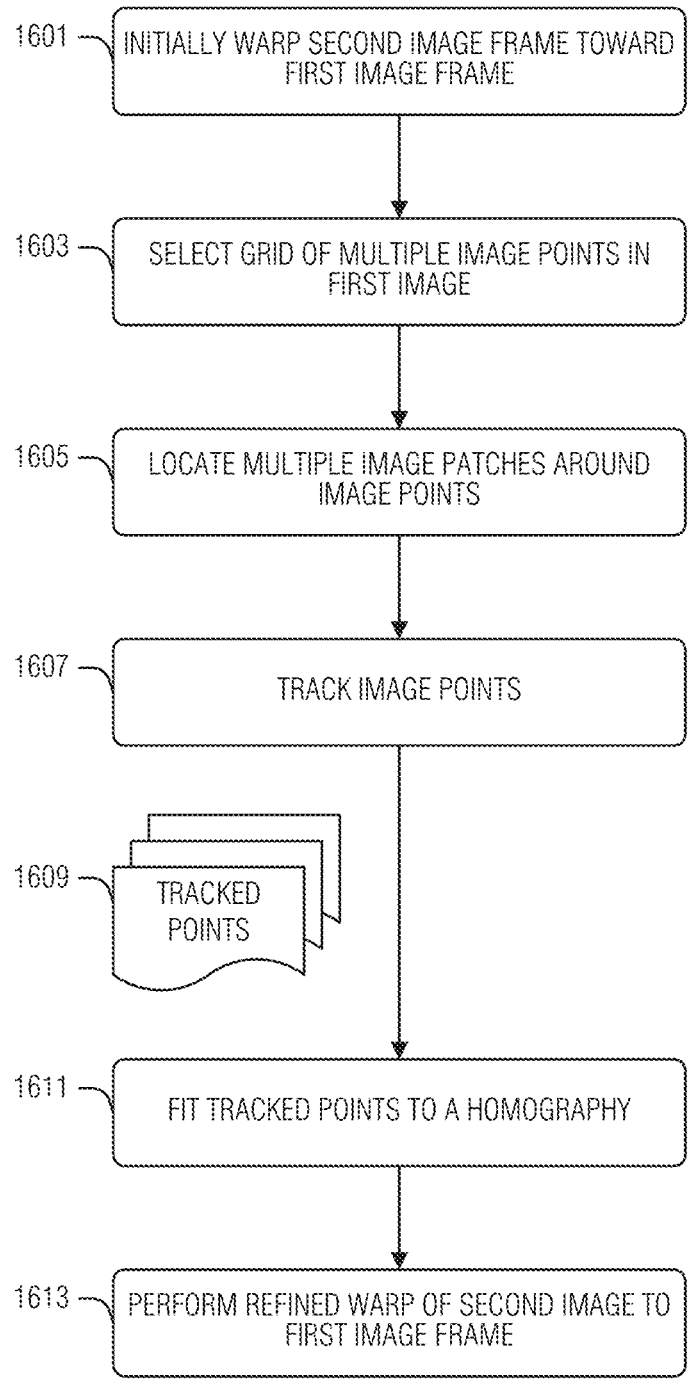
FIG. 16 is a flow diagram illustrating an example approach for processing residual flow over a sequence of images to measure a vertical contour of a road, according to an embodiment.

At operation 1504, the first and second homographies $H_{AB}$ and $H_{BC}$ may be chained, such as by matrix multiplication. By using the chained homography as an initial estimate (e.g., guess), a third homography, $H_{AC}$ may be computed at operation 1505, which transforms the first image of the road to the third image of the road. Residual flow from the first image frame A to the second and the third image frames B and C, respectively, may be processed at operation 1506 to compute a vertical contour in the road using the third homography, HAG FIG. 16 is a flow diagram illustrating an example approach, method 1600, for processing residual flow over a sequence of images to measure a vertical contour of a road, according to an embodiment. The operations of the method 1600 are performed by computational hardware, such as that described above or below (e.g., processing circuitry).

At operation 1601, an image frame is initially warped into a second image frame to produce a warped image. The term "warping" in the present context refers to a transform from image space to image space. The discussion below assumes that the road may be modeled as a planar surface. Thus, imaged points of the road will move in image space according to a homography. The warping may be based on measured motion of a vehicle (e.g., based on speedometer indicia, inertial sensors etc.).

For example, for a given camera at a known height, having a particular focal length (e.g., defined in pixels), and known vehicle motion occurring between the respective capture of the frames, a prediction of the motion of the points on the images of the road plane between the two image frames may be computed. Using a model of the almost-planar surface for the motion of the road points, the second image, is computationally warped towards the first image. The following Matlab™ code is an example implementation to perform the initial warp at operation 1601:

```
[h,w]=size(Iin);
Iout=zeros(size(Iin));
for i=1:h,
    for j=1:w,
        x=j;
        y=i;
        S=dZ/(f*H);
        x1=x(:)-x0;
        y1=y(:)-y0;
        y2=y1./(1+y1*S);
        x2=x1./(1+y1*S);
        x2=x2+x0;
        y2=y2+y0;
        Iout(i,j)=bilinearInterpolate(Iin,x2,y2);
    end;
end;
```

In this example, dZ is the forward motion of the vehicle, H is the elevation of the camera, and f is the focal length of the camera. The term p0=(x0; y0) is the vanishing point of the road structure.

In an example, the initial calibration values obtained during installation of the system in the vehicle, where x0 is the forward direction of the vehicle and y0 is the horizon line when the vehicle is on a horizontal surface, may be used.

The variable S is an overall scale factor relating image coordinates between the two image frames captured at different vehicle distances Z from the camera. The term "relative scale change" in the present context refers to the overall scale change in image coordinates dependent upon distance Z to the camera.

In an example, the initial warping operation 1601 transforms the second image based on rotation towards first image by a vehicle motion compensation factor. The vehicle motion compensation may be achieved based on rotational estimates or measurements of yaw, pitch and roll. These rotational estimates or measurements may be provided by inertial sensors, such as a tri-axial accelerometer configured to sense the yaw, pitch, and roll of the vehicle. The inertial sensors may be integrated in the camera, or may be mounted elsewhere on or in the vehicle. Rotational estimates may instead, or additionally, be obtained computationally from one or more previous image frames.

The initial warping at 1601 may further include adjustment for relative scale change between the first and second images. The relative scale change adjustment may be combined with the rotational transform into a single warp operation in which only one bilinear interpolation is performed.

In an example, if only pitch and yaw rotations are involved, these may be approximated by image shifts. For example, yaw may be approximated as a horizontal image shift of 60 pixels from the following equations:

$$\delta\Theta = \delta t \times yawRate$$

$$\delta\Theta_{Pixels} = \frac{f\delta\Theta * \pi}{180}$$

After the initial warping operation at 1601, the apparent motion of features on the road, referred to herein as residual flow, are approximated locally as a uniform translation of an image patch from an original image to a warped image. Residual flow is distinct from the actual vehicle motion-based difference between the original image and an unwarped image, where the motion of a patch also involves a non-uniform scale change.

In an example, instead of selecting feature points which would invariably give a bias towards strong features such as lane marks and shadows, a fixed grid of points may be used for tracking at operation 1607. Accordingly, at 1603, the grid of points may be selected from a trapezoidal region that roughly maps up to a defined distance (e.g., 15 meters) forward in the image, and having a width of approximately one lane (e.g., 2-3 meters). The points may be spaced at a defined interval (e.g., every 20 pixels in the horizontal direction and every 10 pixels in the vertical direction). Other selection schemes may be used with similar effect. For example, points may be randomly selected according to a particular distribution. In an example, three lines of eleven points located on the surface (e.g., road) are used. These lines are located at the center of the vehicle and two meters to each side of the center line.

Around each point in an original image, a patch is located at operation 1605. The patch may have a defined shape and size in each direction around a patch center point, for instance. For example, a patch may be a square of multiple pixels. In an example, other shapes, such as ellipses, rectangles, trapezoids, etc., may be considered as a patch. A normalized correlation is computed (e.g. using the Matlab™ function normxcorr2) for a warped image, where the patch center is shifted in the search region. In practical use there may be a yaw sensor but no pitch sensors; hence, a tighter search region may be used in the x direction rather than in the y direction. As an example, a search region of (2×4+1) pixels in the x direction, and (2×10+1) pixels in the y direction may be used.

In an example, the shift which produces the maximum correlation score is determined, and followed by a refinement search around the best-score position with a sub-pixel resolution (e.g., 0.1 pixels). This refinement step may provide superior results compared to fitting integer scores around the maximum score to a parabolic surface or spline and using these integer scores around the maximum score to compute a sub-pixel match.

Invalid tracks may be filtered out at the search stage by selecting those points with a score above a defined threshold (e.g. T=0.7), leaving tracked points 1609 as a result of tracking operation at 1607. The reverse tracking from the warped image to the original image gives a similar value in the opposite direction.

Tracked points 1609 as a result of tracking operation 1607 are fit to a homography at operation 1611 using a suitable technique such as RANdom SAmple Consensus (RANSAC). A set of points are chosen at random (e.g., 4 points) and used to compute the homography. Points 1609 are then transformed using the homography and the set of points which are closer than a defined threshold are counted. Randomly choosing the set of points and counting the number of points which are closer than a threshold is repeated many times and the four points that gave the highest count are retained.

At 1613, the four best points are used to again transform the points and all the points (inliers) that are closer than a (possibly different) defined threshold to compute a homography using a least squares technique, for example. The rest of the points that are not closer than the threshold are considered outliers.

At this stage in the process, the number of inliers and their spread in the warped image are informative as to the success of finding the road plane model. It is common to have more than 50% inliers and a good fit. The homography may then be used to correct the initial alignment warp at operation 1601. Correction of the initial alignment warp may be done by integrating the correction into the initial warp at operation 1601 or to do the two warps consecutively. The former is advantageous as it requires only one interpolation step and may be performed optionally by matrix multiplication of the two homography matrices.

In an example, robust tracking after pre-warping is applied to compute a homography. This may be used to derive an ego-motion and a plane estimate to adjust the previous plane estimate. The ego-motion and adjusted plane model are combined to obtain the homography. In an example, the ego-motion may be provided by an ego-motion sensor and processing engine. This type of engine uses robust tracking of points on the road and the points above the road using an essential matrix. It also combines any inertial sensors and speedometer information available. The ground plane information is provided by a ground-plane engine. This engine tracks points on the road (after a pre-warp) and then uses the computed ego-motion to derive the depth to each point, which produces the 3D coordinates of the points. Thereafter, a planar surface is algorithmically fit to the 3D points. In an example, a default plane—such as one derived from an initial calibration of the camera location in the vehicle—may be used. The ego-motion and planar surface are combined to provide a homography.

In an example, parametric models of the road surface may be used. For example, a 3D spline model may be provided by a communicatively-coupled driving-path geometry or object-sensing subsystems. As an example of one such subsystem, a Road Experience Management™ (REM™) engine manufactured by Mobileye, a subsidiary of Intel Corporation, may provide representations of road features in the form of 3D splines. Additional details of REM may be found in U.S. Pat. No. 9,665,100, and International Patent Publication Application No. WO 2018/200522 A1, the entirety of both being incorporated herein by reference. For instance, lane marks may be represented as 3D splines. The subsystem aligns 3D-spline feature representations to the images. The 3D spline feature representations may be projected back onto the captured images of the road for further processing.

Each point from the 3D splines has a 3D coordinate. One way that this data may be used, according to an example, is by interpolating and extrapolating the 3D positions associated with the 3D splines along rows of the captured image. Extrapolation to the sides may be zero order hold (i.e. constant), first order hold (e.g., linear extension based on two splines), etc. In an example, the interpolation may occur with the known extension of certain splines to virtual image coordinates that lie outside of the image itself.

The interpolation and extrapolation may produce 3D coordinates for all points in the lower part of the image. These points may be on a smooth 3D surface. In turn, the surface may be used to warp the previous images towards the current image (or vice-versa). This warping may be performed both, in training, and in inference, stages.

Figure 17:
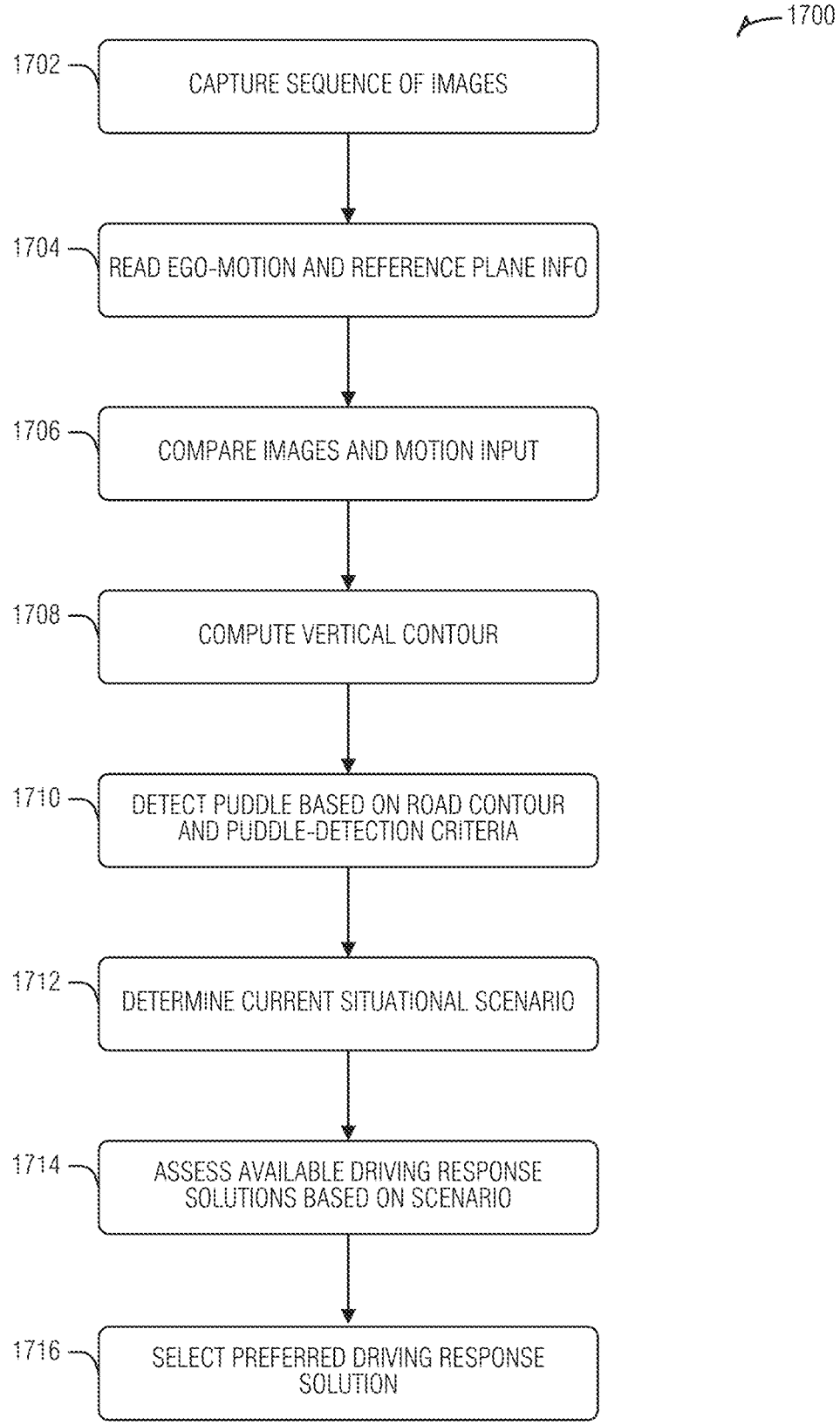
FIG. 17 is a flow diagram illustrating an example of a method for puddle detection and responsive decision-making for vehicle control, according to an embodiment.

FIG. 17 is a flow diagram illustrating an example of a method 1700 for puddle detection and responsive decision-making for vehicle control, according to an embodiment. The operations of the method 1700 are performed by computational hardware, such as that described above or below (e.g., processing circuitry).

At operation 1702, a sequence of images is captured by one or more cameras. At operation 1704, ego-motion and reference plane information are received or measured. As discussed above, ego-motion information may be provided from inertial sensors, possibly in combination with data from the vehicle's speedometer. Ground (e.g., reference)

plane information may be based on the fixed height of the camera, and may be stored as a defined constant value as one of the configuration or calibration parameters.

At operation 1706, the images are processed, along with the actual motion measurements, to determine the residual flow between the images. The residual flow represents differences detected from a comparison between (a) the predicted changes in appearance of the road surface among the sequence of images due to the actual motion of the vehicle, and (b) actual differences between the images of the sequence, as captured. These differences may be further interpreted as vertical contour, including such things as protrusions (bumps), and depressions (sunken portions, or holes). At operation 1708, the vertical contour of the road may be computationally determined based on the processed images using any of the techniques described above, or another suitable image processing-based technique.

These techniques use gamma or another form of structure to determine the vertical contour. In an example, the structure may be determined from residual flow. In an example, a neural network, such as that described above with respect to FIG. 4, may determine the structure directly. After gamma is determined, the images are warped according to gamma to determine residual flow. Although various optical flow techniques may be used, an alternative also exists; using a second neural network trained using only a photogrammetric loss between two or more frames. When confronted by such a reflective surface as a puddle, the first neural network will produce an almost flat gamma because it ignores moving reflections in the puddle. The second neural network—trained to map photogrammetric loss, produces a large hole in the road for the puddle. Comparing the two outputs gives the criteria for a puddle.

Efficiency is an advantage obtained when comparing the output of the two neural networks—operating directly on the input images to respectively produce gamma and photogrammetric loss—over computing gamma and then a residual flow. Performing a gamma warp may be computationally expensive and may also introduce is some sequential constraint that could impair the ability to parallelize the process. Because the first and second neural networks likely include several of the same layers, a very efficient implementation may combine the two networks, training a single neural network with two channels of output: one the photometric only gamma map; and the second with combined photometric and geometric neural network. Reflective surfaces, such as puddles, may be detected by comparing the gamma in the two channels. In an example, the two neural networks share parts of a network, and split otherwise. for example, the first and second neural networks may share the same structure up until a bottleneck and diverge afterwards.

In an example, the first and second neural networks are both trained to output structure (e.g., gamma or Z) maps, however each is trained with a different loss function. In an example, the difference in the loss functions is a difference in weighting of two different types of losses. In an example, the losses are one or more of photometric, geometric, EM, or future image losses. Combining the two outputs may be used to detect moving objects, reflections, or transparencies.

This is in fact a general method for detecting reflective or specular surfaces using a neural network. It may be applied to a neural network trained to determine the Z, or $\frac{1}{Z}$, and then detect reflective surfaces on the sides of vehicles or buildings (e.g., windows) among other things. An interesting use of this technique is the detection of mirrors installed at blind intersections. Once the mirror surface has been detected, it may be analyzed for detection of vehicles and pedestrians in the reflected image, enable the vehicle vision system to use mirrors to avoid incident. For example, if a pedestrian or vehicle is detected in the intersection mirror, the host vehicle may wait till the vehicle or pedestrian appears in view of the cameras or otherwise modify its navigational actions. To detect reflections on moving objects, a moving stereo arrangement may be implemented using the main and corner cameras. Here, a neural network may be trained to infer depth from the stereo images using photogrammetric constraints and using stereo pairs over time to add the geometric constraints.

The differences between the predicted and actual changes in images due to the actual motion may further represent moving objects (e.g., other vehicles, pedestrians, bicycles), moving shadows, and reflections. Thus, in an example, the presence of one or more puddles is computationally determined based on the vertical contour information and on additional puddle-detection criteria in operation 1710. The method 1800 provides an example of operation 1710.

At operation 1712, the current situational scenario is determined. The current situational scenario represents the current road conditions, vehicle motion, and surroundings. In an example, the situational scenario may be obtained from any one or more of the following: data obtained from sensors onboard the host vehicle, a model of the road and its surroundings obtained from a map, data communicated to the host vehicle from a remote server, from nearby target vehicles, or smart infrastructure objects. The method 1900 provides an example of operation 1712.

At operation 1714, the available driving response solutions are assessed based on the current situational scenario. The driving response solutions in this example are specific to responding to the detected presence of the puddle. The method 2000 provides an example of operation 1714. At operation 1716, a driving response solution is selected based on assessment of various driving response options. Notably, the driving response solution may forgo taking any evasive or other action.

Figure 18:
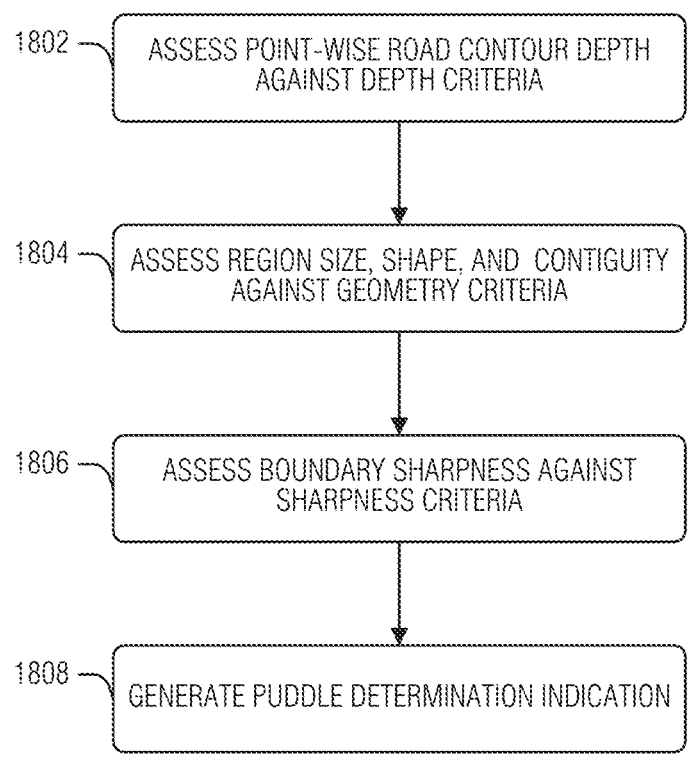
FIG. 18 is a flow diagram illustrating an example of a method for computationally determining the presence of one or more puddles based on vertical contour information and on additional puddle-detection criteria, according to an embodiment.

FIG. 18 is a flow diagram illustrating an example of a method 1800 for computationally determining the presence of one or more puddles based on vertical contour information and on additional puddle-detection criteria, according to an embodiment. The operations of the method 1800 are performed by computational hardware, such as that described above or below (e.g., processing circuitry).

At operation 1802, point-wise vertical contour data, which may be represented in the format of an image (e.g., pixels having values representing the road surface height), is assessed against depth criteria. For example, points (e.g., pixels) on the road appearing as a deep hole (e.g., exceeding a defined minimum depth threshold, exceeding a defined maximum height variance from neighboring points, etc.) may be tagged or otherwise associated with indicia of possible membership in a set of points belonging to a puddle. As an example, the depth criteria threshold may be on the order of 50 cm-1.5 m, or even much larger.

At operation 1804, a region of points meeting or exceeding the depth threshold in a given vicinity is assessed against geometry criteria. In an example, the geometry criteria define spatial features of a potential puddle region. For instance, such features as region size, region shape, and contiguity of points meeting or exceeding the depth criteria in the region may be considered. For example, the size or shape criteria may specify a minimum surface area, or minimum length or width dimension of the region for the region to be considered a potential puddle. The contiguity criteria may specify a minimum extent of contiguity (e.g., adjacency of points in the region, or maximum distance between neighboring points meeting the depth criteria).

At operation 1806, the boundary sharpness of the potential puddle region is assessed against sharpness criteria. The sharpness assessment may operate to discriminate puddles, which tend to have sharp boundaries, from moving shadows (also a cause of residual flow in the image analysis operations), which tend to have soft boundaries. As an example of sharpness criteria, two factors may be applied: (1) a minimum threshold for negative residual flow (or depth of road-surface depression) to be applied against points inside the suspected puddle region near the boundary, and (2) a maximum limit of residual flow (or flatness of road surface as aligned with the reference road plane) to be applied to points just outside the suspected puddle region boundary.

At operation 1808, based on meeting, or failing to meet, the various criteria at operations 1802, 1804, and 1806, an indication of a puddle determination is generated.

Figure 19:
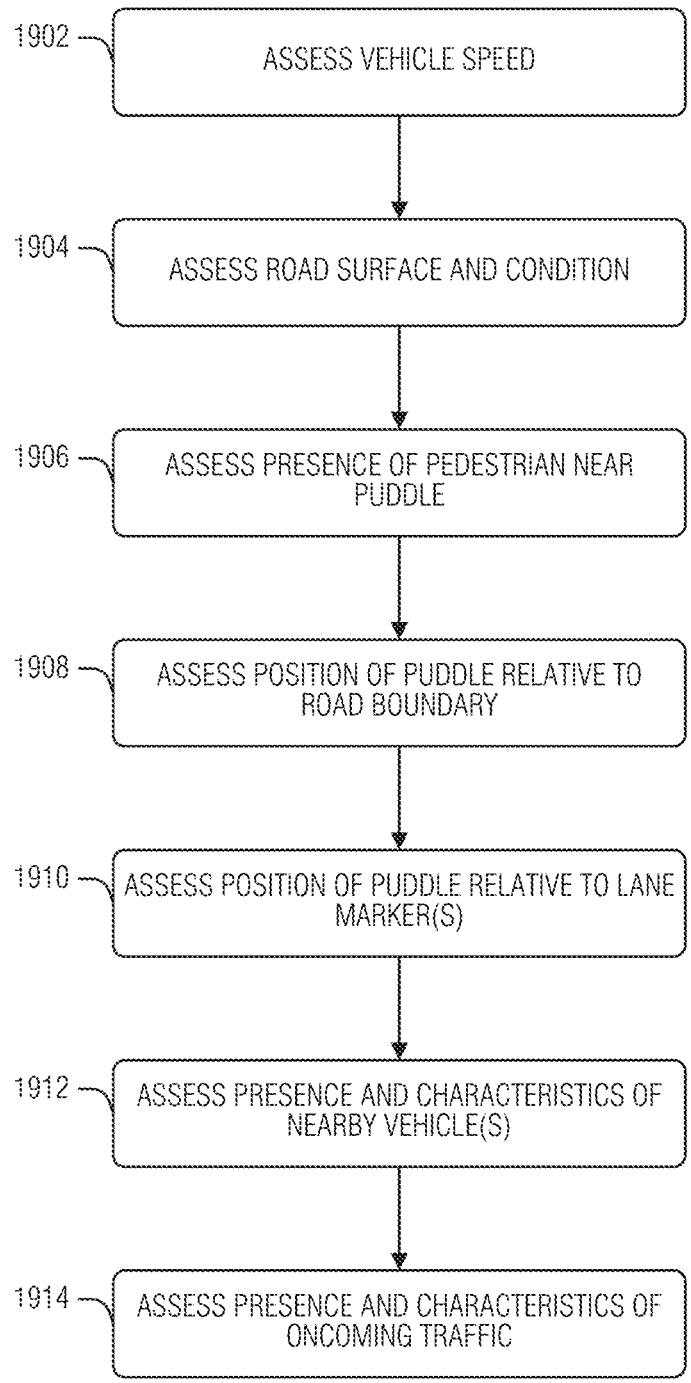
FIG. 19 is a flow diagram illustrating an example of a method for computationally determining a current situational scenario for an autonomous vehicle, according to an embodiment.

FIG. 19 is a flow diagram illustrating an example of a method 1900 for computationally determining a current situational scenario for an autonomous vehicle, according to an embodiment. The operations of the method 1900 are performed by computational hardware, such as that described above or below (e.g., processing circuitry).

At operation 1902, vehicle speed is assessed. This assessment may be obtained from the speedometer or vehicle control system, for example. At operation 1904, the road surface and road condition are assessed. These assessments may include determining the quality of traction or degree of slipperiness of the road surface. For instance, the road type may be selected from among poured pavement, stone, dirt, gravel, etc. The road surface may be determined based on cartography data, measured vehicle performance (e.g., wheel slippage and lateral motion in relation to steering angle and velocity), or on some combination of such factors. The road condition may be determined from among various categories, such as dry, wet, snowy, icy, dusty, covered in fallen leaves or other debris, etc. The road condition may be estimated based on weather-report data, measured vehicle performance, or a combination of such factors. The assessment at 1904 may be available from another engine of the autonomous vehicle control system. The vehicle speed and road quality and condition assessments at 1902 and 1904 may be used to computationally determine maneuvering limits as part of determining suitable driving response solutions.

In an example, maneuvering limits may include two or more sub-categories of limits. Such sub-categories of limits may include, for example, safety maneuvering limits, which may be associated with sharp or forceful maneuvers (compared to maneuvers in other sub-categories), and comfort maneuvering limits, which may be associated with mild or more gradual maneuvers which typically allow a higher level of comfort for passengers in the vehicle, and possibly to other users of the road and/or to other persons (or animals) in the environment of the vehicle.

At operation 1906, the presence and positioning of any pedestrians in the vicinity of the puddle are assessed. Pedestrians in the current context include people outside of a vehicle, such as people walking, bicycle riders, people in wheelchairs or strollers people seated near the roadside, etc. This pedestrian assessment may be based on information supplied by an object-recognition engine that is part of the autonomous vehicle control system and configured to detect people. Operation 1906 may further assess whether any detected pedestrians are within the vicinity (e.g., within "splash range") of a detected puddle. The pedestrian assessment may be used to computationally determine the degree of preference for taking evasive action in the control of the autonomous vehicle to avoid splashing the pedestrian. In an example, the splash range may be predefined, such as a certain distance from the center or edges of a puddle. In an example, the splash range may be estimated, such as based on the size of the puddle, the speed of the vehicle, etc.

In an example, the presence and positioning of other vehicles (including bicycles and motorcycles, for example) may be assessed. The splash range assessment may be used to determine whether the oncoming vehicle (from any direction) will enter the splash range of the host vehicle in a manner which may impede visibility for the oncoming vehicle. Similarly, the splash range assessment may be used to determine whether the host vehicle will enter the splash range of the oncoming vehicle in a manner which may impede visibility for the host vehicle. The splash range assessment may make use of various characteristics of the host vehicle or of the oncoming vehicle to assess the splash range and its effects on the vehicles involved. The vehicle detection and assessment may be used to computationally determine the degree of preference for taking evasive action in the control of the autonomous vehicle to avoid splashing the oncoming vehicle or to avoid being splashed by an oncoming vehicle.

At operation 1908, the position of the detected puddle is assessed relative to the road boundary. Similarly, at operation 1910, the position of the detected puddle is assessed relative to any lane markers on the road. The assessments at operations 1908 and 1910 may be used in an evasive action determination to decide whether, and where, the autonomous vehicle may be steered to avoid the puddle or reduce or minimize any splashing.

At operation 1912, an assessment of the positioning and movement characteristics of nearby vehicles, such as those traveling in the same direction as the autonomous vehicle, is made.

At operation 1914, an assessment of the presence and movement characteristics of any oncoming traffic is made. The movement characteristics of the nearby or oncoming traffic may include such factors as the longitudinal distance, the lateral distance (e.g., current lane positioning), closing speed, predicted changes in movement (e.g., lane changes, speed changes, turns), etc. The assessments at operations 1912 and 1914 may be available from the autonomous vehicle's traffic sensing/detection or control systems. These assessments of the nearby and oncoming vehicular traffic may be used in an evasive action determination to possibly limit the autonomous vehicle's avoidance of the puddle to maintain safety.

Figure 20:
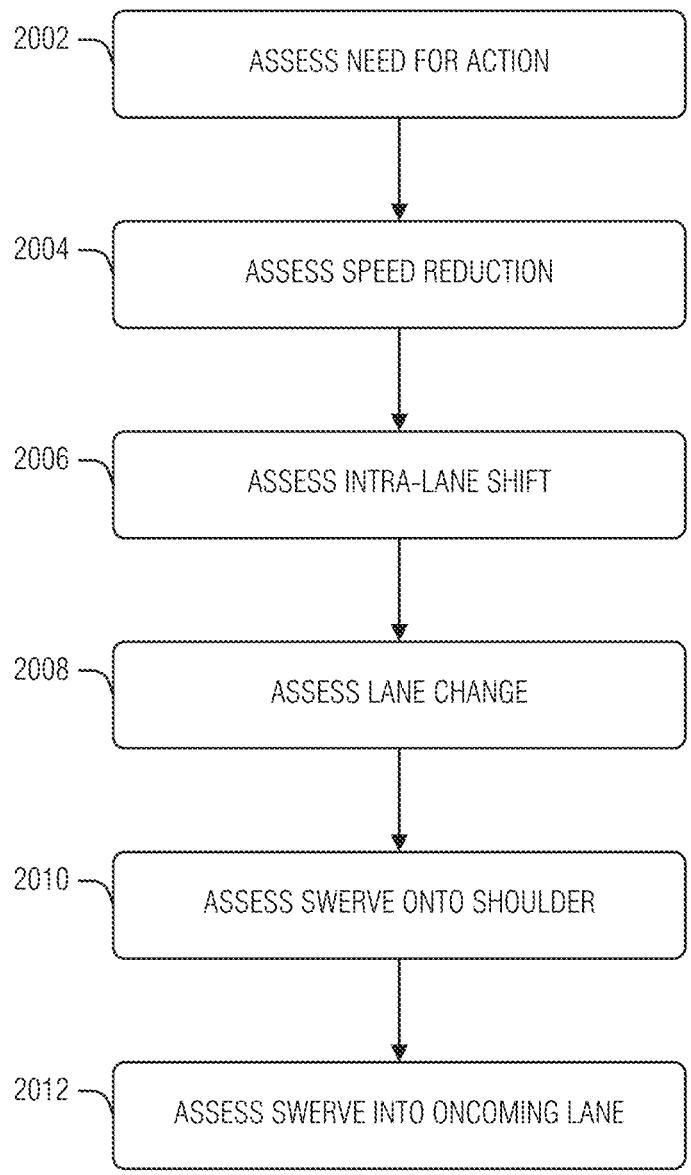
FIG. 20 is a flow diagram illustrating an example of a method for computational assessment of available driving response solutions that may or may not be selected for responding to detection of a puddle, according to an embodiment.

FIG. 20 is a flow diagram illustrating an example of a method 2000 for computational assessment of available driving response solutions that may or may not be selected for responding to detection of a puddle (or other reflective surface), according to an embodiment. The operations of the method are performed using computational hardware, such as that described above or below (e.g., processing circuitry).

At operation 2002, the need for action in response to detection of a puddle is assessed. The need for action depends on whether the puddle is in the path of the autonomous vehicle, particularly, in the predicted path of at least one of the vehicle's wheels. The need for action may further depend on the presence of any pedestrians in the vicinity of the puddle. In some implementations, the need for action may also depend on preferences of the vehicle's operator.

For instance, in an example embodiment, there may be varying degrees of need for driving response in response to puddle detection. The following table illustrates several examples of situations calling for different degrees of need or preference for puddle response. Various situations are presented with corresponding risk score increment values. A risk score increment represents a corresponding contribution of each situation to a computed risk assessment.

| Situation | Cause for Avoidance | Consequence of Non-Response | Risk Score Increment |
|---|---|---|---|
| Puddle primarily along edge of road, | Potential for splashing self | Dirtied vehicle | +1 |
| Pedestrian present near puddle | Potential for splashing pedestrian | Impolite autonomous behavior | +2 |
| Puddle away from edge of road | Potential for wheel falling in pothole | Damage to vehicle, course disruption | +3 |
| Puddle across major part of road | Possible severe damage or washout of road | Severe damage to vehicle, safety risk to occupants | +10 |
| Puddle size below defined threshold | — | — | −5 |

In these examples, a puddle primarily at the edge of the road (e.g., having an elongated shape conforming to the road boundary) may be presumed to be caused by run-off from the road slope and not primarily due to a pothole. This type of puddle may splash the vehicle itself or a nearby pedestrian. A puddle that is away from the edge of the road may splash the vehicle or a pedestrian, but it may also be due to a pothole, which may cause additional harm, such as damage to the tires, wheels, suspension, undercarriage, or other portion of the vehicle. A large pothole also has the potential for knocking the vehicle off its course if the vehicle is traveling at high speed. A very large puddle across a major part of the road may be due to a dip in the road's surface in which the water accumulated. This type of puddle may mask a serious road hazard, such as a washout. A very large puddle covering much of the road surface may also have a depth that may cause a severe vehicle loss of control, such as due to hydroplaning, or extreme depth that exceeds the vehicle's engine air intake's height.

The presence of a pedestrian may be considered as an aggravating factor to striking a puddle at speed. In some cases, the presence of a pedestrian does not present a safety risk—rather, it presents a preference for operating the autonomous vehicle politely in accordance with social norms. Thus, the risk increment associated with a pedestrian is more than the risk increment associated with soiling the vehicle, but less than the risk associated with striking a potential pothole.

The last row in the table above presents a mitigating factor, for example, a size determination of the puddle that is below a defined threshold. For instance, if no dimension of the puddle exceeds 10 cm, the puddle may be considered as being too small to cause a significant splash or pothole-associated harm.

Operations 2004-2012 of method 2000 relate to assessment of various types of driving responses. Each assessment may be based on a variety of criteria that take into account such factors as:

1. The effectiveness of the action at reducing safety risk;
2. The effectiveness of the action at promoting driving politeness by the autonomous vehicle;
3. The potential of the action to cause or increase safety risk;
4. The potential of the action to cause or increase discomfort to the occupant of the vehicle; or
5. The potential of the action to cause impolite driving behavior.

The assessment of each driving response may be computationally processed by assigning numerical scores to each of the criteria, taking into account the current situational assessment. Accordingly, at 2004, speed reduction is assessed according to the various criteria. For example, speed reduction may reduce or prevent splashing, and it may mitigate any harm from striking a potential pothole; however, speed reduction may annoy the vehicle's occupants and, if there is a nearby vehicle that is closely following the autonomous vehicle, speed reduction may cause the nearby vehicle to need to also reduce its speed, increasing the risk of a collision and potentially annoying the driver or occupants of the nearby vehicle.

At operation 2006, an intra-lane shift is assessed as a potential driving response. At operation 2008, a lane change is assessed as a potential driving response. The intra-lane shift is a less-disruptive option to the vehicle's occupants and to nearby vehicles than a lane change, though it may also be less effective based on the positioning and size of the puddle and the vehicle's speed.

At operation 2010, a momentary swerve on to the road's shoulder is assessed. At operation 2012, a momentary swerve into the oncoming-traffic lane is assessed. The shoulder and oncoming-lane swerves represent higher-risk driving responses, which may be called for when other driving responses are determined to be either ineffective or riskier based on the current situational scenario.

Each of these criteria may be computationally evaluated considering a situational assessment, for example. As a result of considering the situational assessment as part of applying the criteria in operations 2004-2012, certain driving responses may be more preferable, or less preferable, according to the prevailing conditions. Thus, for example, the presence and relative distance(s) to any nearby vehicles may affect the extent to which reducing speed, lane changes, lane shifting, or swerving, or a combination of these driving responses, may be selected to respond to the detection of a puddle. In an example, swerving may be an intra-lane swerve, whereby the vehicle does not change lanes, but rather reorients itself within the lane to avoid the puddle. In an example, the intra-lane swerve, or a reduction in speed, are performed only when a pedestrian is present. Thus, if there was no pedestrian, the maneuver would not be performed. For example, if the host vehicle detects a puddle and detects a pedestrian, the host vehicle may slow down so as to pass more slowly through the puddle than if the pedestrian is not detected. Further, the host vehicle may adjust its path away from the pedestrian if a puddle is detected and maintain a straight path if not puddle is detected. Additionally, the host vehicle may slow down if a pedestrian is on the sidewalk and a puddle is present, but will not slow down (e.g., or will slow down less) if a pedestrian is on the sidewalk and a puddle is not present.

Figure 21:
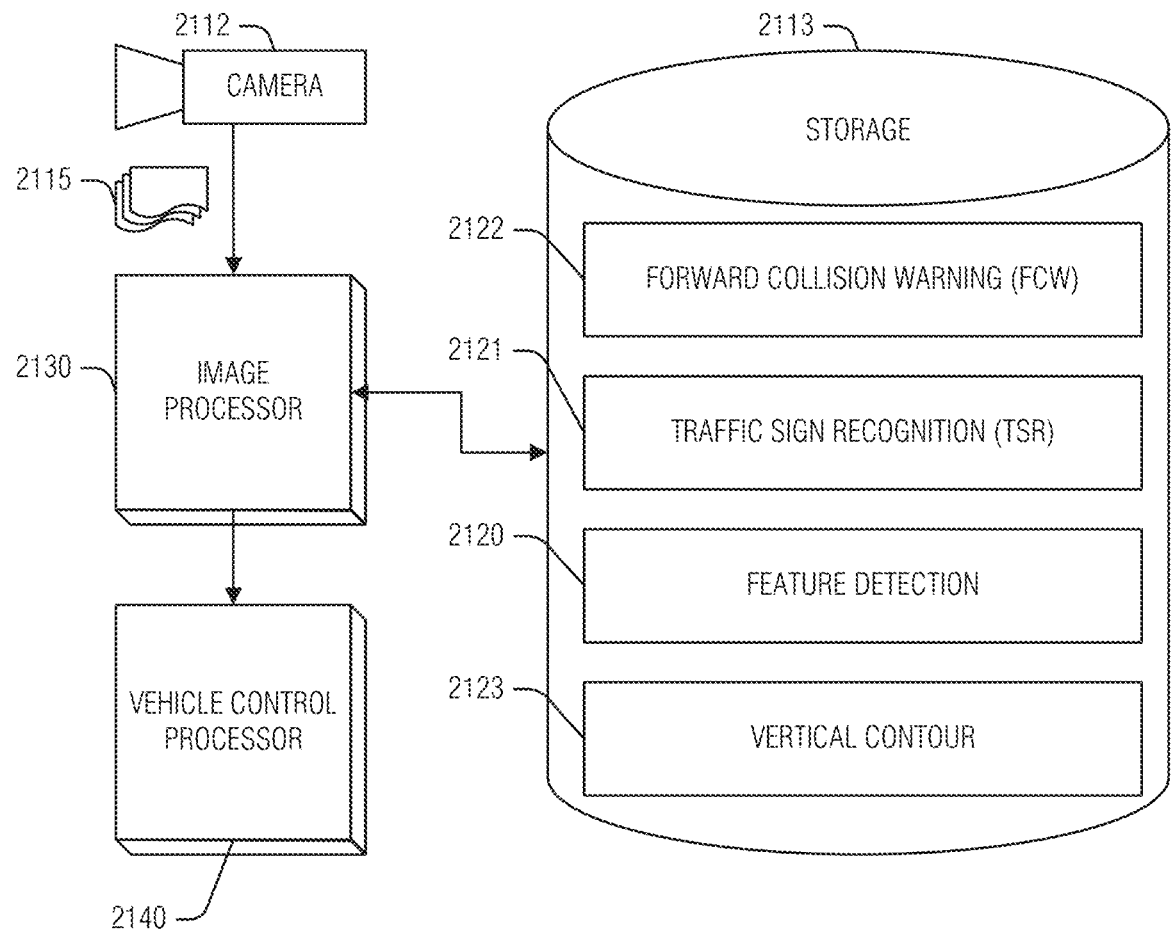
FIG. 21 illustrates a camera-based vehicle mounted system for profiling a road, for use with an autonomous vehicle control system, according to an embodiment.

FIG. 21 illustrates a camera-based vehicle mounted system for profiling a road, for use with an autonomous vehicle control system, according to an embodiment. As illustrated, the system is composed of a number of subsystems, components, circuits, modules, or engines, which for the sake of brevity and consistency are termed engines, although it will be understood that these terms may be used interchangeably. Engines are realized in hardware, or in hardware controlled by software or firmware. As such, engines are tangible entities specially-purposed for performing specified operations and are structured in a certain manner.

In an example, circuitry may be arranged (e.g., internally or with respect to external entities such as other circuits) in a specified manner as an engine. In an example, the whole or part of one or more hardware processors may be configured by firmware or software (e.g., instructions, an application portion, or an application) as an engine that operates to perform specified operations. In an example, the software may reside on a tangible machine-readable storage medium. In an example, the software, when executed by the underlying hardware of the engine, causes the hardware to perform the specified operations. Accordingly, an engine is physically constructed, or specifically configured (e.g., hardwired), or temporarily configured (e.g., programmed) to operate in a specified manner or to perform part or all of any operation described herein.

Considering examples in which engines are temporarily configured, each of the engines need not be instantiated at any one moment in time. For example, where the engines comprise a general-purpose hardware processor core configured using software; the general-purpose hardware processor core may be configured as respective different engines at different times. Software may accordingly configure a hardware processor core, for example, to constitute a particular engine at one instance of time and to constitute a different engine at a different instance of time.

As depicted, the system includes a camera or image sensor 2112 mounted in or on vehicle. Each image sensor 2112 images a field of view, to provide image frames 2115, which are read by the image processor 2130. In an example, more than one camera 2112 may be mounted in the vehicle. For example, the system may have multiple cameras 2112 pointing in different directions. A system also may have multiple cameras 2112 pointing in the same or similar directions with respect to the vehicle, but mounted at different locations. In an example, a system may have multiple cameras that have partially or completely overlapping fields of view (e.g., as described below with respect to FIGS. 22 and 23). In an example, two side-by-side cameras may operate in stereo. Although single-camera systems are discussed herein, multiple-camera systems may also be used, where some or all of the relevant images and frames may be captured by different cameras, or may be created from a composite of images captured from multiple cameras. Realtime operation, in the present context, operates with imperceptible or nominal processing delay such that objects throughout a field of view are detected at a rate that is consistent with the rate at which the field of view is scanned or captured.

Image processor 2130 may be used to process image frames 2115 simultaneously or in parallel to serve a number of driver assistance systems or applications. Image processor 2130 may be used to process image frames 2115 to detect and recognize an image or portions of the image in the forward field of view of camera 2112. The driver assistance systems may be implemented using specific hardware circuitry (not shown) with on board software and/or software control algorithms in storage 2113. Image sensor 2112 may be monochrome, grayscale, or image sensor 2112 may be color-sensitive. By way of example, image frames 2115 are used to serve feature detection engine 2120, traffic sign recognition (TSR) engine 2121, forward collision warning (FCW) engine 2122, and vertical contour detection engine 2123 of the vertical contour of the road or deviation from the road plane. In an example, image frames 2115 are partitioned between different driver-assistance applications and in other cases the image frames 2115 may be shared between the different driver assistance applications.

In an example, the system is used to accurately estimate the planar (or bi-quadratic) model of the road surface, and compute small deviations from the planar (or bi-quadratic) road surface model to detect or quantify various surface features 104. The term "road surface model" in the present context refers to a planar or bi-quadratic model of the road surface. The term "vertical contour" or "vertical deviation" refers to the deviations from the road surface model along an axis perpendicular to the road surface.

In an example, the system is used to accurately detect model a road surface (e.g., shape) shape, such as vertical contour, using the camera 2112 mounted in a host vehicle. Using systems and methods provided herein, surface features such as bumps or holes, speed bumps, curbs, or manhole covers, may be measured or modeled as vertical deviations from the road surface (e.g., plane) with sub-pixel accuracy (e.g., on the order of 1-2 centimeters). These techniques may be similarly applied to forward, sideward, or rearward cameras 2112. The gamma map may be useful for determining drivable areas in front of, or to the sides and rear, of the vehicle. The gamma map may be used on its own to determine places where the surface slope is too steep to drive, or it may be combined with grayscale or color image based semantic free-space, as described in U.S. Patent Publication No. 2018/0101177, the entirety of which is incorporated herein by reference. The Gamma map, or height map, of the road plane may be used to differentiate between sharp vertical edge curb stones, smoothly sloping curb stones, or soft shoulders (e.g., where a road drops off). The host vehicle may then be controlled to maintain a larger distance from a sharp curb stone or edge drop off than from a smoothly sloping curb stone.

In an example, the system may further include a vehicle control processor 2140 that implements one or more vehicle control engines for generating throttle, braking, steering, or transmission selection commands to the vehicle's electromechanical actuator systems to effect autonomous or semi-autonomous driving operations. The vehicle control processor 2140 may receive various outputs supplied by the image processor 2130 pertaining to the various machine-vision assessments produced by engines 2120-2123.

FIG. 22 illustrates a multiple-camera array on a vehicle, according to an embodiment. As depicted, cameras 2212A-2212F are positioned around a vehicle to provide fields of view (e.g., such as those described below).

Figure 23:
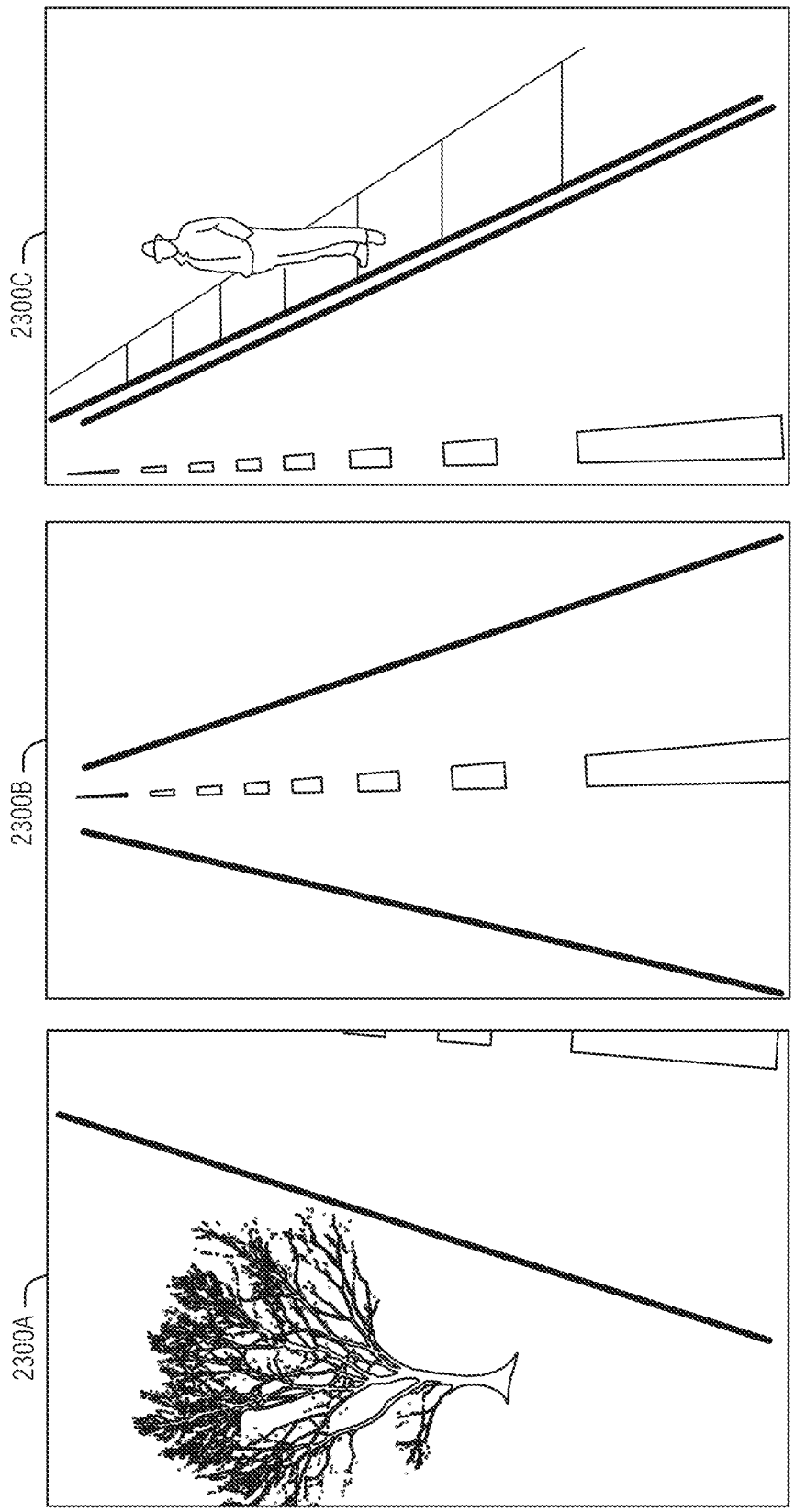
FIG. 23 illustrates examples of fields of view that may be captured by a multiple-camera array, according to an embodiment.

FIG. 23 illustrates examples of fields of view that may be captured by a multiple-camera array, according to an embodiment. Multiple overlapping fields of view 100A-100F are illustrated. Here, the road surface is common to the views.

Figure 24:
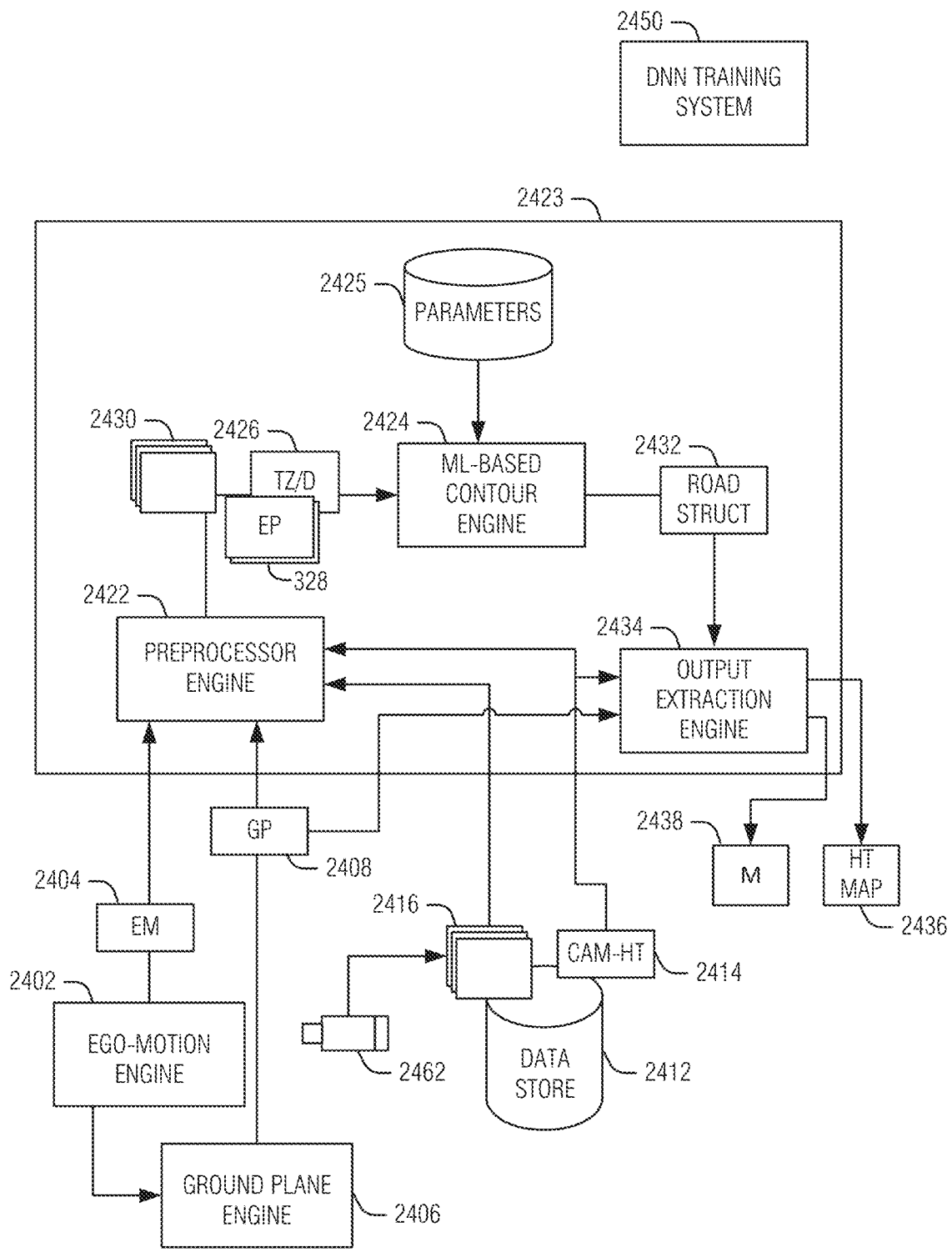
FIG. 24 is a block diagram illustrating an example of a vertical contour detection engine, according to an embodiment.

FIG. 24 is a block diagram illustrating an example of a vertical contour detection engine 2423, according to an embodiment. The vertical contour detection engine 2423 includes a preprocessor engine 2422, a machine-learning (ML)-based contour engine 2424, and an output extraction engine 2434. The preprocessor engine 2422 is constructed, programmed, or otherwise configured, to receive a set of raw input data, and process the set of raw input data to produce a preprocessed set of input data to be passed to ML-based contour engine 2424 for further processing, the result of which is an output indicating a measurement of the vertical contour of the road surface.

The set of raw input data may be provided from components of a vehicle control system. For example, an ego-motion engine 2402, a ground plane engine 2406, or a data store 2412 may each provide various items of raw data. Notably, in the present context, the term "raw data" refers to information on the input side of preprocessor engine 2422. Raw data is not limited to data provided directly from sensors (e.g., one or more cameras) or is otherwise unprocessed. Rather, raw data may be computationally processed to some extent by its source or by an intermediary processing entity.

The ego-motion engine 2402 is configured to provide ego-motion (EM) information 2404 describing actual motion of the sensor. EM information 2404 may be based on measurements obtained by the vehicle's speedometer, or inertial sensors (e.g., a tri-axial accelerometer configured to sense the yaw, pitch, and roll of vehicle 218). The inertial sensors may be integrated in a camera, or may be mounted elsewhere on or in the host vehicle.

The ground plane engine 2406 is configured to provide ground plane (GP) information 2408. In an example, the ground plane engine 2406 may determine the GP information 2408 based on pitch and roll data provided by the ego-motion engine 2402, vehicle suspension information, or some combination of these inputs. The GP information 2408 may indicate the plane normal vector of the road, and the distance to the plane. In an example, the ground plane engine 2406 may compute the plane normal vector and distance to the plane based on 3D scanning measurements (e.g., LiDAR), stereoscopic imaging, or other suitable technique(s). In an example, the ground plane engine 2406 may compute the GP information 2408 based on the captured images 2416, or it may be a fixed default GP.

The data store 2412 provides saved items of data, such as camera height information 2414, and captured images 2416, which may include the sequence of successively-captured image frames 215. The captured images 2416 may include the current (most recently captured) image, the previous image, and the previous-previous image, for example.

The preprocessor engine 2422 outputs a set of preprocessed images 2430 that are based on the captured images 2416 and other items of raw-data inputs, such as the EM 2404, the GP information 2408, or the camera height information 2414. In addition, the preprocessor engine 2422 outputs the image-formatted epipole indicia 2428, and the image-formatted motion indicia 2426, for further processing by the ML-based contour engine 2424.

In an example, the road structure 2432 is a map that represents a ratio of road plane height to distance from the camera along the direction of forward motion (along the z axis) for each pixel of the current captured image, referred to herein as "gamma." In an example, gamma may have a resolution that is the same, or similar, to any of the set of preprocessed images 2430, or it may have a different (e.g., reduced) resolution.

In an example, the ML-based contour engine 2424 reads the set of preprocessed images 2430, the image-formatted epipole indicia 2428, and the image-formatted motion indicia 2426, and processes these image-formatted outputs of the preprocessor engine 2422 to produce the road structure 2432, which is an image-formatted map representing a three-dimensional structure of the road surface. The road structure 2428 is indicative of the vertical contour of the road. It may include height information for points on the road surface, or it may include other values from which the height information may be computationally determined from further processing.

In an example, the ML-based contour engine 2424 includes a trained deep neural network (DNN) to compute the vertical contour of the road. The DNN performs various staged operations at a plurality of layers based on computational parameters 2425, which include weighting, biases, or other variable settings specific to each layer. The computational parameters 2425 may be established, and occasionally updated, based on DNN training operations, which may be performed off-line or remotely, such as by DNN training system 2450.

The output extraction engine 2434 is configured to process gamma (γ) values of the road structure 2432 to produce a height map 2436 representing the vertical height from the plane of the road using the camera height information 2414 and the GP 2408, for example. In an example, the output extraction engine 2434 is configured to compute residual motion μ 2438 from the road structure 2432 based on the following:

$$\vec{\mu} = \frac{H}{Z}\frac{T_Z}{D}(\vec{e} - \vec{p_w}),$$

where the $$\frac{H}{Z}$$

term is gamma, $T_Z$ represents translation in the forward direction, D represents the camera height 2414, $\vec{e}$ represents the epipole information, and $\vec{p_w}$ is a term representing the corresponding image coordinate after application of the homography-based warping.

In an example, the DNN produces a pixel-wise output of gamma values, where gamma is a computed ratio of vertical contour height to distance from the camera along the direction of forward motion (along the z axis). The vertical contour height may be determined from the respective gamma value for the corresponding location within the image.

In an example, road-boundary features such as sidewalks may be detected directly from the height H. In an example, the road-boundary features may be detected by detecting relatively homogenous positive residual flow regions that are separated from areas of low residual flow by elongated lines. These lines are roughly heading in the direction of the focus of expansion (FOE) or the direction of the road (i.e. the direction of the vanishing points of the lane marks).

In an example, bumps or obstacles may be similarly detected directly from the height H or as regions of positive residual flow, at least partially surrounded by areas of low residual flow. In an example, holes or depressions, on the other hand, may be detected as regions of negative residual flow, at least partially surrounded by areas of low residual flow.

In an example, puddles are detected based on analysis of the horizontal surfaces in the image (which may be determined from the gamma image, or from the location of regions inside the determined road boundaries, for example). Some criteria that may be used in determining a puddle include testing for the presence of sharp edges on the surface with significant residual flow indicative of a deep recession or hole. As an example, in a DNN-based implementation, the edges of a suspected-puddle region may be analyzed for edge features that are stationary in the gamma warped image. A suspected puddle region may be identified as having a large negative gamma value when using only photogrammetric constraints (e.g., exceeding a defined threshold in the negative direction).

In an example, preprocessed (e.g., warped, aligned, and stabilized) images are obtained. These preprocessed images may have been produced as part of road profiling operations, and not specifically for puddle detection. Here, the availability of the preprocessed images facilitates computational efficiency and improved detection speed for feature detection compared to systems having to preprocess the images anew.

Figure 25:
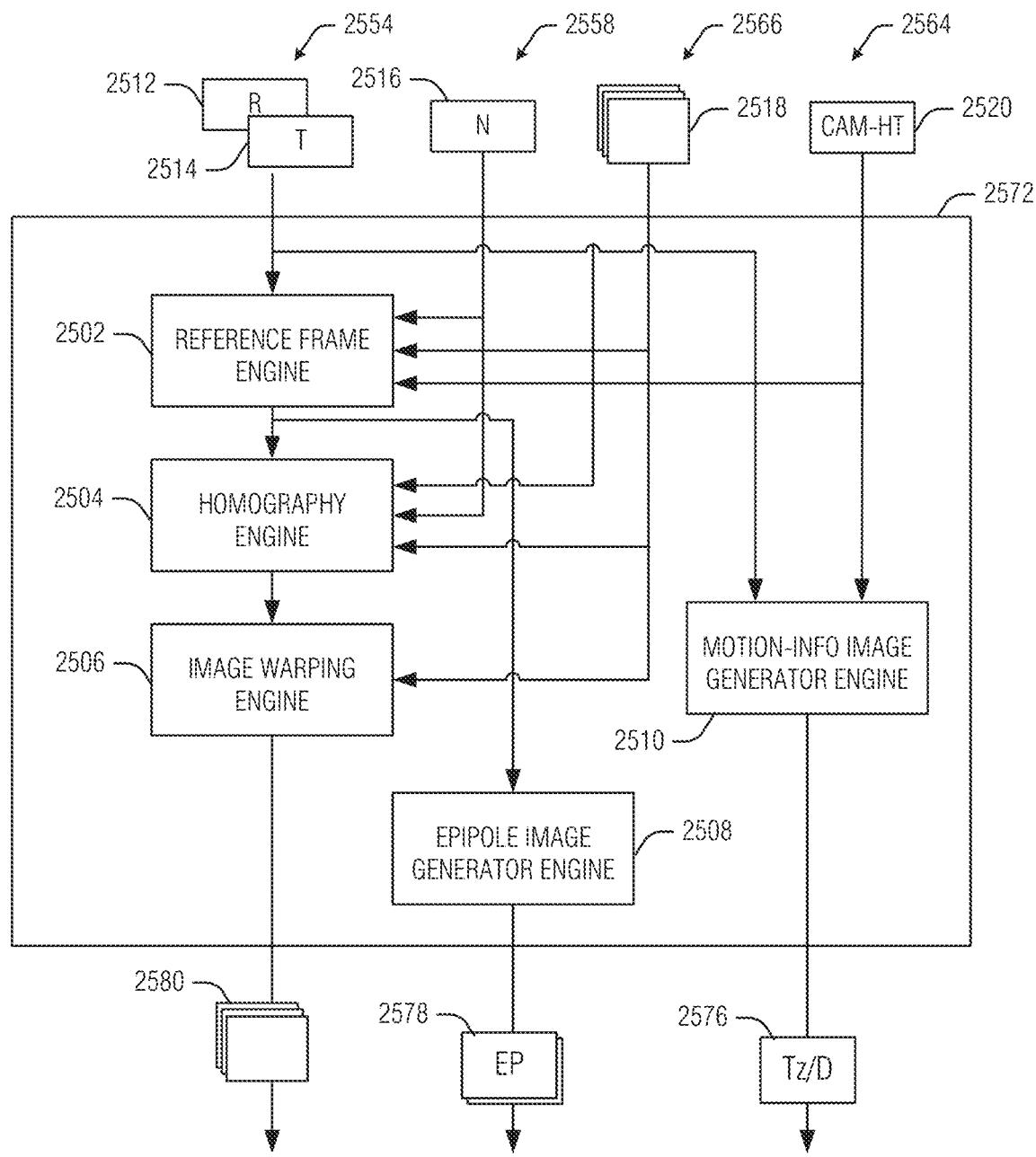
FIG. 25 illustrates an example of a preprocessor engine, according to an embodiment.

FIG. 25 illustrates an example of a preprocessor engine, according to an embodiment. As depicted, the preprocessor engine 2572 includes a reference frame engine 2502, a homography engine 2504, an image warping engine 2506, an epipole image generator engine 2508, and a motion-information image generator engine 2510.

The EM information 2554 is supplied as an input to the reference frame engine 2502 and to the motion-information image generator engine 2510. In this example, the EM information 2554 includes rotation (R) information 2512, and translation (T) information 2514 provided, or derived, from motion-sensing devices in the vehicle. The GP information 2558 is provided to the reference frame engine 2502. As depicted, the GP information 2558 includes a default plane normal vector indicator, N 2516 of the road plane.

Captured images 2566 are provided to the reference frame engine 2502, the homography engine 2504, and the image warping engine 2506. The captured images 2566 include a sequence of image frames 2518 (e.g., first image frame A, second image frame B and third image frame C) that are captured from the same portion of road in a field of view. In an example, the sequence of image frames 2518 may have as few as two image frames, three image frames, or more than three image frames.

Camera height information 2564 is provided to the reference frame engine 2502 and the motion information image generator engine 2510. In an example, the camera height information 2564 includes a fixed value 2520 representing the nominal camera height. In an example, the camera height information 2564 includes a dynamic indicator that reports a current camera height, which considers variables such as the suspension state of the vehicle.

In an example, the reference frame engine 2502 is configured to adjust the ground plane indicia from the GP information 2558 to an updated representation of the ground plane, based on the EM information 2554. This may be important when road profile output relative to a stabilized reference plane is desired. As an example, the plane normal vector of the ground plane is adjusted according to:

$$N(t) = \alpha F[N_{(t-1)}, R, T] + \beta N_{curr} + \gamma N_{hist}$$

where N(t) represents the updated plane normal vector, with direction and magnitude information. For example, N(t) may represent plane normal vector N divided by the camera height (i.e., distance to ground plane D, also referred to herein as camH). In an example, N and D may be separately updated using the same α, β, and δ coefficients:

$$(N_{new}; D_{new}) = 0{:}8\_updated_{R;T}$$

$$(N_{prev}; D_{prev}) + 0{:}1\_(N_{curr}; D_{cur}) + 0{:}1\_history(N_{curr}; D_{curr})$$

The homography engine 2504 is configured to compute homographies between pairs of image frames 2518. The term "homography" in the present context refers to an invertible transformation from a projective space to itself that maps straight lines to straight lines. In the field of computer vision, two images of the same planar surface in space are related by a homography (assuming a pinhole camera model). A given homography may be computationally represented and handled as a matrix (realized with an array or other suitable data structure).

As an example, a first homography $H_{AB}$, which represents a transformation of a first image frame, A, of the road to second image frame, B, of the road, is computed by homography engine 2504. The first homography $H_{AB}$ may be computed from matching image points of the road in first image frame A and corresponding set of image points of the road in second image frame B.

In an example, a homography H may be expressed based on the ego-motion and the ground plane information as:

$$H = K * \left( R - \frac{N * T}{camH} \right) * K^{-1}$$

where R and T respectively represent rotation and translation from the EM 2554 (e.g., from frame A to frame B), camH represents the camera height from camera height information 2564, N represents the plane normal vector from GP 2558, K and $K^{-1}$ represent calibration elements.

A second homography $H_{BC}$, which represents a transformation of the second image frame, B, of the road to third image frame, C, of the road, may also be computed by homography engine 2504 from matching image points on the road in second image frame B and corresponding image points of the road in third image frame C.

The homography engine 2504 may further chain the first and second homographies $H_{AB}$ and $H_{BC}$, such as by matrix multiplication. By using the chained homography as an initial guess, a third homography, $H_{AC}$ may be computed, which represents the transformation of the first image of the road to the third image of the road.

In an example, the homography engine 2504 uses ego-motion between image frames to compute homographies. For instance, rotation measured between the first image frame A and second image frame B, denoted $R_{AB}$, together with translation between first image frame A and second image frame B, $T_{AB}$, are chained with rotation and translation, respectively, between second image frame B and third image frame C, denoted RBC and TBC. This ego-motion chaining produces a determination of rotation and translation between the first image frame A and third image frame C, denoted $R_{AC}$, and $T_{AC}$. The homography engine 2504 uses ego-motion $R_{AB}$ and $T_{AB}$ to update plane normal vector $N_{BC}$, which is the plane normal computed using frames B and C, in the coordinate frame of frame C. It represents a stabilized reference plane common to the second and third image frames B and C. The homography engine 2504 determines an updated plane normal vector (e.g., $N_{BC}$) representing a stabilized reference frame usable for all homographies pertaining to the sequence of three images A, B, and C. Next, the homography engine 2504 composes homography $H_{AC}$ for the transition of image frames between the first image frame A and the third frame C, based on rotation $R_{AC}$, translation $T_{AC}$, and plane normal $N_{AC}$.

In an example, robust tracking after pre-warping is applied to compute a homography. This is used to derive the ego-motion and a plane estimate to adjust the previous plane estimate. The ego-motion and adjusted plane model are combined to obtain the homography. As an example, the ego-motion may be provided by an ego-motion sensor and processing engine. This type of engine uses robust tracking of points on the road and the points above the road using an essential matrix. It also combines any inertial sensors and speedometer information available. The ground plane information is provided by a ground-plane engine. This engine tracks points on the road (after a pre-warp) and then uses the computed ego-motion to derive the depth to each point, which produces the 3D coordinates of the points. Thereafter, a planar surface is algorithmically fit to the 3D points. The ego-motion and planar surface are combined to provide a homography.

In an example, respective parametric models of the road surface may be implemented. For example, a 3D spline model may be provided by a communicatively-coupled driving-path geometry or object-sensing subsystems. As an example of one such subsystem, a Road Experience Management™ (REM™) engine manufactured by Mobileye, a subsidiary of Intel Corporation, may provide representations of road features in the form of 3D splines. For instance, lane marks may be represented as 3D splines. The subsystem aligns 3D-spline feature representations to the images. The 3D spline feature representations may be projected back onto the captured images of the road for further processing.

Each point from the 3D splines has a 3D coordinate. In an example, this data may be used for interpolating and extrapolating the 3D positions associated with the 3D splines along rows of the captured image. Extrapolation to the sides may be zero order hold (i.e. constant), first order hold (e.g., linear extension based on two splines), etc. In an example, the interpolation may occur with the known extension of certain splines to virtual image coordinates that lie outside of the image itself.

The interpolation and extrapolation may produce 3D coordinates for all points in the lower part of the image. These points may be on a smooth 3D surface. In turn, the surface may be used to warp the previous images towards the current image (or vice-versa).

In an example having access to multiple overlapping views (e.g., as described with reference to FIGS. 22 and 23), a homography may be computed by the homography engine 2504 using a combination of the fields of view. For instance, a homography may be obtained from the forward-left field of view 2300A to forward-center field of view 2300B (at time t2) that aligns the overlapping regions of the planar road surface, this homography may be used to warp the image of forward-left field of view 2300C to the image of forward-center field of view 2300B. In addition, a homography may be computed between the image of forward-center field of view 2300B at time t1 to the image of forward-center field of view 2300B and time t2 (as in the monocular case). Further, a homography may be computed from the image of forward-left field of view 2300A (at time t1) to the image of forward-center field of view 2300B (also at time t1). Using this homography, the image of forward-left field of view 2300A (at time t1) may be chain-warped to align with the image of forward-center field of view 2300B (at time t2).

In an example, the homography between the image of forward-left field of view 2300A (at time t1) and the image of forward-center field of view 2300B (also at time t1) is derived from the plane normal used for the homography between the image of forward-center field of view 2300A (at time t1) and the image of forward-center field of view (at time t2) and the known position of forward-left camera 2212A and forward-center camera 2212B (external calibration) together with the internal calibration parameters of each camera such as focal length and lens distortion.

This technique may be used with global-shutter cameras but might introduce errors in the case of rolling shutter cameras, or in the case of non-synchronized cameras. In the latter case, relative position of the two cameras may be derived from the images using 3D points and tracking points between the overlapping road surfaces and computing a homography. Since homographies used for alignment generally use a consistent ground plane, the homography from tracking may be decomposed to give the relative motion, and a new homography may be constructed using this motion and the consistent ground plane normal.

The image warping engine 2506 is configured to perform a warping operation on two of the three image frames 2518. For instance, first image frame A is warped to third image frame C, and second image frame B is warped to third image frame C. In this example, image frame C may represent the current image, with image frame B representing the previous image, and image frame A representing the previous-previous image.

The epipole image generator engine 2508 is configured to generate the epipole location data 2578 in a format of one or more images. The epipole is a vector that represents the direction of forward motion. In an example, image-formatted epipole location data 2578 includes a pair of images, each image having a resolution that is the same or similar to image frames A, B, and C. The first image of the image pair representing of epipole location data contains "pixels" that represent their respective distances from the epipole along the x axis. The second image of the image pair representing of epipole location data contains "pixels" that represent their respective distances from the epipole along the y axis.

The motion-information image generator engine 2510 is configured to produce the image-formatted motion indicia 2576 representing measured motion of the vehicle. The image-formatted motion indicia 2576 may have the same dimensions as the epipole location data 2578, for example. The content of the image-formatted motion indicia 2576 may include "pixels" having a fixed value representing the vehicle motion. In an example, the vehicle motion in the image-formatted motion indicia 2576 may be based on the EM 2554. In an example, the vehicle motion in the image-formatted motion indicia 2576 is based further on the camera height information 2564. In an example, a ratio of a current measure of translation along the forward (z-axis) direction to the camera height, represented as Tz/D, is provided as a constant value for each "pixel" of the image in the image-formatted data structure 2576.

Figure 26:
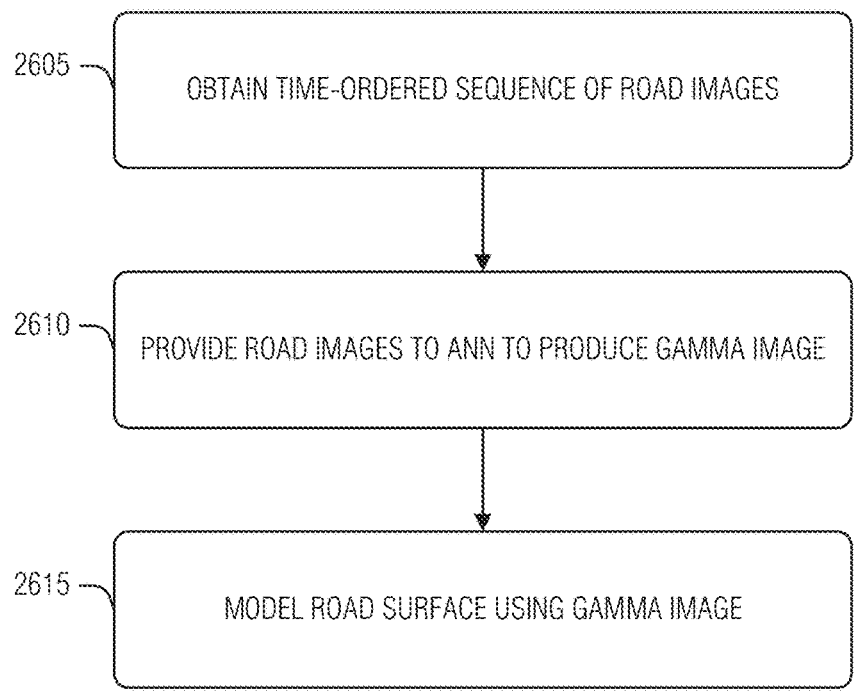
FIG. 26 illustrates a flow diagram of an example of a method for vehicle environment modeling with a camera, according to an embodiment.

FIG. 26 illustrates a flow diagram of an example of a method 2600 for vehicle environment modeling with a camera, according to an embodiment. The operations of the method 260 are implemented in computational hardware, such as that described above or below (e.g., processing circuitry).

At operation 2605, a time-ordered sequence of images representative of a road surface is obtained. Here, one of the sequence of images includes a current image.

At operation 2610, a data set is provided to an ANN to produce a three-dimensional structure of a scene. In an example, the data set includes a portion of the sequence of images—where the portion of the sequence of images includes the current image, motion of the sensor that captured the images, and an epipole. In an example, the portion of the sequence of images includes images immediately preceding the current image. In an example, the portion of the sequence of images is three images in total. In an example, the portion of the sequence of images includes images preceding the current image that are separated by one or more images in the sequence of images.

In an example, the epipole is provided as a gradient image with a same dimensionality as the current image. Here, values of pixels in the gradient image represent a distance from the epipole of pixels in the current image. In an example, a baseline is of at least 0.5 m. In an example, the gradient image is a lower resolution that the current image. In an example, the gradient image represents only horizontal distances from the epipole. In an example, a second gradient image is provided to the ANN to represent vertical distances from the epipole.

In an example, the motion of the sensor is provided as a constant value image with a same dimensionality as the current image. In an example, the constant value is a ratio of forward motion of the sensor by a height of the sensor from the plane.

In an example, the three-dimensional structure of the scene is a gamma image. Here, the gamma image includes pixels with gamma values that are a ratio of a height of a point above a plane by a distance from a sensor capturing the current image, the plane representing the road surface.

In an example, the ANN is a convolutional neural network (CNN). In an example, the motion of the sensor and the epipole are provided to the CNN at a bottleneck layer.

In an example, the ANN is trained with an unsupervised training technique in which error is determined by measuring a difference between a model of a future image and the future image. Here, the model of the future image is produced via a gamma warping of an image previous to the future image. In an example, the ANN is trained with an unsupervised training technique in which error is determined by measure a difference between predicted gamma for a location and sensor movement at the location, the sensor movement including pitch, yaw, roll, or translation perpendicular to the plane. In an example, the ANN is trained with an unsupervised training technique in which error is determined by a difference in gamma of overlapping segments between two images at two different times. Here, the inference is performed on the first image, and the overlapping segment is closer to the sensor in the second image.

Figure 27:
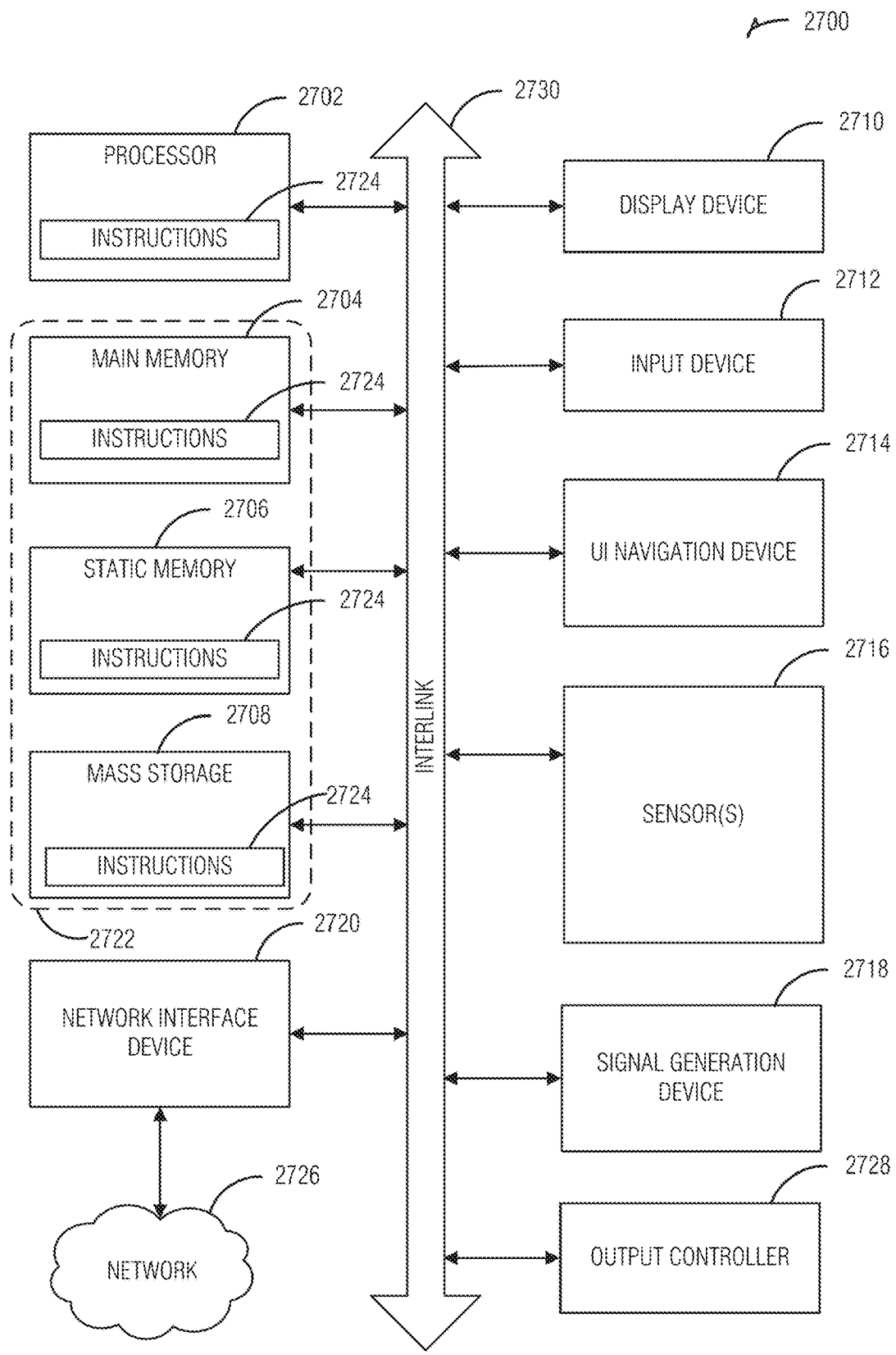
FIG. 27 is a block diagram illustrating an example of a machine upon which one or more embodiments may be implemented.

FIG. 27 illustrates a block diagram of an example machine 2700 upon which any one or more of the techniques (e.g., methodologies) discussed herein may perform. Examples, as described herein, may include, or may operate by, logic or a number of components, or mechanisms in the machine 2700. Circuitry (e.g., processing circuitry) is a collection of circuits implemented in tangible entities of the machine 2700 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 2700 follow.

In an example, the machine 2700 may operate as a standalone device or may be connected (e.g., networked) to other machines. In a networked deployment, the machine 2700 may operate in the capacity of a server machine, a client machine, or both in server-client network environments. In an example, the machine 2700 may act as a peer machine in peer-to-peer (P2P) (or other distributed) network environment. The machine 2700 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 2700 may include a hardware processor 2702 (e.g., a central processing unit (CPU), a graphics processing unit (GPU), a hardware processor core, or any combination thereof), a main memory 2704, a static memory (e.g., memory or storage for firmware, microcode, a basic-input-output (BIOS), unified extensible firmware interface (UEFI), etc.) 2706, and mass storage 2708 (e.g., hard drives, tape drives, flash storage, or other block devices) some or all of which may communicate with each other vian interlink (e.g., bus) 2730. The machine 2700 may further include a display unit 2710, an alphanumeric input device 2712 (e.g., a keyboard), and a user interface (UI) navigation device 2714 (e.g., a mouse). In an example, the display unit 2710, input device 2712 and UI navigation device 2714 may be a touch screen display. The machine 2700 may additionally include a storage device (e.g., drive unit) 2708, a signal generation device 2718 (e.g., a speaker), a network interface device 2720, and one or more sensors 2716, such as a global positioning system (GPS)

sensor, compass, accelerometer, or other sensor. The machine 2700 may include an output controller 2728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 2702, the main memory 2704, the static memory 2706, or the mass storage 2708 may be, or include, a machine readable medium 2722 on which is stored one or more sets of data structures or instructions 2724 (e.g., software) embodying or utilized by any one or more of the techniques or functions described herein. The instructions 2724 may also reside, completely or at least partially, within any of registers of the processor 2702, the main memory 2704, the static memory 2706, or the mass storage 2708 during execution thereof by the machine 2700. In an example, one or any combination of the hardware processor 2702, the main memory 2704, the static memory 2706, or the mass storage 2708 may constitute the machine readable media 2722. While the machine readable medium 2722 is illustrated as a single medium, the term "machine readable medium" may include a single medium or multiple media (e.g., a centralized or distributed database, and/or associated caches and servers) configured to store the one or more instructions 2724.

The term "machine readable medium" may include any medium that is capable of storing, encoding, or carrying instructions for execution by the machine 2700 and that cause the machine 2700 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

In an example, information stored or otherwise provided on the machine readable medium 2722 may be representative of the instructions 2724, such as instructions 2724 themselves or a format from which the instructions 2724 may be derived. This format from which the instructions 2724 may be derived may include source code, encoded instructions (e.g., in compressed or encrypted form), packaged instructions (e.g., split into multiple packages), or the like. The information representative of the instructions 2724 in the machine readable medium 2722 may be processed by processing circuitry into the instructions to implement any of the operations discussed herein. For example, deriving the instructions 2724 from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 2724.

In an example, the derivation of the instructions 2724 may include assembly, compilation, or interpretation of the information (e.g., by the processing circuitry) to create the instructions 2724 from some intermediate or preprocessed format provided by the machine readable medium 2722. The information, when provided in multiple parts, may be combined, unpacked, and modified to create the instructions 2724. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 2724 may be further transmitted or received over a communications network 2726 using a transmission medium via the network interface device 2720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 2720 may include one or more physical jacks (e.g., Ethernet, coaxial, or phone jacks) or one or more antennas to connect to the communications network 2726. In an example, the network interface device 2720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 2700, and includes digital or analog communications signals or other intangible medium to facilitate communication of such software. A transmission medium is a machine readable medium.

Figure 28:
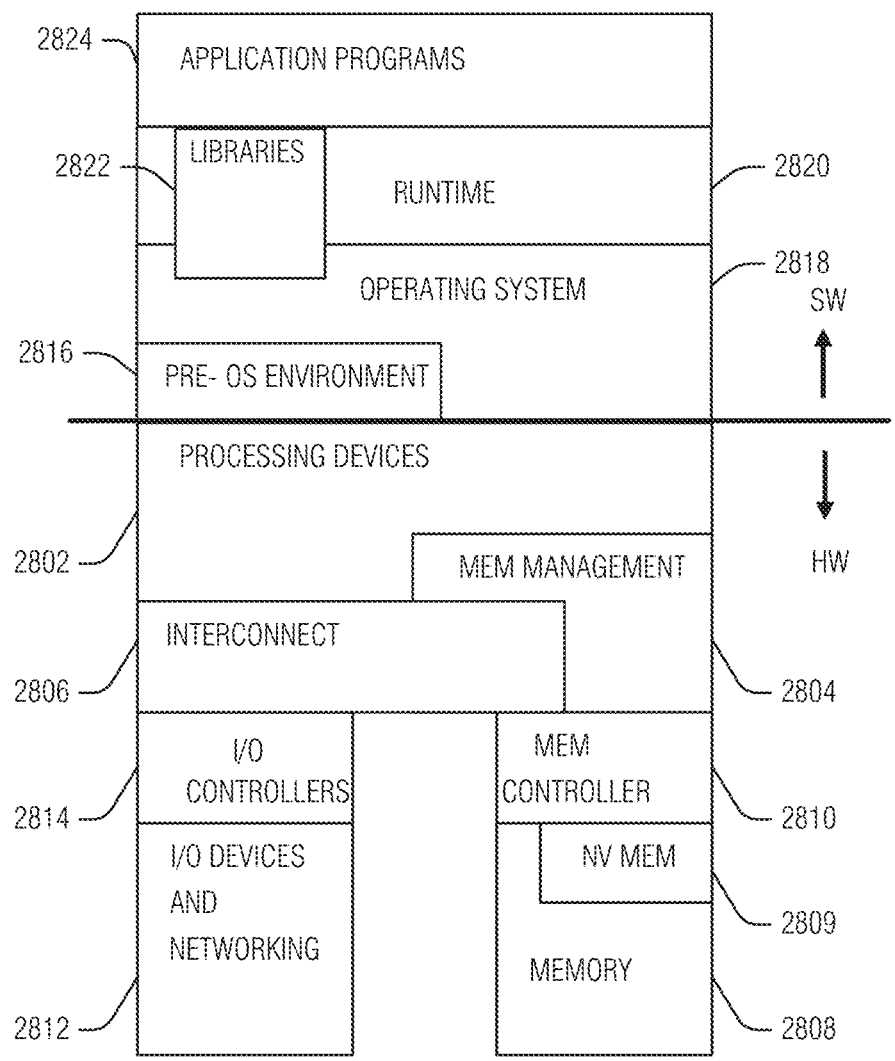
FIG. 28 is a diagram illustrating example hardware and software architecture of a computing device according to an embodiment.

FIG. 28 is a diagram illustrating an exemplary hardware and software architecture of a computing device in which various interfaces between hardware components and software components are shown. As indicated by HW, hardware components are represented below the divider line, whereas software components denoted by SW reside above the divider line. On the hardware side, processing devices 2802 (which may include one or more microprocessors, digital signal processors, etc., each having one or more processor cores, are interfaced with memory management device 2804 and system interconnect 2806. Memory management device 2804 provides mappings between virtual memory used by processes being executed, and the physical memory. Memory management device 2804 may be an integral part of a central processing unit which also includes the processing devices 2802.

Interconnect 2806 includes a backplane such as memory, data, and control lines, as well as the interface with input/output devices, e.g., PCI, USB, etc. Memory 2808 (e.g., dynamic random access memory—DRAM) and non-volatile memory 2809 such as flash memory (e.g., electrically-erasable read-only memory—EEPROM, NAND Flash, NOR Flash, etc.) are interfaced with memory management device 2804 and interconnect 2806 via memory controller 2810. In an example, this architecture may support direct memory access (DMA) by peripherals. I/O devices, including video and audio adapters, non-volatile storage, external peripheral links such as USB, Bluetooth, etc., as well as network interface devices such as those communicating via Wi-Fi or LTE-family interfaces, are collectively represented as I/O devices and networking 2812, which interface with interconnect 2806 via corresponding I/O controllers 2814.

On the software side, a pre-operating system (pre-OS) environment 2816, which is executed at initial system start-up and is responsible for initiating the boot-up of the operating system. One traditional example of pre-OS environment 2816 is a system basic input/output system (BIOS). In present-day systems, a unified extensible firmware interface (UEFI) is implemented. Pre-OS environment 2816, is responsible for initiating the launching of the operating system, but also provides an execution environment for embedded applications according to certain aspects of the invention.

Operating system (OS) 2818 provides a kernel that controls the hardware devices, manages memory access for programs in memory, coordinates tasks and facilitates multitasking, organizes data to be stored, assigns memory space and other resources, loads program binary code into memory, initiates execution of the application program which then interacts with the user and with hardware devices, and detects and responds to various defined interrupts. Also, operating system 2818 provides device drivers, and a variety of common services such as those that facilitate interfacing with peripherals and networking, that provide abstraction for application programs so that the applications do not need to be responsible for handling the details of such common operations. Operating system 2818 additionally provides a graphical user interface (GUI) that facilitates interaction with the user via peripheral devices such as a monitor, keyboard, mouse, microphone, video camera, touchscreen, and the like.

Runtime system 2820 implements portions of an execution model, including such operations as putting parameters onto the stack before a function call, the behavior of disk input/output (I/O), and parallel execution-related behaviors. Runtime system 2820 may also perform support services such as type checking, debugging, or code generation and optimization.

Libraries 2822 include collections of program functions that provide further abstraction for application programs. These include shared libraries, dynamic linked libraries (DLLs), for example. Libraries 2822 may be integral to the operating system 2818, runtime system 2820, or may be added-on features, or even remotely-hosted. Libraries 2822 define an application program interface (API) through which a variety of function calls may be made by application programs 2824 to invoke the services provided by the operating system 2818. Application programs 2824 are those programs that perform useful tasks for users, beyond the tasks performed by lower-level system programs that coordinate the basis operability of the computing device itself.

Figure 29:
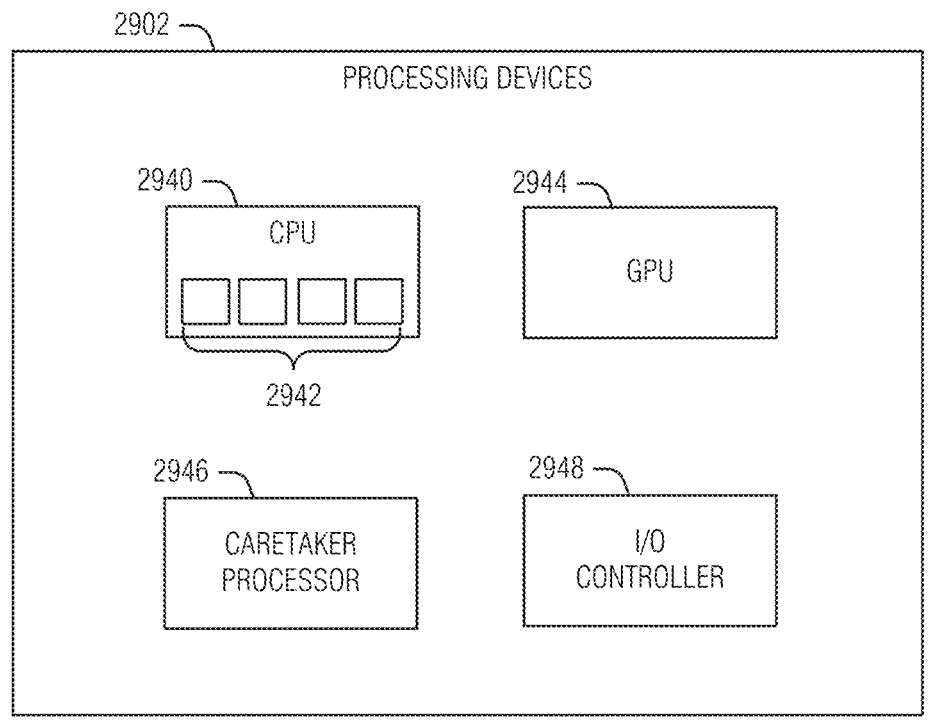
FIG. 29 is a block diagram illustrating processing devices that may be used according to an embodiment.

FIG. 29 is a block diagram illustrating processing devices 2902 according to an embodiment. In an example, two or more of processing devices 2902 depicted are formed on a common semiconductor substrate. CPU 2940 may contain one or more processing cores 2942, each of which has one or more arithmetic logic units (ALU), instruction fetch unit, instruction decode unit, control unit, registers, data stack pointer, program counter, and other essential components according to the particular architecture of the processor. As an illustrative example, CPU 2940 may be an x86-type of processor. Processing devices 2902 may also include a graphics processing unit (GPU) 2944. In an example, the GPU 2944 may be a specialized co-processor that offloads certain computationally-intensive operations, particularly those associated with graphics rendering, from CPU 2940. Notably, CPU 2940 and GPU 2944 generally work collaboratively, sharing access to memory resources, I/O channels, etc.

In an example, the processing devices 2902 may also include caretaker processor 2946. Caretaker processor 2946 generally does not participate in the processing work to carry out software code as CPU 2940 and GPU 2944 do. In an example, caretaker processor 2946 does not share memory space with CPU 2940 and GPU 2944, and is therefore not arranged to execute operating system or application programs. Instead, caretaker processor 2946 may execute dedicated firmware that supports the technical workings of CPU 2940, GPU 2944, and other components of the computer system. In an example, caretaker processor is implemented as a microcontroller device, which may be physically present on the same integrated circuit die as CPU 2940, or may be present on a distinct integrated circuit die. Caretaker processor 2946 may also include a dedicated set of I/O facilities to enable it to communicate with external entities. In one type of embodiment, caretaker processor 2946 is implemented using a manageability engine (ME) or platform security processor (PSP). Input/output (I/O) controller 2948 coordinates information flow between the various processing devices 2940, 2944, 2946, as well as with external circuitry, such as a system interconnect.

Figure 30:
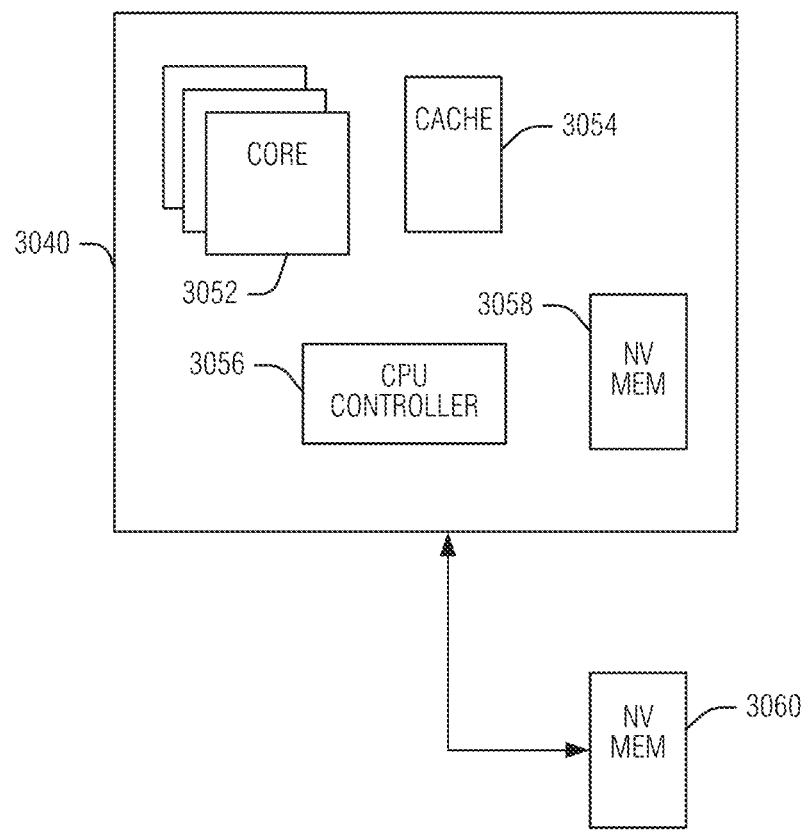
FIG. 30 is a block diagram illustrating example components of a central processing unit according to an embodiment.

FIG. 30 is a block diagram illustrating example components of a CPU 3040 according to an embodiment. As depicted, CPU 3040 includes one or more cores 3052, cache 3054, and CPU controller 3056, which coordinates interoperation and tasking of the core(s) 3052, as well as providing an interface to facilitate data flow between the various internal components of CPU 3040, and with external components such as a memory bus or system interconnect. In one embodiment, all of the example components of CPU 3040 are formed on a common semiconductor substrate.

CPU 3040 includes non-volatile memory 3058 (e.g., flash, EEPROM, etc.) for storing certain portions of foundational code, such as an initialization engine, and microcode. Also, CPU 3040 may be interfaced with an external (e.g., formed on a separate IC) non-volatile memory device 3060 that stores foundational code that is launched by the initialization engine, such as system BIOS or UEFI code.

Additional Notes & Examples

Example 1 is a device for modeling a road surface, the device comprising: a hardware sensor interface to obtain a time-ordered sequence of images representative of a road surface, one of the sequence of images being a current image; and processing circuitry to: provide a data set to an artificial neural network (ANN) to produce a three-dimensional structure of a scene, the data set including: a portion of the sequence of images, the portion of the sequence of images including the current image; motion of the sensor; and an epipole; and model the road surface using the three-dimensional structure of the scene.

In Example 2, the subject matter of Example 1 includes, wherein the portion of the sequence of images includes images immediately preceding the current image.

In Example 3, the subject matter of Example 2 includes, wherein the portion of the sequence of images is three images in total.

In Example 4, the subject matter of Examples 1-3 includes, wherein the portion of the sequence of images includes images preceding the current image that are separated by one or more images in the sequence of images.

In Example 5, the subject matter of Examples 1-4 includes, wherein the epipole is provided as a gradient image with a same dimensionality as the current image, values of pixels in the gradient image representing a distance from the epipole of pixels in the current image.

In Example 6, the subject matter of Example 5 includes, wherein a baseline is of at least 0.5 m.

In Example 7, the subject matter of Examples 5-6 includes, wherein the gradient image is a lower resolution that the current image.

In Example 8, the subject matter of Examples 5-7 includes, wherein the gradient image represents only horizontal distances from the epipole, and wherein a second gradient image is provided to the ANN to represent vertical distances from the epipole.

In Example 9, the subject matter of Examples 1-8 includes, wherein the motion of the sensor is provided as a constant value image with a same dimensionality as the current image.

In Example 10, the subject matter of Example 9 includes, wherein the constant value is a ratio of forward motion of the sensor by a height of the sensor from the plane.

In Example 11, the subject matter of Examples 1-10 includes, wherein the three-dimensional structure of the scene is a gamma image, the gamma image including pixels with gamma values that are a ratio of a height of a point above a plane by a distance from a sensor capturing the current image, the plane representing the road surface.

In Example 12, the subject matter of Examples 1-11 includes, wherein, to model the road surface, the processing circuitry identifies a reflective area by comparing the three-dimensional structure of the scene with output from a second ANN, the second ANN trained to accept the portion of the sequence of images and produce a second three-dimensional structure, wherein training of the second ANN used more photogrammetric loss in the portion of the sequence of images than training the first ANN.

In Example 13, the subject matter of Example 12 includes, wherein the ANN and the second ANN are implemented as a single ANN trained to produce a two-channel output, wherein a first channel is the three-dimensional structure of the scene and the second channel is the three-dimensional structure produced by the second ANN that used using more photogrammetric loss in its training.

In Example 14, the subject matter of Examples 1-13 includes, wherein the processing circuitry is configured to invoke a second ANN using the three-dimensional structure to determine whether the features represent an object moving or not moving within an environment of the road surface.

In Example 15, the subject matter of Example 14 includes, wherein, to invoke the second ANN using the three-dimensional structure, the processing circuitry provides the following to the second ANN: the current image; a previous image warped using the three-dimensional structure; and a target identifier.

In Example 16, the subject matter of Example 15 includes, wherein the target identifier is an image in which pixels of the image indicate a distance from a center of a target.

In Example 17, the subject matter of Examples 15-16 includes, wherein the target identifier includes a size of a target.

In Example 18, the subject matter of Examples 15-17 includes, wherein the target identifier is mask of pixels that correspond to a target.

In Example 19, the subject matter of Examples 1-18 includes, wherein, to model the road surface, the processing circuitry computes a vertical deviation from the plane of a road surface feature.

In Example 20, the subject matter of Examples 1-19 includes, wherein the ANN is a convolutional neural network (CNN).

In Example 21, the subject matter of Example 20 includes, wherein the motion of the sensor and the epipole are provided to the CNN at a bottleneck layer.

In Example 22, the subject matter of Examples 1-21 includes, wherein the ANN is trained with an unsupervised training technique in which error is determined by measuring a difference between a model of a future image and the future image, the model of the future image produced via a gamma warping of an image previous to the future image.

In Example 23, the subject matter of Examples 1-22 includes, wherein the ANN is trained with an unsupervised training technique in which error is determined by measure a difference between predicted gamma for a location and sensor movement at the location, the sensor movement including pitch, yaw, roll, or translation perpendicular to the plane.

In Example 24, the subject matter of Examples 1-23 includes, wherein the ANN is trained with an unsupervised training technique in which error is determined by a difference in gamma of overlapping segments between two images at two different times, wherein the inference is performed on the first image, and wherein the overlapping segment is closer to the sensor in the second image.

Example 25 is a method for modeling a road surface, the method comprising: obtaining a time-ordered sequence of images representative of a road surface, one of the sequence of images being a current image; providing a data set to an artificial neural network (ANN) to produce a three-dimensional structure of a scene, the data set including: a portion of the sequence of images, the portion of the sequence of images including the current image; motion of the sensor; and an epipole; and modeling the road surface using the three-dimensional structure of the scene.

In Example 26, the subject matter of Example 25 includes, wherein the portion of the sequence of images includes images immediately preceding the current image.

In Example 27, the subject matter of Example 26 includes, wherein the portion of the sequence of images is three images in total.

In Example 28, the subject matter of Examples 25-27 includes, wherein the portion of the sequence of images includes images preceding the current image that are separated by one or more images in the sequence of images.

In Example 29, the subject matter of Examples 25-28 includes, wherein the epipole is provided as a gradient image with a same dimensionality as the current image, values of pixels in the gradient image representing a distance from the epipole of pixels in the current image.

In Example 30, the subject matter of Example 29 includes, wherein a baseline is of at least 0.5 m.

In Example 31, the subject matter of Examples 29-30 includes, wherein the gradient image is a lower resolution that the current image.

In Example 32, the subject matter of Examples 29-31 includes, wherein the gradient image represents only horizontal distances from the epipole, and wherein a second gradient image is provided to the ANN to represent vertical distances from the epipole.

In Example 33, the subject matter of Examples 25-32 includes, wherein the motion of the sensor is provided as a constant value image with a same dimensionality as the current image.

In Example 34, the subject matter of Example 33 includes, wherein the constant value is a ratio of forward motion of the sensor by a height of the sensor from the plane.

In Example 35, the subject matter of Examples 25-34 includes, wherein the three-dimensional structure of the scene is a gamma image, the gamma image including pixels with gamma values that are a ratio of a height of a point above a plane by a distance from a sensor capturing the current image, the plane representing the road surface.

In Example 36, the subject matter of Examples 25-35 includes, wherein modeling the road surface includes identifying a reflective area by comparing the three-dimensional structure of the scene with output from a second ANN, the second ANN trained to accept the portion of the sequence of images and produce a second three-dimensional structure, wherein training of the second ANN used more photogrammetric loss in the portion of the sequence of images than training the first ANN.

In Example 37, the subject matter of Example 36 includes, wherein the ANN and the second ANN are implemented as a single ANN trained to produce a two-channel output, wherein a first channel is the three-dimensional structure of the scene and the second channel is the three-dimensional structure produced by the second ANN that used using more photogrammetric loss in its training.

In Example 38, the subject matter of Examples 25-37 includes, invoking a second ANN using the three-dimensional structure to determine whether the features represent an object moving or not moving within an environment of the road surface.

In Example 39, the subject matter of Example 38 includes, wherein invoking the second ANN using the three-dimensional structure includes providing the following to the second ANN: the current image; a previous image warped using the three-dimensional structure; and a target identifier.

In Example 40, the subject matter of Example 39 includes, wherein the target identifier is an image in which pixels of the image indicate a distance from a center of a target.

In Example 41, the subject matter of Examples 39-40 includes, wherein the target identifier includes a size of a target.

In Example 42, the subject matter of Examples 39-41 includes, wherein the target identifier is mask of pixels that correspond to a target.

In Example 43, the subject matter of Examples 25-42 includes, wherein modeling the road surface includes computing a vertical deviation from the plane of a road surface feature.

In Example 44, the subject matter of Examples 25-43 includes, wherein the ANN is a convolutional neural network (CNN).

In Example 45, the subject matter of Example 44 includes, wherein the motion of the sensor and the epipole are provided to the CNN at a bottleneck layer.

In Example 46, the subject matter of Examples 25-45 includes, wherein the ANN is trained with an unsupervised training technique in which error is determined by measuring a difference between a model of a future image and the future image, the model of the future image produced via a gamma warping of an image previous to the future image.

In Example 47, the subject matter of Examples 25-46 includes, wherein the ANN is trained with an unsupervised training technique in which error is determined by measure a difference between predicted gamma for a location and sensor movement at the location, the sensor movement including pitch, yaw, roll, or translation perpendicular to the plane.

In Example 48, the subject matter of Examples 25-47 includes, wherein the ANN is trained with an unsupervised training technique in which error is determined by a difference in gamma of overlapping segments between two images at two different times, wherein the inference is performed on the first image, and wherein the overlapping segment is closer to the sensor in the second image.

Example 49 is at least one machine readable medium including instructions for modeling a road surface, the instructions, when executed by processing circuitry, cause the processing circuitry to perform operations comprising: obtaining a time-ordered sequence of images representative of a road surface, one of the sequence of images being a current image; providing a data set to an artificial neural network (ANN) to produce a three-dimensional structure of a scene, the data set including: a portion of the sequence of images, the portion of the sequence of images including the current image; motion of the sensor; and an epipole; and modeling the road surface using the three-dimensional structure of the scene.

In Example 50, the subject matter of Example 49 includes, wherein the portion of the sequence of images includes images immediately preceding the current image.

In Example 51, the subject matter of Example 50 includes, wherein the portion of the sequence of images is three images in total.

In Example 52, the subject matter of Examples 49-51 includes, wherein the portion of the sequence of images includes images preceding the current image that are separated by one or more images in the sequence of images.

In Example 53, the subject matter of Examples 49-52 includes, wherein the epipole is provided as a gradient image with a same dimensionality as the current image, values of pixels in the gradient image representing a distance from the epipole of pixels in the current image.

In Example 54, the subject matter of Example 53 includes, wherein a baseline is of at least 0.5 m.

In Example 55, the subject matter of Examples 53-54 includes, wherein the gradient image is a lower resolution that the current image.

In Example 56, the subject matter of Examples 53-55 includes, wherein the gradient image represents only horizontal distances from the epipole, and wherein a second gradient image is provided to the ANN to represent vertical distances from the epipole.

In Example 57, the subject matter of Examples 49-56 includes, wherein the motion of the sensor is provided as a constant value image with a same dimensionality as the current image.

In Example 58, the subject matter of Example 57 includes, wherein the constant value is a ratio of forward motion of the sensor by a height of the sensor from the plane.

In Example 59, the subject matter of Examples 49-58 includes, wherein the three-dimensional structure of the scene is a gamma image, the gamma image including pixels with gamma values that are a ratio of a height of a point above a plane by a distance from a sensor capturing the current image, the plane representing the road surface.

In Example 60, the subject matter of Examples 49-59 includes, wherein modeling the road surface includes identifying a reflective area by comparing the three-dimensional structure of the scene with output from a second ANN, the second ANN trained to accept the portion of the sequence of images and produce a second three-dimensional structure, wherein training of the second ANN used more photogrammetric loss in the portion of the sequence of images than training the first ANN.

In Example 61, the subject matter of Example 60 includes, wherein the ANN and the second ANN are implemented as a single ANN trained to produce a two-channel output, wherein a first channel is the three-dimensional structure of the scene and the second channel is the three-dimensional structure produced by the second ANN that used using more photogrammetric loss in its training.

In Example 62, the subject matter of Examples 49-61 includes, wherein the operations comprise invoking a second ANN using the three-dimensional structure to determine whether the features represent an object moving or not moving within an environment of the road surface.

In Example 63, the subject matter of Example 62 includes, wherein invoking the second ANN using the three-dimensional structure includes providing the following to the second ANN: the current image; a previous image warped using the three-dimensional structure; and a target identifier.

In Example 64, the subject matter of Example 63 includes, wherein the target identifier is an image in which pixels of the image indicate a distance from a center of a target.

In Example 65, the subject matter of Examples 63-64 includes, wherein the target identifier includes a size of a target.

In Example 66, the subject matter of Examples 63-65 includes, wherein the target identifier is mask of pixels that correspond to a target.

In Example 67, the subject matter of Examples 49-66 includes, wherein modeling the road surface includes computing a vertical deviation from the plane of a road surface feature.

In Example 68, the subject matter of Examples 49-67 includes, wherein the ANN is a convolutional neural network (CNN).

In Example 69, the subject matter of Example 68 includes, wherein the motion of the sensor and the epipole are provided to the CNN at a bottleneck layer.

In Example 70, the subject matter of Examples 49-69 includes, wherein the ANN is trained with an unsupervised training technique in which error is determined by measuring a difference between a model of a future image and the future image, the model of the future image produced via a gamma warping of an image previous to the future image.

In Example 71, the subject matter of Examples 49-70 includes, wherein the ANN is trained with an unsupervised training technique in which error is determined by measure a difference between predicted gamma for a location and sensor movement at the location, the sensor movement including pitch, yaw, roll, or translation perpendicular to the plane.

In Example 72, the subject matter of Examples 49-71 includes, wherein the ANN is trained with an unsupervised training technique in which error is determined by a difference in gamma of overlapping segments between two images at two different times, wherein the inference is performed on the first image, and wherein the overlapping segment is closer to the sensor in the second image.

Example 73 is a system for modeling a road surface, the system comprising: means for obtaining a time-ordered sequence of images representative of a road surface, one of the sequence of images being a current image; means for providing a data set to an artificial neural network (ANN) to produce a three-dimensional structure of a scene, the data set including: a portion of the sequence of images, the portion of the sequence of images including the current image; motion of the sensor; and an epipole; and means for modeling the road surface using the three-dimensional structure of the scene.

In Example 74, the subject matter of Example 73 includes, wherein the portion of the sequence of images includes images immediately preceding the current image.

In Example 75, the subject matter of Example 74 includes, wherein the portion of the sequence of images is three images in total.

In Example 76, the subject matter of Examples 73-75 includes, wherein the portion of the sequence of images includes images preceding the current image that are separated by one or more images in the sequence of images.

In Example 77, the subject matter of Examples 73-76 includes, wherein the epipole is provided as a gradient image with a same dimensionality as the current image, values of pixels in the gradient image representing a distance from the epipole of pixels in the current image.

In Example 78, the subject matter of Example 77 includes, wherein a baseline is of at least 0.5 m.

In Example 79, the subject matter of Examples 77-78 includes, wherein the gradient image is a lower resolution that the current image.

In Example 80, the subject matter of Examples 77-79 includes, wherein the gradient image represents only horizontal distances from the epipole, and wherein a second gradient image is provided to the ANN to represent vertical distances from the epipole.

In Example 81, the subject matter of Examples 73-80 includes, wherein the motion of the sensor is provided as a constant value image with a same dimensionality as the current image.

In Example 82, the subject matter of Example 81 includes, wherein the constant value is a ratio of forward motion of the sensor by a height of the sensor from the plane.

In Example 83, the subject matter of Examples 73-82 includes, wherein the three-dimensional structure of the scene is a gamma image, the gamma image including pixels with gamma values that are a ratio of a height of a point above a plane by a distance from a sensor capturing the current image, the plane representing the road surface.

In Example 84, the subject matter of Examples 73-83 includes, wherein the means for modeling the road surface include means for identifying a reflective area by comparing the three-dimensional structure of the scene with output from a second ANN, the second ANN trained to accept the portion of the sequence of images and produce a second three-dimensional structure, wherein training of the second ANN uses more photogrammetric loss in the portion of the sequence of images than training the first ANN.

In Example 85, the subject matter of Example 84 includes, wherein the ANN and the second ANN are implemented as a single ANN trained to produce a two-channel output, wherein a first channel is the three-dimensional structure of the scene and the second channel is the three-dimensional structure produced by the second ANN that used using more photogrammetric loss in its training.

In Example 86, the subject matter of Examples 73-85 includes, means for invoking a second ANN using the three-dimensional structure to determine whether the features represent an object moving or not moving within an environment of the road surface.

In Example 87, the subject matter of Example 86 includes, wherein the means for invoking the second ANN using the three-dimensional structure include means for providing the following to the second ANN: the current image; a previous image warped using the three-dimensional structure; and a target identifier.

In Example 88, the subject matter of Example 87 includes, wherein the target identifier is an image in which pixels of the image indicate a distance from a center of a target.

In Example 89, the subject matter of Examples 87-88 includes, wherein the target identifier includes a size of a target.

In Example 90, the subject matter of Examples 87-89 includes, wherein the target identifier is mask of pixels that correspond to a target.

In Example 91, the subject matter of Examples 73-90 includes, wherein the means for modeling the road surface include means for computing a vertical deviation from the plane of a road surface feature.

In Example 92, the subject matter of Examples 73-91 includes, wherein the ANN is a convolutional neural network (CNN).

In Example 93, the subject matter of Example 92 includes, wherein the motion of the sensor and the epipole are provided to the CNN at a bottleneck layer.

In Example 94, the subject matter of Examples 73-93 includes, wherein the ANN is trained with an unsupervised training technique in which error is determined by measuring a difference between a model of a future image and the future image, the model of the future image produced via a gamma warping of an image previous to the future image.

In Example 95, the subject matter of Examples 73-94 includes, wherein the ANN is trained with an unsupervised training technique in which error is determined by measure a difference between predicted gamma for a location and sensor movement at the location, the sensor movement including pitch, yaw, roll, or translation perpendicular to the plane.

In Example 96, the subject matter of Examples 73-95 includes, wherein the ANN is trained with an unsupervised training technique in which error is determined by a difference in gamma of overlapping segments between two images at two different times, wherein the inference is performed on the first image, and wherein the overlapping segment is closer to the sensor in the second image.

Example 97 is a method for modeling a road surface, the method comprising: obtaining a time-ordered sequence of images representative of a surface, one of the sequence of images being a current image; providing a data set to a first artificial neural network (ANN) to produce a first output of three-dimensional structure of a scene, the data set including: a portion of the sequence of images, the portion of the sequence of images including the current image; motion of the sensor; and an epipole; providing the data set to a second ANN to produce a second output of photogrammetric loss of the scene; and comparing the first output to the second output to determine a feature of the surface.

In Example 98, the subject matter of Example 97 includes, wherein the first output is a three-dimensional structure of a scene, and wherein the second output is a three-dimensional structure based on the photogrammetric loss of the scene.

In Example 99, the subject matter of Example 98 includes, wherein the first output is a gamma map.

In Example 100, the subject matter of Example 99 includes, wherein comparing the first output and the second output includes aligning a hole in the second output with a contiguous area of constant gamma in the first output.

In Example 101, the subject matter of Examples 97-100 includes, wherein the first ANN and the second ANN are trained using loss functions that differ in a weighting between types of loss and use the same types of loss.

In Example 102, the subject matter of Example 101 includes, wherein types of loss include at least one of photometric loss, geometric loss, sensor motion loss, or future image loss.

In Example 103, the subject matter of Examples 97-102 includes, wherein the first ANN and the second ANN are implemented as a single ANN trained to produce a two-channel output, wherein a first channel is the first output and the second channel is the second output.

In Example 104, the subject matter of Examples 97-103 includes, wherein the first ANN and the second ANN are implemented to share a single ANN up to a bottleneck and then diverge thereafter.

Example 105 is at least one machine readable medium including instructions for modeling a road surface, the instructions, when executed by processing circuitry, cause the processing circuitry to perform operations comprising: obtaining a time-ordered sequence of images representative of a surface, one of the sequence of images being a current image; providing a data set to a first artificial neural network (ANN) to produce a first output of three-dimensional structure of a scene, the data set including: a portion of the sequence of images, the portion of the sequence of images including the current image; motion of the sensor; and an epipole; providing the data set to a second ANN to produce a second output of photogrammetric loss of the scene; and comparing the first output to the second output to determine a feature of the surface.

In Example 106, the subject matter of Example 105 includes, wherein the first output is a three-dimensional structure of a scene, and wherein the second output is a three-dimensional structure based on the photogrammetric loss of the scene.

In Example 107, the subject matter of Example 106 includes, wherein the first output is a gamma map.

In Example 108, the subject matter of Example 107 includes, wherein comparing the first output and the second output includes aligning a hole in the second output with a contiguous area of constant gamma in the first output.

In Example 109, the subject matter of Examples 105-108 includes, wherein the first ANN and the second ANN are trained using loss functions that differ in a weighting between types of loss and use the same types of loss.

In Example 110, the subject matter of Example 109 includes, wherein types of loss include at least one of photometric loss, geometric loss, sensor motion loss, or future image loss.

In Example 111, the subject matter of Examples 105-110 includes, wherein the first ANN and the second ANN are implemented as a single ANN trained to produce a two-channel output, wherein a first channel is the first output and the second channel is the second output.

In Example 112, the subject matter of Examples 105-111 includes, wherein the first ANN and the second ANN are implemented to share a single ANN up to a bottleneck and then diverge thereafter.

Example 113 is a device for modeling a road surface, the device comprising: an image capture device to obtain a time-ordered sequence of images representative of a surface, one of the sequence of images being a current image; and processing circuitry to: provide a data set to a first artificial neural network (ANN) to produce a first output of three-dimensional structure of a scene, the data set including: a portion of the sequence of images, the portion of the sequence of images including the current image; motion of the sensor; and an epipole; provide the data set to a second ANN to produce a second output of photogrammetric loss of the scene; and compare the first output to the second output to determine a feature of the surface.

In Example 114, the subject matter of Example 113 includes, wherein the first output is a three-dimensional structure of a scene, and wherein the second output is a three-dimensional structure based on the photogrammetric loss of the scene.

In Example 115, the subject matter of Example 114 includes, wherein the first output is a gamma map.

In Example 116, the subject matter of Example 115 includes, wherein comparing the first output and the second output includes aligning a hole in the second output with a contiguous area of constant gamma in the first output.

In Example 117, the subject matter of Examples 113-116 includes, wherein the first ANN and the second ANN are trained using loss functions that differ in a weighting between types of loss and use the same types of loss.

In Example 118, the subject matter of Example 117 includes, wherein types of loss include at least one of photometric loss, geometric loss, sensor motion loss, or future image loss.

In Example 119, the subject matter of Examples 113-118 includes, wherein the first ANN and the second ANN are implemented as a single ANN trained to produce a two-channel output, wherein a first channel is the first output and the second channel is the second output.

In Example 120, the subject matter of Examples 113-119 includes, wherein the first ANN and the second ANN are implemented to share a single ANN up to a bottleneck and then diverge thereafter.

Example 121 is an autonomous navigation system for a vehicle, the system comprising: at least one image capture device configured to acquire a plurality of images of an area in a vicinity of the user vehicle; a data interface; and at least one processing device configured to: receive the plurality of images via the data interface; determine from the plurality of images the presence of a puddle on the path of the vehicle.

In Example 122, the subject matter of Example 121 includes, wherein the at least one processing device is configured to: determine from the plurality of images if a target is located within the splash zone of the vehicle passing through the puddle; and control the vehicle to perform a navigational maneuver to modify the splash zone of the vehicle such that a new splash zone of the vehicle does not include the target.

In Example 123, the subject matter of Example 122 includes, wherein the navigational maneuver is at least one of slowing the vehicle, performing an intra-lane swerve such that a new path of the vehicle is far enough from the target to prevent the target from being struck by a splash, or perform an intra-lane swerve such that the new path of the vehicle no longer passes through the puddle.

In Example 124, the subject matter of Examples 121-123 includes, wherein the target is a pedestrian.

In Example 125, the subject matter of Examples 121-124 includes, wherein the target is a vehicle.

Example 126 is a method for controlling an autonomous vehicle traveling along a road, the method being carried out by computing platform, and comprising: storing a sequence of images representing at least one field of view from a perspective of the vehicle that includes, a portion of the road; processing the sequence of images to detect a puddle on the road; determining any presence of a pedestrian in a vicinity of the puddle; and determining a driving response solution in response to detection of the puddle, wherein the driving response solution is based on whether the presence of the pedestrian was detected.

In Example 127, the subject matter of Example 126 includes, capturing the sequence of images by a camera system mounted on the vehicle; and wherein the processing includes monocular-image processing of the sequence of images.

In Example 128, the subject matter of Example 127 includes, wherein the sequence of images are captured by a plurality of image sensors of the camera system.

In Example 129, the subject matter of Examples 126-128 includes, wherein processing the sequence of images to detect a puddle on the road includes: computationally determining a vertical contour of the road based on the sequence of images; determining a presence of a depression in the vertical contour exceeding a depth threshold; and applying puddle-detection criteria against a characteristic of the depression.

In Example 130, the subject matter of Example 129 includes, wherein the puddle-detection criteria includes boundary-sharpness criteria, and wherein applying the puddle-detection criteria includes producing a computational assessment of a boundary of the puddle and comparing the computational assessment against the boundary-sharpness criteria.

In Example 131, the subject matter of Example 130 includes, wherein the computational assessment of a boundary of the puddle includes a vertical contour scoring of points inside the puddle along the boundary, and a vertical contour scoring of points outside the puddle along the boundary, and wherein the boundary-sharpness criteria includes a first threshold applicable to the vertical contour scoring of the points inside the puddle, and a second threshold applicable to the vertical contour scoring of the points outside the puddle.

In Example 132, the subject matter of Examples 129-131 includes, wherein the puddle-detection criteria includes contiguity criteria applicable to a vertical contour scoring of points inside the puddle.

In Example 133, the subject matter of Examples 126-132 includes, wherein determining any presence of a pedestrian in a vicinity of the puddle includes processing the sequence of images to perform an object-recognition operation configured to detect a human.

In Example 134, the subject matter of Examples 126-133 includes, wherein determining the driving response solution in response to detection of the puddle includes producing a course or speed response for the vehicle to reduce likelihood of, or avoid, splashing the pedestrian with the puddle in response to a positive detection of the pedestrian in the vicinity of the puddle.

In Example 135, the subject matter of Example 134 includes, wherein determining the driving response solution includes selecting the driving response solution from among a plurality of potential driving response options based on a risk-avoidance decision scheme.

In Example 136, the subject matter of Example 135 includes, wherein the positive detection of the pedestrian in the vicinity of the puddle is represented as an incremental risk factor for risk-avoidance decision scheme, wherein the incremental risk factor that contributes to a totalized risk score associated with the puddle, and wherein the totalized risk score represents a degree of need for performing the driving response solution by the vehicle.

In Example 137, the subject matter of Examples 135-136 includes, wherein determining the driving response solution in response to detection of the puddle includes comparing risk associated with each of the potential driving response options against a risk assessment of a current situational scenario in which that potential driving response option contributes a risk factor.

In Example 138, the subject matter of Example 137 includes, performing an assessment of the current situational scenario.

Example 139 is an apparatus for a machine-vision system for use in a vehicle for traveling along a road, the apparatus comprising: a computing platform including at least one processor and storage circuitry, wherein the computing platform is to implement: a data store to contain a sequence of images representing at least one field of view from a perspective of the vehicle that includes, a portion of the road; a puddle detection engine to determine any presence of a puddle on the road based on the sequence of images; a pedestrian detection engine to determine any presence of a pedestrian in a vicinity of the puddle; and a driving response engine to determine a driving response solution in response to detection of the puddle, wherein the driving response solution is based on whether the presence of the pedestrian was detected by the pedestrian detection engine.

In Example 140, the subject matter of Example 139 includes, a camera system mounted on the vehicle and operable to capture the sequence of images; and wherein the puddle detection engine is to perform monocular-image processing of the sequence of images.

In Example 141, the subject matter of Example 140 includes, wherein the sequence of images are captured by a plurality of image sensors of the camera system.

In Example 142, the subject matter of Examples 139-141 includes, wherein the puddle detection engine is to: computationally determine a vertical contour of the road based on the sequence of images; determine a presence of a depression in the vertical contour exceeding a depth threshold; and apply puddle-detection criteria against a characteristic of the depression.

In Example 143, the subject matter of Example 142 includes, wherein the puddle-detection criteria includes boundary-sharpness criteria, and wherein applying the puddle-detection criteria includes producing a computational assessment of a boundary of the puddle and comparing the computational assessment against the boundary-sharpness criteria.

In Example 144, the subject matter of Example 143 includes, wherein the computational assessment of a boundary of the puddle includes a vertical contour scoring of points inside the puddle along the boundary, and a vertical contour scoring of points outside the puddle along the boundary, and wherein the boundary-sharpness criteria includes a first threshold applicable to the vertical contour scoring of the points inside the puddle, and a second threshold applicable to the vertical contour scoring of the points outside the puddle.

In Example 145, the subject matter of Examples 142-144 includes, wherein the puddle-detection criteria includes contiguity criteria applicable to a vertical contour scoring of points inside the puddle.

In Example 146, the subject matter of Examples 139-145 includes, wherein the pedestrian detection engine is to determine any presence of a pedestrian in a vicinity of the puddle by at least processing the sequence of images to perform an object-recognition operation configured to detect a human.

In Example 147, the subject matter of Examples 139-146 includes, wherein the driving response engine is to produce a course or speed response for the vehicle to reduce likelihood of, or avoid, splashing the pedestrian with the puddle in response to a positive detection of the pedestrian in the vicinity of the puddle.

In Example 148, the subject matter of Example 147 includes, wherein the driving response solution is selected from among a plurality of potential driving response options based on a risk-avoidance decision scheme.

In Example 149, the subject matter of Example 148 includes, wherein the positive detection of the pedestrian in the vicinity of the puddle is represented as an incremental risk factor for risk-avoidance decision scheme, wherein the incremental risk factor that contributes to a totalized risk score associated with the puddle, and wherein the totalized risk score represents a degree of need for performing the driving response solution by the vehicle.

In Example 150, the subject matter of Examples 148-149 includes, wherein the driving response solution engine is to compare risk associated with each of the potential driving response options against a risk assessment of a current situational scenario in which that potential driving response option contributes a risk factor.

In Example 151, the subject matter of Example 150 includes, wherein the driving response solution engine is to perform an assessment of the current situational scenario.

Example 152 is at least one machine-readable medium containing instructions that, when executed by a computing platform of an autonomous vehicle traveling along a road, cause the computing platform to: store a sequence of images representing at least one field of view from a perspective of the vehicle that includes, a portion of the road; process the sequence of images to detect a puddle on the road; determine any presence of a pedestrian in a vicinity of the puddle; and determine a driving response solution in response to detection of the puddle, wherein the driving response solution is based on whether the presence of the pedestrian was detected.

In Example 153, the subject matter of Example 152 includes, instructions for causing the computing platform to: capture the sequence of images by a camera system mounted on the vehicle; and wherein the processing includes monocular-image processing of the sequence of images.

In Example 154, the subject matter of Example 153 includes, wherein the sequence of images are captured by a plurality of image sensors of the camera system.

In Example 155, the subject matter of Examples 152-154 includes, wherein the instructions to process the sequence of images to detect a puddle on the road include instructions for: computationally determining a vertical contour of the road based on the sequence of images; determining a presence of a depression in the vertical contour exceeding a depth threshold; and applying puddle-detection criteria against a characteristic of the depression.

In Example 156, the subject matter of Example 155 includes, wherein the puddle-detection criteria includes boundary-sharpness criteria, and wherein applying the puddle-detection criteria includes producing a computational assessment of a boundary of the puddle and comparing the computational assessment against the boundary-sharpness criteria.

In Example 157, the subject matter of Example 156 includes, wherein the computational assessment of a boundary of the puddle includes a vertical contour scoring of points inside the puddle along the boundary, and a vertical contour scoring of points outside the puddle along the boundary, and wherein the boundary-sharpness criteria includes a first threshold applicable to the vertical contour scoring of the points inside the puddle, and a second threshold applicable to the vertical contour scoring of the points outside the puddle.

In Example 158, the subject matter of Examples 155-157 includes, wherein the puddle-detection criteria includes contiguity criteria applicable to a vertical contour scoring of points inside the puddle.

In Example 159, the subject matter of Examples 152-158 includes, wherein the instructions to determine any presence of a pedestrian in a vicinity of the puddle include instructions for processing the sequence of images to perform an object-recognition operation configured to detect a human.

In Example 160, the subject matter of Examples 152-159 includes, wherein the instructions to determine the driving response solution in response to detection of the puddle include instructions for producing a course or speed response for the vehicle to reduce likelihood of, or avoid, splashing the pedestrian with the puddle in response to a positive detection of the pedestrian in the vicinity of the puddle.

In Example 161, the subject matter of Example 160 includes, wherein the instructions to determine the driving response solution include instructions for selecting the driving response solution from among a plurality of potential driving response options based on a risk-avoidance decision scheme.

In Example 162, the subject matter of Example 161 includes, wherein the positive detection of the pedestrian in the vicinity of the puddle is represented as an incremental risk factor for risk-avoidance decision scheme, wherein the incremental risk factor that contributes to a totalized risk score associated with the puddle, and wherein the totalized risk score represents a degree of need for performing the driving response solution by the vehicle.

In Example 163, the subject matter of Examples 161-162 includes, wherein the instructions to determine the driving response solution in response to detection of the puddle include instructions for comparing risk associated with each of the potential driving response options against a risk assessment of a current situational scenario in which that potential driving response option contributes a risk factor.

In Example 164, the subject matter of Example 163 includes, instructions for performing an assessment of the current situational scenario.

Example 165 is a method for operating a machine-vision system for use in a vehicle, the method comprising: reading, by the machine-vision system, a temporal sequence of images representing at least one field of view that includes, a portion of the road captured by at least one vehicle-mounted camera; computationally determining, by the machine-vision system, a vertical contour of the road based on the temporal sequence of images; and detecting, by the machine-vision system, a puddle on the road based on the vertical contour of the road, including: determining a presence of a depression in the vertical contour exceeding a depth threshold; and applying puddle-detection criteria against a characteristic of the depression.

In Example 166, the subject matter of Example 165 includes, wherein determining the vertical contour includes comparing (a) predicted changes in appearance of the road among the sequence of images due to actual motion of the vehicle, and (b) actual differences between the images of the sequence of images as captured, wherein any differences detected as a result of the comparing represent residual flow between the images of the sequence, and wherein the residual flow is indicative of the vertical contour of the road.

In Example 167, the subject matter of Examples 165-166 includes, wherein the puddle-detection criteria includes boundary-sharpness criteria, and the applying the puddle-detection criteria includes producing a computational assessment of a boundary of the puddle and comparing the computational assessment against the boundary-sharpness criteria.

In Example 168, the subject matter of Example 167 includes, wherein the computational assessment of a boundary of the puddle includes a vertical contour scoring of points inside the puddle along the boundary, and a vertical contour scoring of points outside the puddle along the boundary, and wherein the boundary-sharpness criteria includes a first threshold applicable to the vertical contour scoring of the points inside the puddle, and a second threshold applicable to the vertical contour scoring of the points outside the puddle.

In Example 169, the subject matter of Examples 167-168 includes, wherein the puddle-detection criteria includes contiguity criteria applicable to a vertical contour scoring of points inside the puddle.

In Example 170, the subject matter of Examples 165-169 includes, wherein the temporal sequence of images is obtained from a single camera.

In Example 171, the subject matter of Examples 165-170 includes, wherein the temporal sequence of images is obtained from a plurality of cameras.

In Example 172, the subject matter of Examples 165-171 includes, determining, by the machine-vision system, a current situational scenario pertaining to the puddle.

In Example 173, the subject matter of Example 172 includes, wherein the current situational scenario includes any presence of a pedestrian in a vicinity of the puddle.

In Example 174, the subject matter of Examples 172-173 includes, wherein the current situational scenario includes a position of the puddle relative to a road boundary.

In Example 175, the subject matter of Examples 172-174 includes, wherein the current situational scenario includes a position of the puddle relative to a lane marker on the road.

In Example 176, the subject matter of Examples 172-175 includes, determining, by the machine-vision system, a driving response solution in response to detection of the puddle, the driving response solution being based on the current situational scenario.

In Example 177, the subject matter of Example 176 includes, wherein the driving response solution includes a course or speed response for the vehicle to avoid, or reduce any impact of, striking the puddle by the vehicle.

In Example 178, the subject matter of Examples 176-177 includes, the driving response solution includes a selection of the driving response solution from among a plurality of potential driving response options based on a risk-avoidance decision scheme.

In Example 179, the subject matter of Example 178 includes, wherein the risk-avoidance decision scheme computes a risk score associated with the puddle, the risk score representing a degree of need for performing the driving response solution by the vehicle.

In Example 180, the subject matter of Examples 178-179 includes, wherein the driving response solution is based on a comparison of risk associated with each of the potential driving response options against a risk assessment of a current situational scenario in which that potential driving response option contributes a risk factor.

Example 181 is at least one machine-readable medium containing instructions that, when executed by a machine-vision system of an autonomous vehicle traveling along a road, cause the machine-vision system to: read a temporal sequence of images representing at least one field of view that includes, a portion of the road captured by at least one vehicle-mounted camera; computationally determine a vertical contour of the road based on the temporal sequence of images; and detect a puddle on the road based on the vertical contour of the road, including: determining a presence of a depression in the vertical contour exceeding a depth threshold; and applying puddle-detection criteria against a characteristic of the depression.

In Example 182, the subject matter of Example 181 includes, wherein the instructions to determine the vertical contour include instructions for: comparing (a) predicted changes in appearance of the road among the sequence of images due to actual motion of the vehicle, and (b) actual differences between the images of the sequence of images as captured, wherein any differences detected as a result of the comparing represent residual flow between the images of the sequence, and wherein the residual flow is indicative of the vertical contour of the road.

In Example 183, the subject matter of Examples 181-182 includes, wherein the puddle-detection criteria includes boundary-sharpness criteria, and the applying the puddle-detection criteria includes producing a computational assessment of a boundary of the puddle and comparing the computational assessment against the boundary-sharpness criteria.

In Example 184, the subject matter of Example 183 includes, wherein the computational assessment of a boundary of the puddle includes a vertical contour scoring of points inside the puddle along the boundary, and a vertical contour scoring of points outside the puddle along the boundary, and wherein the boundary-sharpness criteria includes a first threshold applicable to the vertical contour scoring of the points inside the puddle, and a second threshold applicable to the vertical contour scoring of the points outside the puddle.

In Example 185, the subject matter of Examples 183-184 includes, wherein the puddle-detection criteria includes contiguity criteria applicable to a vertical contour scoring of points inside the puddle.

In Example 186, the subject matter of Examples 181-185 includes, wherein the temporal sequence of images is obtained from a single camera.

In Example 187, the subject matter of Examples 181-186 includes, wherein the temporal sequence of images is obtained from a plurality of cameras.

In Example 188, the subject matter of Examples 181-187 includes, instructions for causing the machine-vision system to determine a current situational scenario pertaining to the puddle.

In Example 189, the subject matter of Example 188 includes, wherein the current situational scenario includes any presence of a pedestrian in a vicinity of the puddle.

In Example 190, the subject matter of Examples 188-189 includes, wherein the current situational scenario includes a position of the puddle relative to a road boundary.

In Example 191, the subject matter of Examples 188-190 includes, wherein the current situational scenario includes a position of the puddle relative to a lane marker on the road.

In Example 192, the subject matter of Examples 188-191 includes, instructions for causing the machine-vision system to determine a driving response solution in response to detection of the puddle, the driving response solution being based on the current situational scenario.

In Example 193, the subject matter of Example 192 includes, wherein the driving response solution includes a course or speed response for the vehicle to avoid, or reduce any impact of, striking the puddle by the vehicle.

In Example 194, the subject matter of Examples 192-193 includes, the driving response solution includes a selection of the driving response solution from among a plurality of potential driving response options based on a risk-avoidance decision scheme.

In Example 195, the subject matter of Example 194 includes, wherein the risk-avoidance decision scheme computes a risk score associated with the puddle, the risk score representing a degree of need for performing the driving response solution by the vehicle.

In Example 196, the subject matter of Examples 194-195 includes, wherein the driving response solution is based on a comparison of risk associated with each of the potential driving response options against a risk assessment of a current situational scenario in which that potential driving response option contributes a risk factor.

Example 197 is a machine-implemented method for measuring a structure of a road from a vehicle traveling along the road, the method comprising: reading a set of incoming data that includes: (a) a temporal sequence of captured images representing at least one field of view that includes, a portion of the road captured by at least one vehicle-mounted camera; (b) ego-motion information representing actual motion of the at least one vehicle-mounted camera; and (c) a parametric model of a surface of the road; preprocessing the set of incoming data to determine at least one homography among the temporal sequence of captured images with respect to the road plane information, and to warp at least one of the images of the temporal sequence to align with another image of the temporal sequence based on the at least one homography, to produce a preprocessed set of images based on the temporal sequence; preprocessing the set of incoming data to produce an image-formatted representation of motion of the at least one vehicle-mounted camera; and providing the preprocessed set of images, and the image-formatted representation of motion, as inputs to a machine-learning (ML) system, wherein the ML system is configured to produce a map representing the structure of the road based on the inputs.

In Example 198, the subject matter of Example 197 includes, wherein the at least one field of view includes a single forward-facing field of view captured by a single camera.

In Example 199, the subject matter of Examples 197-198 includes, wherein the at least one field of view includes a forward-facing field of view captured by a plurality of cameras.

In Example 200, the subject matter of Examples 197-199 includes, wherein the at least one field of view includes a plurality of overlapping fields of view captured by a plurality of cameras facing different directions.

In Example 201, the subject matter of Examples 197-200 includes, wherein the parametric model of the surface of the road includes road plane information representing a plane-normal vector perpendicular to a surface of the road.

In Example 202, the subject matter of Examples 197-201 includes, wherein the parametric model of the surface of the road includes a three-dimensional spline model of the road.

In Example 203, the subject matter of Examples 197-202 includes, wherein the parametric model of the surface of the road includes road plane information derived from at least a portion of the captured images.

In Example 204, the subject matter of Examples 197-203 includes, wherein the temporal sequence of captured images includes a sequence of three consecutive images including a most-recently-captured image, a previous image, and a previous-previous image.

In Example 205, the subject matter of Examples 197-204 includes, wherein preprocessing the set of incoming data to produce an image-formatted representation of motion of the at least one vehicle-mounted camera includes producing an image-formatted representation of an epipole corresponding to at least one of the images of the temporal sequence.

In Example 206, the subject matter of Examples 197-205 includes, wherein preprocessing the set of incoming data to produce an image-formatted representation of motion of the at least one vehicle-mounted camera includes producing an image-formatted representation of a ratio of a current measure of translation along the forward direction to the camera height.

In Example 207, the subject matter of Examples 197-206 includes, wherein the ego-motion information is based on measurements obtained by motion sensors of the vehicle.

In Example 208, the subject matter of Examples 197-207 includes, wherein the ego-motion information represents rotational and translational movement of the vehicle.

In Example 209, the subject matter of Examples 197-208 includes, wherein the map representing the structure of the road to be produced by the ML system includes a road model comprising a mapping of values based on road-surface height.

In Example 210, the subject matter of Example 209 includes, wherein the mapping of values based on the road-surface height include ratios of road-surface height to distance from observation point.

Example 211 is at least one machine readable medium including instructions for measuring a structure of a road from a vehicle traveling along the road, the instructions, when executed by processing circuitry, cause the processing circuitry to perform operations comprising: reading a set of incoming data that includes: (a) a temporal sequence of captured images representing at least one field of view that includes, a portion of the road captured by at least one vehicle-mounted camera; (b) ego-motion information representing actual motion of the at least one vehicle-mounted camera; and (c) a parametric model of a surface of the road; preprocessing the set of incoming data to determine at least one homography among the temporal sequence of captured images with respect to the road plane information, and to warp at least one of the images of the temporal sequence to align with another image of the temporal sequence based on the at least one homography, to produce a preprocessed set of images based on the temporal sequence; preprocessing the set of incoming data to produce an image-formatted representation of motion of the at least one vehicle-mounted camera; and providing the preprocessed set of images, and the image-formatted representation of motion, as inputs to a machine-learning (ML) system, wherein the ML system is configured to produce a map representing the structure of the road based on the inputs.

In Example 212, the subject matter of Example 211 includes, wherein the at least one field of view includes a single forward-facing field of view captured by a single camera.

In Example 213, the subject matter of Examples 211-212 includes, wherein the at least one field of view includes a forward-facing field of view captured by a plurality of cameras.

In Example 214, the subject matter of Examples 211-213 includes, wherein the at least one field of view includes a plurality of overlapping fields of view captured by a plurality of cameras facing different directions.

In Example 215, the subject matter of Examples 211-214 includes, wherein the parametric model of the surface of the road includes road plane information representing a plane-normal vector perpendicular to a surface of the road.

In Example 216, the subject matter of Examples 211-215 includes, wherein the parametric model of the surface of the road includes a three-dimensional spline model of the road.

In Example 217, the subject matter of Examples 211-216 includes, wherein the parametric model of the surface of the road includes road plane information derived from at least a portion of the captured images.

In Example 218, the subject matter of Examples 211-217 includes, wherein the temporal sequence of captured images includes a sequence of three consecutive images including a most-recently-captured image, a previous image, and a previous-previous image.

In Example 219, the subject matter of Examples 211-218 includes, wherein preprocessing the set of incoming data to produce an image-formatted representation of motion of the at least one vehicle-mounted camera includes producing an image-formatted representation of an epipole corresponding to at least one of the images of the temporal sequence.

In Example 220, the subject matter of Examples 211-219 includes, wherein preprocessing the set of incoming data to produce an image-formatted representation of motion of the at least one vehicle-mounted camera includes producing an image-formatted representation of a ratio of a current measure of translation along the forward direction to the camera height.

In Example 221, the subject matter of Examples 211-220 includes, wherein the ego-motion information is based on measurements obtained by motion sensors of the vehicle.

In Example 222, the subject matter of Examples 211-221 includes, wherein the ego-motion information represents rotational and translational movement of the vehicle.

In Example 223, the subject matter of Examples 211-222 includes, wherein the map representing the structure of the road to be produced by the ML system includes a road model comprising a mapping of values based on road-surface height.

In Example 224, the subject matter of Example 223 includes, wherein the mapping of values based on the road-surface height include ratios of road-surface height to distance from observation point.

Example 225 is a system for measuring a structure of a road from a vehicle traveling along the road, the system comprising: means for reading a set of incoming data that includes: (a) a temporal sequence of captured images representing at least one field of view that includes, a portion of the road captured by at least one vehicle-mounted camera; (b) ego-motion information representing actual motion of the at least one vehicle-mounted camera; and (c) a parametric model of a surface of the road; means for preprocessing the set of incoming data to determine at least one homography among the temporal sequence of captured images with respect to the road plane information, and to warp at least one of the images of the temporal sequence to align with another image of the temporal sequence based on the at least one homography, to produce a preprocessed set of images based on the temporal sequence; means for preprocessing the set of incoming data to produce an image-formatted representation of motion of the at least one vehicle-mounted camera; and means for providing the preprocessed set of images, and the image-formatted representation of motion, as inputs to a machine-learning (ML) system, wherein the ML system is configured to produce a map representing the structure of the road based on the inputs.

In Example 226, the subject matter of Example 225 includes, wherein the at least one field of view includes a single forward-facing field of view captured by a single camera.

In Example 227, the subject matter of Examples 225-226 includes, wherein the at least one field of view includes a forward-facing field of view captured by a plurality of cameras.

In Example 228, the subject matter of Examples 225-227 includes, wherein the at least one field of view includes a plurality of overlapping fields of view captured by a plurality of cameras facing different directions.

In Example 229, the subject matter of Examples 225-228 includes, wherein the parametric model of the surface of the road includes road plane information representing a plane-normal vector perpendicular to a surface of the road.

In Example 230, the subject matter of Examples 225-229 includes, wherein the parametric model of the surface of the road includes a three-dimensional spline model of the road.

In Example 231, the subject matter of Examples 225-230 includes, wherein the parametric model of the surface of the road includes road plane information derived from at least a portion of the captured images.

In Example 232, the subject matter of Examples 225-231 includes, wherein the temporal sequence of captured images includes a sequence of three consecutive images including a most-recently-captured image, a previous image, and a previous-previous image.

In Example 233, the subject matter of Examples 225-232 includes, wherein the means for preprocessing the set of incoming data to produce an image-formatted representation of motion of the at least one vehicle-mounted camera include means for producing an image-formatted representation of an epipole corresponding to at least one of the images of the temporal sequence.

In Example 234, the subject matter of Examples 225-233 includes, wherein the means for preprocessing the set of incoming data to produce an image-formatted representation of motion of the at least one vehicle-mounted camera include means for producing an image-formatted representation of a ratio of a current measure of translation along the forward direction to the camera height.

In Example 235, the subject matter of Examples 225-234 includes, wherein the ego-motion information is based on measurements obtained by motion sensors of the vehicle.

In Example 236, the subject matter of Examples 225-235 includes, wherein the ego-motion information represents rotational and translational movement of the vehicle.

In Example 237, the subject matter of Examples 225-236 includes, wherein the map representing the structure of the road to be produced by the ML system includes a road model comprising a mapping of values based on road-surface height.

In Example 238, the subject matter of Example 237 includes, wherein the mapping of values based on the road-surface height include ratios of road-surface height to distance from observation point.

Example 239 is an apparatus for a machine-vision system for use in a vehicle traveling along a road, the apparatus comprising: an input to read a temporal sequence of images representing at least one field of view that includes, a portion of the road captured by at least one vehicle-mounted camera; and a road structure measurement system coupled to the input, the road structure measurement system including a first deep neural network (DNN) configured to receive image-formatted inputs based on the temporal sequence of images; wherein the first DNN is configured with computational parameters derived from a training process wherein: training data, comprising a first portion having a captured temporal sequence of training images and corresponding ego-motion measurements, is input to a training DNN, wherein the training DNN produces a test result based on forward-propagating processing of the first portion, wherein the forward-propagating processing includes application of trainable computational parameters by the training DNN; a multi-modal loss function is generated based on an aggregation of a plurality of distinct loss components, including a first loss component based on the first portion of the training data, and a second loss component based on a second portion of the training data having at least one captured image or ego-motion measurement that is absent from the first portion; the multi-modal loss function is evaluated based on the test result to produce a loss value, and the trainable computational parameters are refined to reduce the loss value according to a training process; and the refined trainable parameters are supplied to configure the first DNN.

In Example 240, the subject matter of Example 239 includes, wherein the training process includes backpropagation of the loss function through the training DNN with gradient-descent training.

In Example 241, the subject matter of Examples 239-240 includes, wherein the image-formatted inputs to be received by the first DNN include: the temporal sequence of images; epipole information formatted as an image, wherein the epipole information includes points representing their respective distances from an epipole; and motion information formatted as an image, wherein the motion information includes points representing ratios of a current measure of translation along the forward direction to the camera height.

In Example 242, the subject matter of Examples 239-241 includes, wherein the first DNN is a convolutional DNN comprising a plurality of layers including convolution, activation, and pooling layers; wherein the first DNN includes a plurality of input ports feeding different layers, including a first input layer, and a second input layer different from the first input layer; and wherein a first image-formatted input is to be provided to the first input layer, and wherein a second image-formatted input is to be provided to the second input layer.

In Example 243, the subject matter of Example 242 includes, wherein the first input comprises the temporal sequence of images, and wherein the second input comprises image-formatted motion information representing motion of the vehicle.

In Example 244, the subject matter of Examples 239-243 includes, wherein the first DNN is a convolutional DNN that includes a convolution portion and a deconvolution portion.

In Example 245, the subject matter of Example 244 includes, wherein the first DNN includes a plurality of layers, each layer producing a feature map and passing the feature map forward to a subsequent layer for processing along a forward propagation path; wherein successive layers of the convolution portion are to operate to progressively reduce resolution of their corresponding feature maps while increasing dimensionality of the feature maps along the forward propagation path; wherein successive layers of the deconvolutional deconvolution portion are to operate to progressively increase resolution of their corresponding feature maps while decreasing the dimensionality of the feature maps along the forward propagation path.

In Example 246, the subject matter of Example 245 includes, wherein the first DNN includes at least one bypass paths arranged to facilitate passing of the feature maps from a prior layer to a latter layer along the forward propagation path while skipping over one or more intermediary layers situated between those prior and latter layers.

In Example 247, the subject matter of Examples 245-246 includes, wherein the first DNN includes a bottleneck network portion situated between the convolution portion and the deconvolution portion, wherein the bottleneck network portion includes at least one layers with relatively lower resolution and higher dimensionality compared to other layers of the first DNN.

In Example 248, the subject matter of Example 247 includes, wherein the bottleneck portion includes inputs configured to accept image-formatted motion indicia and image-formatted epipole location data.

In Example 249, the subject matter of Examples 239-248 includes, wherein the first DNN is to produce as its output a map representing a structure of the road, including a road model comprising a mapping of values based on road-surface height.

In Example 250, the subject matter of Examples 248-249 includes, wherein the mapping of values based on the road-surface height include ratios of road-surface height to distance from observation point.

In Example 251, the subject matter of Examples 239-250 includes, wherein the first DNN has the same architecture as the training DNN.

In Example 252, the subject matter of Examples 239-251 includes, wherein the first loss component comprises a photogrammetric loss component based on the temporal sequence of training images and corresponding ego-motion measurements from which the test result is produced.

In Example 253, the subject matter of Example 252 includes, wherein the second loss component is based on at least one past or future training image captured at a time that is different from a time at which any of the images of the temporal sequence of training images were captured.

In Example 254, the subject matter of Examples 252-253 includes, wherein the second loss component is based on at least one past or future measurement of ego-motion taken at a time that is different from a time at which any of the ego-motion measurements, from which the test result was produced, were obtained.

In Example 255, the subject matter of Examples 252-254 includes, wherein the second loss component is based on at least one future road structure assessment based on captured images and corresponding measured ego-motion obtained from a portion of the training data captured later in time than the time at which any of the temporal sequence of training images were captured.

Example 256 is an apparatus for a machine-vision system for use in a vehicle traveling along a wet road, the apparatus comprising: an input to read a temporal sequence of images representing at least one field of view that includes, a portion of the road captured by at least one vehicle-mounted camera; and a road structure measurement system coupled to the input, the road structure measurement system including a first deep neural network (DNN) configured to receive image-formatted inputs based on the temporal sequence of images; wherein when at least a first one of the temporal sequence of images is warped according to a homography and aligned with a first one of the temporal sequence of images to reveal residual motion between the first and the second ones of the sequence of images, the residual motion is indicative of at least (a) variations in road surface topography, and (b) specular reflections from the road surface; and wherein the road structure measurement system is configured to discriminate the variations in road surface topography from the specular reflections from the road surface to produce topography measurements accurate to within three centimeters of road surface height variation at a distance of at least ten meters when the vehicle is traveling at a speed of fifty kilometers per hour.

In Example 257, the subject matter of Example 256 includes, wherein the first DNN is a convolutional DNN that includes a convolution portion and a deconvolution portion.

In Example 258, the subject matter of Example 257 includes, wherein the first DNN includes a plurality of layers, each layer producing a feature map and passing the feature map forward to a subsequent layer for processing along a forward propagation path; wherein successive layers of the convolution portion are to operate to progressively reduce resolution of their corresponding feature maps while increasing dimensionality of the feature maps along the forward propagation path; wherein successive layers of the deconvolutional deconvolution portion are to operate to progressively increase resolution of their corresponding feature maps while decreasing the dimensionality of the feature maps along the forward propagation path.

In Example 259, the subject matter of Example 258 includes, wherein the first DNN includes at least one bypass paths arranged to facilitate passing of the feature maps from a prior layer to a latter layer along the forward propagation path while skipping over one or more intermediary layers situated between those prior and latter layers.

In Example 260, the subject matter of Examples 258-259 includes, wherein the first DNN includes a bottleneck network portion situated between the convolution portion and the deconvolution portion, wherein the bottleneck network portion includes at least one layers with relatively lower resolution and higher dimensionality compared to other layers of the first DNN.

In Example 261, the subject matter of Example 260 includes, wherein the bottleneck portion includes inputs configured to accept image-formatted motion indicia and image-formatted epipole location data.

In Example 262, the subject matter of Examples 256-261 includes, wherein the first DNN is to produce as its output a map representing a structure of the road, including a road model comprising a mapping of values based on road-surface height.

In Example 263, the subject matter of Examples 261-262 includes, wherein the mapping of values based on the road-surface height include ratios of road-surface height to distance from observation point.

In Example 264, the subject matter of Examples 256-263 includes, wherein the first DNN is configured with computational parameters derived from a training process wherein: training data, comprising a first portion having a captured temporal sequence of training images and corresponding ego-motion measurements, is input to a training DNN, wherein the training DNN produces a test result based on forward-propagating processing of the first portion, wherein the forward-propagating processing includes application of trainable computational parameters by the training DNN; a multi-modal loss function is generated based on an aggregation of a plurality of distinct loss components, including a first loss component based on the first portion of the training data, and a second loss component based on a second portion of the training data having at least one captured image or ego-motion measurement that is absent from the first portion; the multi-modal loss function is evaluated based on the test result to produce a loss value, and the trainable computational parameters are refined to reduce the loss value according to a training process; and the refined trainable parameters are supplied to configure the first DNN.

In Example 265, the subject matter of Example 264 includes, wherein the training process includes backpropagation of the loss function through the training DNN with gradient-descent training.

In Example 266, the subject matter of Examples 256-265 includes, wherein the image-formatted inputs to be received by the first DNN include: the temporal sequence of images; epipole information formatted as an image, wherein the epipole information includes points representing their respective distances from an epipole; and motion information formatted as an image, wherein the motion information includes points representing ratios of a current measure of translation along the forward direction to the camera height.

In Example 267, the subject matter of Examples 256-266 includes, wherein the first DNN is a convolutional DNN comprising a plurality of layers including convolution, activation, and pooling layers; wherein the first DNN includes a plurality of input ports feeding different layers, including a first input layer, and a second input layer different from the first input layer; and wherein a first image-formatted input is to be provided to the first input layer, and wherein a second image-formatted input is to be provided to the second input layer.

In Example 268, the subject matter of Example 267 includes, wherein the first input comprises the temporal sequence of images, and wherein the second input comprises image-formatted motion information representing motion of the vehicle.

In Example 269, the subject matter of Examples 264-268 includes, wherein the first DNN has the same architecture as the training DNN.

In Example 270, the subject matter of Examples 264-269 includes, wherein the first loss component comprises a photogrammetric loss component based on the temporal sequence of training images and corresponding ego-motion measurements from which the test result is produced.

In Example 271, the subject matter of Example 270 includes, wherein the second loss component is based on at least one past or future training image captured at a time that is different from a time at which any of the images of the temporal sequence of training images were captured.

In Example 272, the subject matter of Examples 270-271 includes, wherein the second loss component is based on at least one past or future measurement of ego-motion taken at a time that is different from a time at which any of the ego-motion measurements, from which the test result was produced, were obtained.

In Example 273, the subject matter of Examples 270-272 includes, wherein the second loss component is based on at least one future road structure assessment based on captured images and corresponding measured ego-motion obtained from a portion of the training data captured later in time than the time at which any of the temporal sequence of training images were captured.

Example 274 is at least one machine-readable medium including instructions that, when executed by processing circuitry, cause the processing circuitry to perform operations to implement of any of Examples 1-273.

Example 275 is an apparatus comprising means to implement of any of Examples 1-273.

Example 276 is a system to implement of any of Examples 1-273.

Example 277 is a method to implement of any of Examples 1-273.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A device for modeling a road surface, the device comprising:
   an image capture device with a sensor to obtain a time-ordered sequence of images representative of a surface, one of the sequence of images being a current image; and
   processing circuitry to:
      provide a data set to a first artificial neural network (ANN) to produce a first output of three-dimensional structure of a scene, the data set including:
         a portion of the sequence of images, the portion of the sequence of images including the current image;
         motion of the sensor; and
         an epipole, wherein the first structure includes a representation of a vertical deviations from the surface of points observed in the portion of the sequence of images;
      provide the data set to a second ANN to produce a second output of photogrammetric loss of the scene; and
      compare the first output to the second output to determine a feature of the surface.

2. The device of claim 1, wherein the points include all points common to every image of the of the portion of the sequence of images to produce a three-dimensional structure of a scene, and wherein the second output is a three-dimensional structure based on the photogrammetric loss of the scene.

3. The device of claim 2, wherein the first output is a gamma map.

4. The device of claim 3, wherein comparing the first output and the second output includes aligning a hole in the second output with a contiguous area of constant gamma in the first output.

5. The device of claim 1, wherein the first ANN and the second ANN are trained using loss functions that differ in a weighting between types of loss and use the same types of loss.

6. The device of claim 5, wherein types of loss include at least one of photometric loss, geometric loss, sensor motion loss, or future image loss.

7. The device of claim 1, wherein the first ANN and the second ANN are implemented as a single ANN trained to produce a two-channel output, wherein a first channel is the first output and the second channel is the second output.

8. The device of claim 1, wherein the first ANN and the second ANN are implemented to share a single ANN up to a bottleneck and then diverge thereafter.

9. A method for modeling a road surface, the method comprising:
   obtaining a time-ordered sequence of images representative of a surface from a sensor, one of the sequence of images being a current image;
   providing a data set to a first artificial neural network (ANN) to produce a first output of three-dimensional structure of a scene, the data set including:
      a portion of the sequence of images, the portion of the sequence of images including the current image;
      motion of the sensor; and
      an epipole, wherein the first structure includes a representation of a vertical deviations from the surface of points observed in the portion of the sequence of images;
   providing the data set to a second ANN to produce a second output of photogrammetric loss of the scene; and
   comparing the first output to the second output to determine a feature of the surface.

10. The method of claim 9, wherein the points include all points common to every image of the of the portion of the sequence of images first output ii to produce a three-dimensional structure of a scene, and wherein the second output is a three-dimensional structure based on the photogrammetric loss of the scene.

11. The method of claim 10, wherein the first output is a gamma map.

12. The method of claim 11, wherein comparing the first output and the second output includes aligning a hole in the second output with a contiguous area of constant gamma in the first output.

13. The method of claim 9, wherein the first ANN and the second ANN are trained using loss functions that differ in a weighting between types of loss and use the same types of loss.

14. The method of claim 13, wherein types of loss include at least one of photometric loss, geometric loss, sensor motion loss, or future image loss.

15. The method of claim 9, wherein the first ANN and the second ANN are implemented as a single ANN trained to produce a two-channel output, wherein a first channel is the first output and the second channel is the second output.

16. The method of claim 9, wherein the first ANN and the second ANN are implemented to share a single ANN up to a bottleneck and then diverge thereafter.

17. At least one machine readable medium including instructions for modeling a road surface, the instructions, when executed by processing circuitry, cause the processing circuitry to perform operations comprising:
   obtaining a time-ordered sequence of images representative of a surface from a sensor, one of the sequence of images being a current image;
   providing a data set to a first artificial neural network (ANN) to produce a first output of three-dimensional structure of a scene, the data set including:
      a portion of the sequence of images, the portion of the sequence of images including the current image;
      motion of the sensor; and
      an epipole, wherein the first structure includes a representation of a vertical deviations from the surface of points observed in the portion of the sequence of images;

providing the data set to a second ANN to produce a second output of photogrammetric loss of the scene; and comparing the first output to the second output to determine a feature of the surface.

18. The at least one machine readable medium of claim 17, wherein the points include all points common to every image of the of the portion of the sequence of images to produce a three-dimensional structure of a scene, and wherein the second output is a three-dimensional structure based on the photogrammetric loss of the scene.

19. The at least one machine readable medium of claim 18, wherein the first output is a gamma map.

20. The at least one machine readable medium of claim 19, wherein comparing the first output and the second output includes aligning a hole in the second output with a contiguous area of constant gamma in the first output.

21. The at least one machine readable medium of claim 17, wherein the first ANN and the second ANN are trained using loss functions that differ in a weighting between types of loss and use the same types of loss.

22. The at least one machine readable medium of claim 21, wherein types of loss include at least one of photometric loss, geometric loss, sensor motion loss, or future image loss.

23. The at least one machine readable medium of claim 17, wherein the first ANN and the second ANN are implemented as a single ANN trained to produce a two-channel output, wherein a first channel is the first output and the second channel is the second output.

24. The at least one machine readable medium of claim 17, wherein the first ANN and the second ANN are implemented to share a single ANN up to a bottleneck and then diverge thereafter.

* * * * *

UNITED STATES PATENT AND TRADEMARK OFFICE
CERTIFICATE OF CORRECTION

PATENT NO. : 11,816,991 B2  
APPLICATION NO. : 17/104572  
DATED : November 14, 2023  
INVENTOR(S) : Stein et al.

Page 1 of 1

It is certified that error appears in the above-identified patent and that said Letters Patent is hereby corrected as shown below:

In the Claims

In Column 67, Line 46, in Claim 2, delete "of the of the" and insert --of the-- therefor In Column 68, Line 26, in Claim 10, delete "of the of the" and insert --of the-- therefor In Column 68, Line 27, in Claim 10, after "images", delete "first output ii"

In Column 69, Line 8, in Claim 18, delete "of the of the" and insert --of the-- therefor Signed and Sealed this  
Twentieth Day of May, 2025

Coke Morgan Stewart  
*Acting Director of the United States Patent and Trademark Office*